(12) United States Patent
Sasaki et al.

(10) Patent No.: US 10,362,091 B2
(45) Date of Patent: Jul. 23, 2019

(54) CONTROL METHOD OF INFORMATION DEVICE FOR DISPLAYING SUBJECT DEVICE LIST SCREEN, AND NON-TRANSITORY COMPUTER-READABLE RECORDING MEDIUM STORING PROGRAM CAUSING COMPUTER TO PERFORM THE METHOD

(71) Applicant: Panasonic Intellectual Property Corporation of America, Torrance, CA (US)

(72) Inventors: Takamitsu Sasaki, Kanagawa (JP); Ryuji Inoue, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 614 days.

(21) Appl. No.: 14/806,892

(22) Filed: Jul. 23, 2015

(65) Prior Publication Data

US 2016/0080465 A1 Mar. 17, 2016

Related U.S. Application Data

(63) Continuation of application No. PCT/JP2014/005770, filed on Nov. 18, 2014.
(Continued)

(30) Foreign Application Priority Data

Oct. 27, 2014 (JP) .................................. 2014-218482

(51) Int. Cl.
*H04L 29/08* (2006.01)
*G06F 3/0484* (2013.01)
(Continued)

(52) U.S. Cl.
CPC .......... *H04L 67/025* (2013.01); *G06F 3/0482* (2013.01); *G06F 3/04817* (2013.01); *G06F 3/04847* (2013.01); *H04N 5/44* (2013.01)

(58) Field of Classification Search
CPC ...... H04L 67/025; G06F 3/04817; H04N 5/44
See application file for complete search history.

(56) References Cited

U.S. PATENT DOCUMENTS 6,756,998 B1 * 6/2004 Bilger ................. H04L 12/2803
715/734
8,489,469 B1 * 7/2013 Elberbaum ........ G06Q 30/0643
348/14.07
(Continued)

FOREIGN PATENT DOCUMENTS

JP 2005-020650 A 1/2005
JP 2007-104567 4/2007
(Continued)

OTHER PUBLICATIONS

Singaporean Office Action dated May 19, 2017 for the related Singaporean Patent Application No. 11201505982V.
(Continued)

*Primary Examiner* — Li P Sun
(74) *Attorney, Agent, or Firm* — Greenblum & Bernstein, P.L.C.

(57) ABSTRACT

An unregistered first subject device is managed in memory as one or more subject devices. A room selection screen for selection of a room where the unregistered first subject device is installed, is displayed on a display. The unregistered first subject device is associated with a first room and managed as a registered first subject device, based on selection of the first room from the room selection screen. A room list screen including a first room icon representing the first room is generated, and displayed on the display.

20 Claims, 32 Drawing Sheets

Related U.S. Application Data

(60) Provisional application No. 62/049,504, filed on Sep. 12, 2014.

(51) Int. Cl.
  *G06F 3/0482* (2013.01)
  *G06F 3/0481* (2013.01)
  *H04N 5/44* (2011.01)

(56) References Cited

U.S. PATENT DOCUMENTS

| | | | |
|---|---|---|---|
| 2005/0257052 A1* | 11/2005 | Asai | H04L 63/105 713/166 |
| 2011/0302517 A1 | 12/2011 | Duchene et al. | |
| 2013/0041486 A1* | 2/2013 | Lee | G05B 17/02 700/83 |
| 2013/0057395 A1* | 3/2013 | Ohashi | G08C 17/02 340/12.5 |
| 2014/0236325 A1 | 8/2014 | Sasaki et al. | |
| 2014/0236326 A1 | 8/2014 | Sasaki et al. | |
| 2014/0359524 A1 | 12/2014 | Sasaki et al. | |
| 2015/0033136 A1 | 1/2015 | Sasaki et al. | |
| 2015/0113414 A1 | 4/2015 | Sasaki et al. | |
| 2015/0193469 A1* | 7/2015 | Hagiwara | G06F 17/30241 345/589 |

FOREIGN PATENT DOCUMENTS

| | | |
|---|---|---|
| JP | 2012-134957 A | 7/2012 |
| JP | 2013-098613 A | 5/2013 |
| JP | 2014-235706 | 12/2014 |
| WO | 2014/128767 A1 | 8/2014 |
| WO | 2014/128768 A1 | 8/2014 |
| WO | 2014/128791 A1 | 8/2014 |
| WO | 2014/128798 A1 | 8/2014 |
| WO | 2014/128800 A1 | 8/2014 |
| WO | 2014/128801 A1 | 8/2014 |
| WO | 2014/196098 | 12/2014 |

OTHER PUBLICATIONS

The Extended European Search Report dated Jun. 7, 2017 for the related European Patent Application No. 14878398.8.
International Search Report of PCT application No. PCT/JP2014/005770 dated Feb. 24, 2015.

* cited by examiner

INITIAL STATE    2300

| ROOM ID | ROOM NAME | NUMBER OF DEVICES REGISTERED |
|---|---|---|
| NO REGISTRATION | NO REGISTRATION | 0 |

STATE OF ONE ROOM    2300

| ROOM ID | ROOM NAME | NUMBER OF DEVICES REGISTERED |
|---|---|---|
| R001 | LIVING ROOM | 4 |

STATE OF TWO ROOMS    2300

| ROOM ID | ROOM NAME | NUMBER OF DEVICES REGISTERED |
|---|---|---|
| R001 | LIVING ROOM | 4 |
| R002 | DEN | 1 |

| ROOM ID | ROOM NAME | NUMBER OF DEVICES REGISTERED |
|---|---|---|
| R001 | LIVING ROOM | 4 |
| R002 | DEN | 1 |
| R003 | STUDY | 2 |
| R004 | JAPANESE ROOM | 2 |
| R005 | ENTRANCE | 0 |
| R006 | BEDROOM 1 | 3 |
| R007 | BEDROOM 2 | 1 |
| R008 | CHILDREN'S ROOM 1 | 3 |
| R009 | CHILDREN'S ROOM 2 | 1 |
| R010 | KITCHEN | 2 |
| R011 | FATHER | 0 |
| ... | ... | ... |

| 2501 | 2502 | 2503 | 2504 | 2505 | 2506 | 2507 | 2508 | 2509 |
|---|---|---|---|---|---|---|---|---|
| DEVICE ID | DEVICE TYPE | MODEL NUMBER | ROOM WHERE INSTALLED | CAPABILITY INFORMATION | CONTROL COMMAND TRANSMISSION DESTINATION | IP ADDRESS | ENERGY CONSUMPTION (kwh) | STATUS |
| A | AIR CONDITIONER | CS-X403C | LIVING ROOM | TEMPERATURE CONTROL, WIND DIRECTION CONTROL, AIRFLOW CONTROL | DEVICE | 192.168.0.5 | 204 | 27°C |
| B | AIR CONDITIONER | CS-X403C | BEDROOM 1 | TEMPERATURE CONTROL, WIND DIRECTION CONTROL, AIRFLOW CONTROL | DEVICE | 192.168.0.6 | 312 | OFF |
| C | AIR CONDITIONER | CS-X404C | BEDROOM 2 | TEMPERATURE CONTROL, WIND DIRECTION CONTROL, AIRFLOW CONTROL | DEVICE | 192.168.0.7 | 250 | 25°C |
| D | AIR CONDITIONER | CS-X404C | CHILDREN'S ROOM 1 | TEMPERATURE CONTROL, WIND DIRECTION CONTROL, AIRFLOW CONTROL | DEVICE | 192.168.0.8 | 284 | OFF |
| E | SHUTTER | NK-NEA80 | BEDROOM 1 | OPEN/CLOSE CONTROL | DEVICE | 192.168.0.9 | 0 | CLOSED |
| F | SHUTTER | NK-NEA10 | LIVING ROOM | OPEN/CLOSE CONTROL | DEVICE | 192.168.0.10 | 2 | OPEN |
| G | LIGHTING FIXTURE | NH-LC710A | LIVING ROOM | ON/OFF CONTROL, BRIGHTNESS CONTROL | DEVICE | 192.168.0.11 | 4 | ON |
| ... | ... | ... | ... | ... | ... | | | |

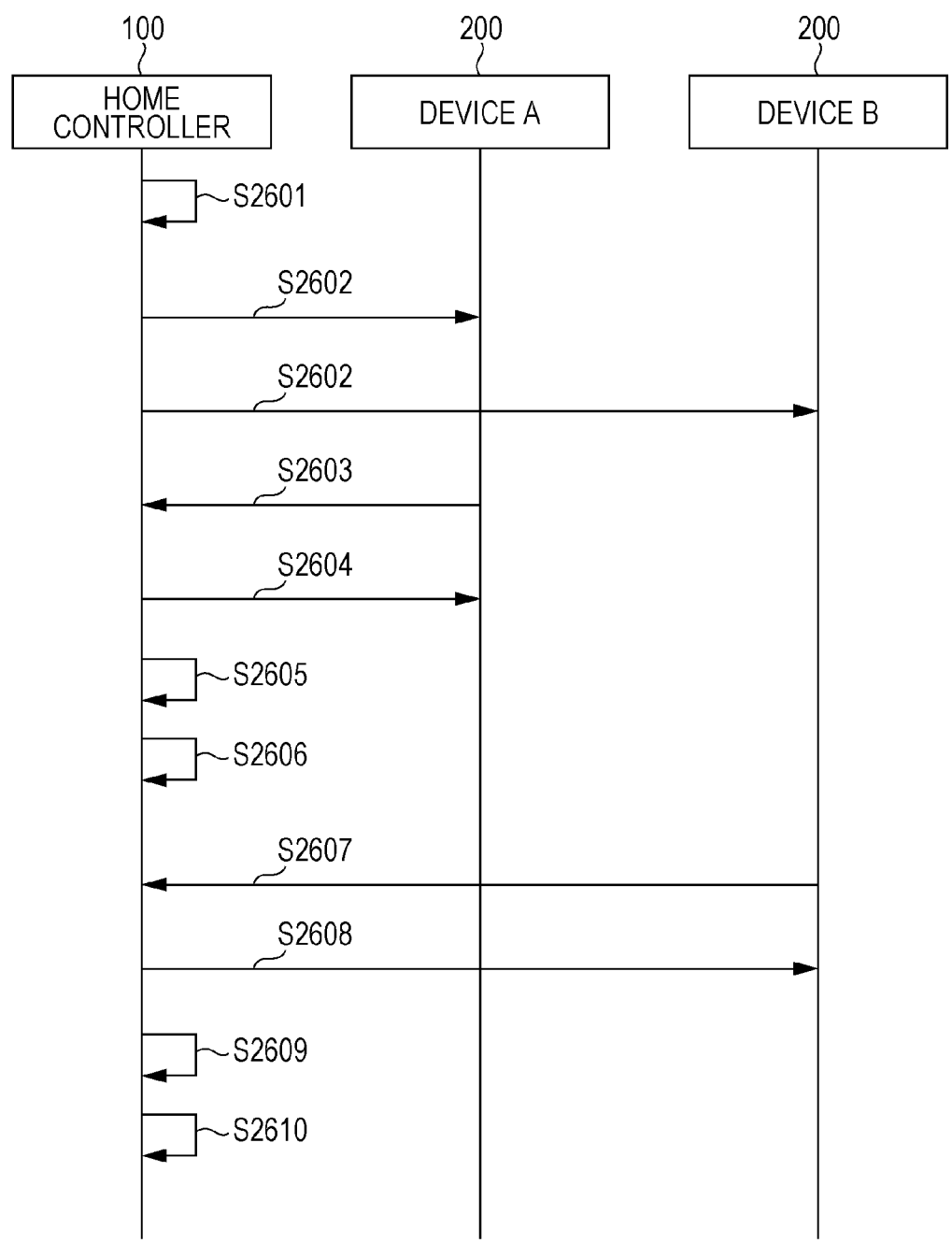

CONTROL METHOD OF INFORMATION DEVICE FOR DISPLAYING SUBJECT DEVICE LIST SCREEN, AND NON-TRANSITORY COMPUTER-READABLE RECORDING MEDIUM STORING PROGRAM CAUSING COMPUTER TO PERFORM THE METHOD

BACKGROUND

1. Technical Field

The present invention relates to a control method of an information device.

2. Description of the Related Art

There has been proposed a technology where one or more subject devices are remotely monitored or remotely controlled using one remote controller.

Japanese Unexamined Patent Application Publication No. 2007-104567 discloses a technology for remote operation of one or more subject devices from a television monitor. Specifically, icons for the one or more subject devices are displayed on the right side of the monitor, and upon any icon being selected therefrom (i), a room layout diagram is displayed at the left side of the monitor screen (ii), and upon moving a pointer to a position in the room layout diagram where the subject device to be operated is installed (iii), an operating screen for the subjected device selected by moving a pointer on the monitor is displayed (iv) (paragraphs [0138] through [0140] and FIGS. 25(a) and 25(b)).

However, further improvement has been needed with the aforementioned Japanese Unexamined Patent Application Publication No. 2007-104567.

SUMMARY

In one general aspect, the techniques disclosed here feature a method in which an unregistered first subject device is managed in memory as one or more subject devices. A room selection screen for selection of a room where the unregistered first subject device is installed, is displayed on a display. The unregistered first subject device is associated with a first room and managed as a registered first subject device, based on selection of the first room from the room selection screen. A room list screen including a first room icon representing the first room is generated, and displayed on the display.

According to the above aspect, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 23 is a diagram illustrating a room list according to a first example which a device registration management unit manages;

FIG. 24 is a diagram illustrating a room list according to a second example which the device registration management unit manages;

FIG. 25 is a diagram illustrating an example of data configuration of a device list which the device registration management unit manages;

FIG. 26 is a sequence diagram illustrating an example of processing performed when the home controller detects devices;

DETAILED DESCRIPTION

Figure 1:
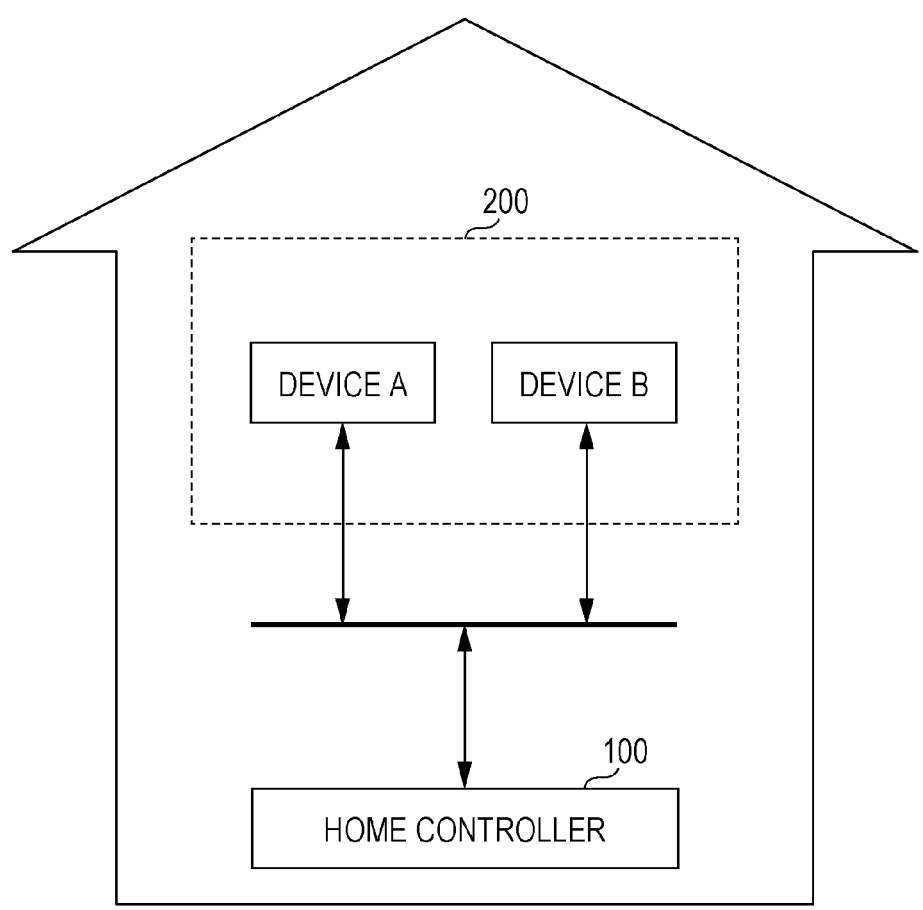
FIG. 1 is an overall configuration diagram illustrating a home control system where a home controller according to the present disclosure has been applied.

Background Leading to the Invention of an Aspect According to the Present Disclosure First, points that were given attention regarding the aspect of the present disclosure will be described. Technology to display a display screen showing a room layout diagram of a building on a display of a remote controller, to control one or more subject devices installed in a building such as a house, using a remote controller via a network, has been studied as in the aforementioned Japanese Unexamined Patent Application Publication No. 2007-104567, for example.

A display screen showing the room layout diagram for the building sections the one or more divides installed in the building into increments of the rooms included in the room layout diagram for the building. Accordingly, the placement of the subject devices sectioned into increments of rooms on the display screen match the sense of daily life of the user using the subject devices, so it is anticipated that the display screen showing the room layout diagram for the building will be easy for users to use. For example, in the aforementioned Japanese Unexamined Patent Application Publication No. 2007-104567, upon the user selecting a desired icon from icons for one or more subject devices, displayed at the right edge of the monitor screen, the room layout diagram is displayed on the left side of the same monitor screen, showing where in the room layout diagram that the subject device has been installed.

However, the room layout diagram for the building will differ for each building, accordingly, a common room layout diagram cannot be used among multiple users for the display screen showing the room layout diagram for the buildings, and individual screens need to be created for each building. This means that the display screen displaying the room layout diagram for the building is a specialized item customized for each individual user. Accordingly, since a common room layout diagram cannot be used among multiple users for the display screen showing the room layout diagram for the buildings, the cost is expensive, and consequently will not come into widespread use despite the anticipated ease of use.

Also, if the same user moves to a new dwelling, and has to live in a building with a new and different room layout diagram, a new room layout diagram will need to be obtained. That is to say, there are cases where even the same user cannot use a common room layout diagram. In this case, if the same user is to continue to use the remote controller after moving, a display screen showing the layout customized for the new dwelling is necessary, placing additional costs on the same user. This point also can be conceived to have been a factor in preventing display screens showing the room layout diagrams from coming into widespread use.

With respect to this point, Japanese Patent No. 5474238 discloses technology where a room layout image is created using an editing screen, and subject devices are placed in the room layout image. The editing screen displays a layout area where the room layout image is displayed, and a list area where unregistered device not placed in the room layout diagram yet are shown. The layout area has a button in the room layout image to add rooms. Pressing this button enables rooms to be added to the room layout image. (i) One of the unregistered devices in the list area is dragged, (ii) the dragged unregistered device is moved to one of the rooms in the room layout image in the layout area, and (iii) the dragged unregistered device is dropped on the desired room, whereby the device dropped in the editing screen is placed in the room where it was dropped.

However, the user him/herself has to generate the room layout image using the button for adding rooms to the room layout image in the aforementioned Japanese Patent No. 5474238, placing that much more of a burden on the user. Also, the aforementioned Japanese Patent No. 5474238 requires the user to perform the operation of dragging and moving the unregistered device, meaning that the user him/herself performs the correlation between the unregistered device and the room, placing that much more of a burden on the user.

Also, in the aforementioned Japanese Patent No. 5474238, there may be cases where, at the time of dragging and moving the unregistered device, the user may inadvertently drop the device in a different room from the intended room. In this case, there may be cases where the room layout image needs to be reedited by moving the unregistered device from the different room to the intended room. Moreover, Japanese Patent No. 5474238 goes no further than disclosing a technology for editing the room layout image using the editing screen, and does not disclose how each device is to be displayed in an operating screen for operating the devices, using the edited room layout image, so the relationship between the edited room layout image and the operating screen for operating the devices is unclear. Accordingly, further improvement has been needed with the aforementioned Japanese Patent No. 5474238.

In light of the above consideration, the present inventor studied a control method of information devices where, although a display screen showing the room layout diagram of the building cannot be used in common among multiple users, a display screen can be generated showing a room layout diagram of the building which can be individually customized for each user extremely easily, and thus has arrived at the invention of the aspects in the present disclosure described below.

According to an aspect of the present disclosure, a method for controlling a computer of an information device, which connects to a network via which one or more subject devices are controlled, and which has a display, the method comprises:

displaying, on the display, a room selection screen for selection of a room where an unregistered first subject device is installed, in a case of managing using memory the unregistered first subject device as one of the one or more subject devices;

managing the unregistered first subject device as a registered first subject device by associating the unregistered first subject device with a first room, based on selection of the first room from the room selection screen;

generating a room list screen including a first room icon representing the first room to display the room list screen on the display; and in a case of detecting selection of the first room icon from the room list screen, displaying on the display a first device list screen in replacement of the room list screen, wherein the first device list screen relates to the first room and includes a first operating screen for operating the registered first subject device, According to this aspect, in a case of managing using memory an unregistered first subject device as one or more subject devices, a room selection screen for selection of a room where an unregistered first subject device is installed is displayed on the display, so that the first room is selected in the room selection screen. Thus, the first room is managed in an associated manner with the unregistered first subject device. That is to say, all the user has to do in the room selection screen is simply to select the first room, so operations of dragging the unregistered first subject device, moving the unregistered first subject device to the first room, and dropping the unregistered first subject device on the first room, are not required. Moreover, in Japanese Patent No. 5474238 the user has to generate a room layout image before dragging the unregistered first subject device.

Also, a room list screen including a first room icon representing the first room is displayed. Accordingly, information relating to the first subject device is not displayed, but the room list screen including the first room icon is displayed in a state where the unregistered first subject device is associated with the first room. Thus, the room list screen can be easily generated with the unregistered first subject device and the first room associated. That is to say, when the room list screen is displayed, associating of the unregistered first subject device with the first room has already been finished. Accordingly, the burden on the user can be markedly reduced as compared to the technology where a room layout image is displayed, and thereafter the room layout image is used to correlate devices and rooms, as in Japanese Patent No. 5474238.

Also, in a case of detecting selection of the first room icon from the room list screen, a device list screen relating to the first room and including an operating screen for operating the registered first subject device is displayed on the display in replacement of the room list screen. That is to say, the screen switches from the room list screen to the device list screen including the operating screen. Accordingly, the user can efficiently search for subject devices regarding which operating is desired, in increments of rooms using the room list screen.

Thus, according to the above aspect, the room list screen can be easily generated with the unregistered first subject device and the first room correlated, and the user can efficiently search for operating screens of subject devices regarding which operating is desired, in increments of rooms, using the room list screen.

For example, a control command for controlling the registered first subject device may be output to the network, based on an operation using the first operating screen.

For example, the method further comprises:

displaying the room selection screen on the display for selection of a room where an unregistered second subject device is installed, in a case of managing using the memory the unregistered second subject device as one of the one or more subject devices;

managing the unregistered second subject device as a registered second subject device by associating the unregistered second subject device with the first room, based on selection of the same room as the first room from the room selection screen, to display on the display the room list screen including the first room icon, and in a case of detecting selection of the first room icon from the room list screen, generating the first device list screen which relates to the first room and includes i) the first operating screen and ii) a second operating screen for operating the registered second subject device, to display on the display the device list screen, in replacement of the room list screen.

Accordingly, the first room icon representing the first room is already included in the room list screen, by relationship with the first device. Accordingly, when the second subject device is to be installed in the same room as the first room, there is no need to include another first room icon separately in the room list screen. In this case, the room list screen including the first room icon is displayed on the display without change.

On the other hand, the device list screen includes not only the first operating screen for operating the first subject device but also the second operating screen for operating the second subject device, in correlation with the first room. Accordingly, in a case where the second subject device is installed in the same room as the first room, the room list screen can be used as it is, and the device list screen can be easily changed to add the second subject device in relation with the first room.

For example, the method further comprises:

displaying the room selection screen on the display for selection of a room where an unregistered second subject device is installed, in a case of managing using the memory the unregistered second subject device as one of the one or more subject devices, managing the unregistered second subject device as a registered second subject device by associating the unregistered second subject device with a second room which is different from the first room, based on selection of the second room from the room selection screen;

generating the room list screen including i) the first room icon and ii) a second room icon which represents the second room, to display the room list screen on the display, in a case of detecting selection of the second room icon from the room list screen, displaying on the display a second device list screen in replacement of the room list screen, wherein the second device list screen relates to the second room and includes a second operating screen for operating the second registered subject device.

Accordingly, in a case where the second subject device is installed in a second room different from the first room, a second room icon representing the second room is included in the room list screen separately from the first room icon. In this case, the room list screen is changed so as to include the first room icon and the second room icon, and is displayed on the display.

Also, the device list screen includes the first operating screen for operating the first subject device, correlated with the first room, and the second operating screen for operating the second subject device, correlated with the second room.

Accordingly, in a case where the second subject device is installed in a second room different from the first room, the room list screen is changed. Also, the device list screen displays the first operating screen in relation to the first room, and the second subject device in relation to the second room. Thus, the second subject device can be easily added, in a suitable and appropriate form, depending on whether the room where the second subject device is installed is the same or not the same as the first room.

For example, the method further comprises:

displaying on the display the room list screen for operating the registered first subject device, when selection of a menu icon is detected from a menu screen for operating any of the one or more subject devices and when it is determined, using memory storing room information representing each room where each of the one or more subject devices is installed, that the one or more subject devices are installed in a plurality of rooms, and, displaying the device list screen on the display in replacement of the room list screen by selection of the first room icon on the room list screen; and displaying on the display the device list screen in replacement of the menu screen for operating the registered first subject device, when selection of the menu icon is detected from the menu screen and when the one or more subject devices are installed is only the first room.

Accordingly, in a case where there is only the first room icon included in the room list screen, displaying of the room list screen is skipped, and the device list screen is displayed without displaying the room list screen. Accordingly, in a case where there is only the first room icon included in the room list screen, the user is spared the trouble of selecting the first room icon included in the room list screen, and thus the operating burden can be reduced.

Note that the memory configuration may be such that manages information representing rooms where any of the one or more subject devices are installed. That is to say, information is managed regarding rooms where any of the subject devices are installed is managed, and information regarding rooms where none of the subject devices are installed is not managed. For example, if there are no subject devices managed correlated with the bedroom, information including the bedroom is not included in the memory.

For example, the method further comprises:

displaying on the display the room list screen for operating the registered first subject device, when selection of a menu icon is detected from a menu screen for operating any of the one or more subject devices and when it is determined, using memory storing room information representing whether or not each of the subject devices is installed in each room, that the one or more subject devices are installed is in a plurality of rooms, and displaying the device list screen on the display in replacement of the room list screen by selection of the first room icon on the room list screen; and displaying on the display the device list screen in replacement of the menu screen for operating the registered first subject device, when selection of the menu icon is detected from the menu screen and when the one or more subject devices are installed is only the first room.

Accordingly, in a case where there is only one room icon included in the room list screen, displaying of the room list screen is skipped, and the device list screen is displayed without displaying the room list screen. Accordingly, in a case where there is only the first room icon included in the room list screen, the user is spared the trouble of selecting the first room icon included in the room list screen, and thus the operating burden can be reduced.

Note that the memory configuration may be such that manages information representing whether or not any of the subject devices have been installed in the rooms. That is to say, information is managed regarding rooms where any of the subject devices are installed, and information regarding rooms where none of the subject devices are installed is also managed. For example, all rooms are managed beforehand using memory, and when the number of subject devices installed in each room increases, the number of installed subject devices increases from 0 to 1, or from 1 to 2, for example.

For example, the room list screen does not include a room icon representing a room which is not associated with any of the one or more subject devices.

In this case, regarding rooms which do not lead to operating screens for operating any of the subject devices, room icons representing such rooms are not displayed on the room list screen. In a case of displaying a room icon not leading to an operating screen for operating any one of the subject devices on the room list screen, for example, the user selecting such a room icon from the room list screen will display an empty device list screen not including any operating screens. This will have made the user perform useless operations. According to the above aspect, the user can be prevented from needlessly selecting such room icons.

For example, the method further comprises:

comparing first device information representing each of the one or more subject devices acquired via the network, with second device information representing each of the one or more subject devices managed as registered subject devices in the memory;

when an identifier identifying the unregistered first subject device is not included in the second device information, displaying the room selection screen on the display, to select the room where the unregistered first subject device is installed. Accordingly, unregistered subject devices can be comprehended without missing any.

For example, the method further comprises:

comparing first device information representing each of the one or more subject devices acquired via the network, with second device information representing each of the one or more subject devices managed as registered subject devices in the memory;

when one or more identifiers identifying one or more unregistered subject devices are not included in the second device information, displaying on the display a subject device list screen including a subject device list that represents the one or more unregistered subject devices; and when selection of the unregistered first subject device from the subject device list screen is detected, displaying on the display the room selection screen, for selection of the room where the unregistered first subject device is installed.

Accordingly, the user selects the unregistered first subject device, using a registered device list screen including the one or more unregistered subject devices. Accordingly, the user simply has to select the unregistered first subject device. That is to say, operations of dragging the unregistered first subject device, moving the unregistered first subject device to the first room, and dropping the unregistered first subject device on the first room, are not required. Thus, the load on the user can be markedly reduced as compared to the technology in Japanese Patent No. 5474238.

The information device may manage log information of the one or more subject devices. The method comprising: determining whether or not the power is on at the one or more subject devices out of subject devices installed in the first room, based on the log information; and when it is determined that power is on at the one or more subject devices installed in the first room, displaying in an active manner the first room icon representing the first room in the room list screen.

Accordingly, in a case where the power of one or more subject devices out of the subject devices installed in the first room is on, an active display is made for the first room icon representing the first room in the room list screen. Accordingly, the user can instantly distinguish which rooms have subject devices installed of which the power is on, simply by looking at the room list screen. Accordingly, subject devices with the power on can be efficiently found, so forgetting to turn off the power to subject devices which need to be turned off can be effectively prevented.

The information device may manage log information of the one or more subject devices. The method comprising: determining whether or not the power is off at all subject devices installed in the first room, based on the log information; and when it is determined that power is off at all subject devices installed in the first room, display in an inactive manner the first room icon representing the first room in the room list screen.

Accordingly, in a case where the power is off at all subject devices installed in the first room, inactive display is performed of the first room icon representing the first room in the room list screen. Thus, the user can instantly distinguish which rooms have subject devices installed of which the power is not on, simply by looking at the room list screen. Accordingly, unnecessarily selecting room icons representing rooms where only subject devices with the power not turned on are installed can be prevented, so the waste of selecting room icons which do not need to be selected can be effectively prevented.

For example, the displaying of the first room icon in the inactive manner may include displaying of the first room icon in a grayout state.

For example, the method further comprises:

displaying, on the display, a subject device list screen representing the one or more subject devices, based on device information representing each of the one or more subject devices registered in the memory;

displaying, on the display, the room selection screen for selection of the room where the first subject device is installed, when selection of the first subject device is detected from the subject device list screen;

re-managing, in a case where the first registered subject device is managed in the memory as one registered subject device associated with the first room where the first device is installed, the registered first subject device by re-associating the registered first subject device with a second room different from the first room based on selection of the second room using the room selection screen, to display, on the display, the room list screen including a second room icon representing the second room; and when detecting selection of the second room icon representing the second room from the room list screen, displaying, on the display, the device list screen that relates to the second room and that includes the first operating screen for operating the registered first subject device, in replacement of the room list screen.

Accordingly, in a case where the room where an already-registered first subject device is installed is changed, a room selection screen for selecting the room where the first subject device has been installed is displayed on the display, and the second room after changing, which is different from the first room, is selected from the room selection screen. Accordingly, the second room is managed having been newly associated with the first subject device. That is to say, the user simply has to select the second room at the room selection screen, so operations of dragging the unregistered first subject device, moving the first subject device from the first room to the second room, and dropping the first subject device on the second room, are not required.

Also, a room list screen including a second room icon representing the second room is displayed. Accordingly, information relating to the first subject device is not displayed, but the room list screen including the second room icon is displayed in a state where the first subject device is associated with the second room. Thus, the room list screen can be easily generated with the first subject device and the second room associated. That is to say, when the room list screen is displayed, associating of the first subject device with the second room has already been finished. Accordingly, the burden on the user can be markedly reduced as compared to the technology where a room layout image is displayed, and thereafter the room layout image is used to correlate devices and rooms, as in Japanese Patent No. 5474238.

Also, in a case of detecting selection of the second room icon from the room list screen anew, a device list screen relating to the second room and including an operating screen for operating the first subject device is displayed on the display instead of the room list screen. That is to say, the screen switches from the room list screen to the device list screen including the operating screen. Accordingly, the user can efficiently search for subject devices regarding which operating is desired, in increments of rooms using the room list screen.

Thus, according to the present aspect, the room list screen can be easily generated with the first subject device and the second room associated, and the user can efficiently search for the operating screens for subject devices regarding which operating is desired, in increments of rooms, using the room list screen.

In a case where the first room is not managed to be associated with any of the one or more subject devices, the first room icon representing the first room may be arranged to not be displayed on the room list screen.

In a case where the first subject device (e.g., a lighting fixture) has been reinstalled from the first room (e.g., the living room) to the second room (e.g., a bedroom), the first subject device which had been managed to be associated with the first room is managed to be associated with the second room that is different from the first room. There may be cases where none of the subject devices are managed correlated in relation with the first room.

In this case, a room which had been managed to be associated with any one of the subject devices, but then later has come to be managed to be associated with none of the subject devices, does not lead to an operating screen for operating any of the subject devices. For example, in a case of displaying a room icon not leading to an operating screen for operating one any of the subject devices on the room list screen, the user selecting such a room icon from the room list screen will display an empty device list screen not including any operating screens. This will have made the user perform useless operations.

Accordingly, the room icon representing that room is deleted from the room list screen. Thus, the user can be prevented from needlessly selecting such room icons.

A control command for controlling the registered first subject device may be output to the network, based on an operation using the first operating screen.

According to another aspect, a non-transitory computer-readable recording medium stores a program executed at an information device, which connects to a network via which one or more subject devices are controlled, and which has a display.

The program causing a computer of the information device to:

display, on the display, a room selection screen for selection of a room where the unregistered first subject device is installed, in a case of managing using memory the unregistered first subject device as one of the one or more subject devices;

manage the unregistered first subject device as a registered first subject device by associating the unregistered first subject device with a first room based on selection of the first room from the room selection screen;

generate a room list screen including a first room icon representing the first room to display the room list screen on the display; and in a case of detecting selection of the first room icon from the room list screen, display, on the display, a device list screen in replacement of the room list screen, wherein the device list screen relates to the first room and includes a first operating screen for operating the registered first subject device.

Another aspect of the present invention is an information device, in which the program according to the above-described aspect is installed.

The information device may include a television receiver.

Embodiment

An embodiment of the present invention will be described with reference to the drawings. Note that the same components in the drawings will be denoted by the same reference numerals, and description thereof will be omitted.

A home controller which can singlehandedly control one or more devices will be described in the present embodiment. FIG. 1 is an overall configuration diagram of a home controller system to which the home controller according to the present disclosure has been applied. As illustrated in FIG. 1, the home controller system includes a home controller 100 (example of an information device) and devices 200 (examples of subject devices).

The home controller 100 and one or more devices 200 (e.g., device A and device B) are disposed within a house. The home controller 100 and the devices 200 perform communication with each other via a wired or wireless network, or a network including both cable and wireless. Examples of a cabled network which may be used include wired LAN according to the IEEE 802.3 series, and examples of a wireless network which may be used include wireless LAN according to the IEEE 802.11 series.

Note that the home controller 100 is not necessarily restricted to being in the house, and may be disposed outside the house. In this case, the user can control one or more devices 200 when away from home or the like.

A mobile information terminal such as a smartphone or tablet terminal or the like is employed as the home controller 100. Note however, that this is only an example, and a button-operated mobile information terminal such as a cellular telephone or the like may be employed as the home controller 100. Alternatively, a laptop personal computer or desktop personal computer may be employed as the home controller 100.

Figure 2:
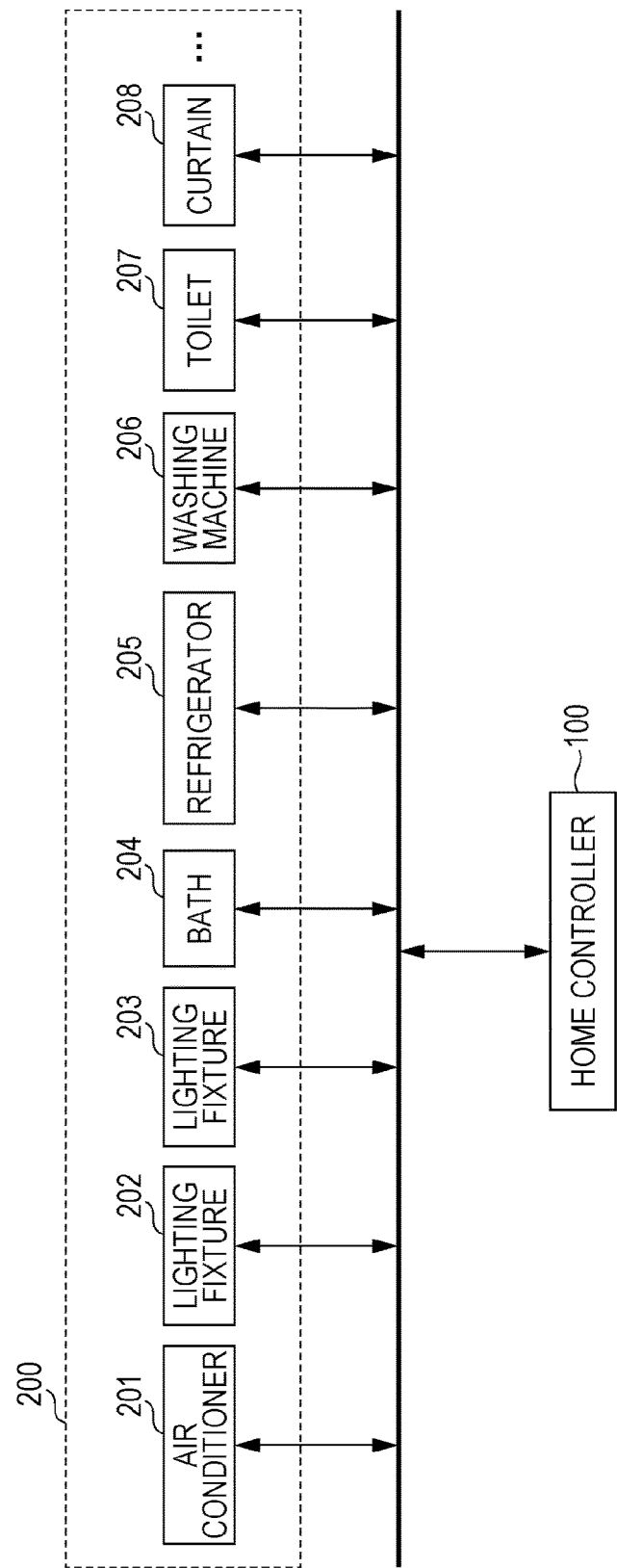
FIG. 2 is a diagram illustrating primary devices to be controlled by the home controller.

FIG. 2 is a diagram illustrating primary devices 200 to be controlled by the home controller 100. The home controller 100 controls devices 200 such as an air conditioning device (hereinafter referred to as "air conditioner") 201, lighting fixtures 202 and 203, a bath 204, a refrigerator 205, a washing machine 206, a toilet 207, a power curtain device 208, and so forth. There may be multiple devices 200 of the same type in the devices 200 which the home controller 100 controls, such as lighting fixtures 202 and 203.

Also, the devices 200 such as the air conditioner 201 and so forth illustrated in FIG. 2 are only exemplary, and devices 200 such as a television receiver (hereinafter referred to as "television"), a Blu-Ray recorder, an audio device, or the like, may be employed as devices 200. That is to say, any device may be employed as a device 200 as long as it is an electric device capable of communicating with the home controller 100. Although electric devices used in common homes have been illustrated in FIG. 2 as devices 200, the present disclosure is not restricted to this, and office equipment used in offices and the like may be employed. Examples of office equipment include printers, personal computers, scanners, copiers, and so forth. While a house is employed as an example of a building in the present disclosure, this is not restrictive, and a concrete building, schoolhouse, or the like, may be employed.

Figure 3:
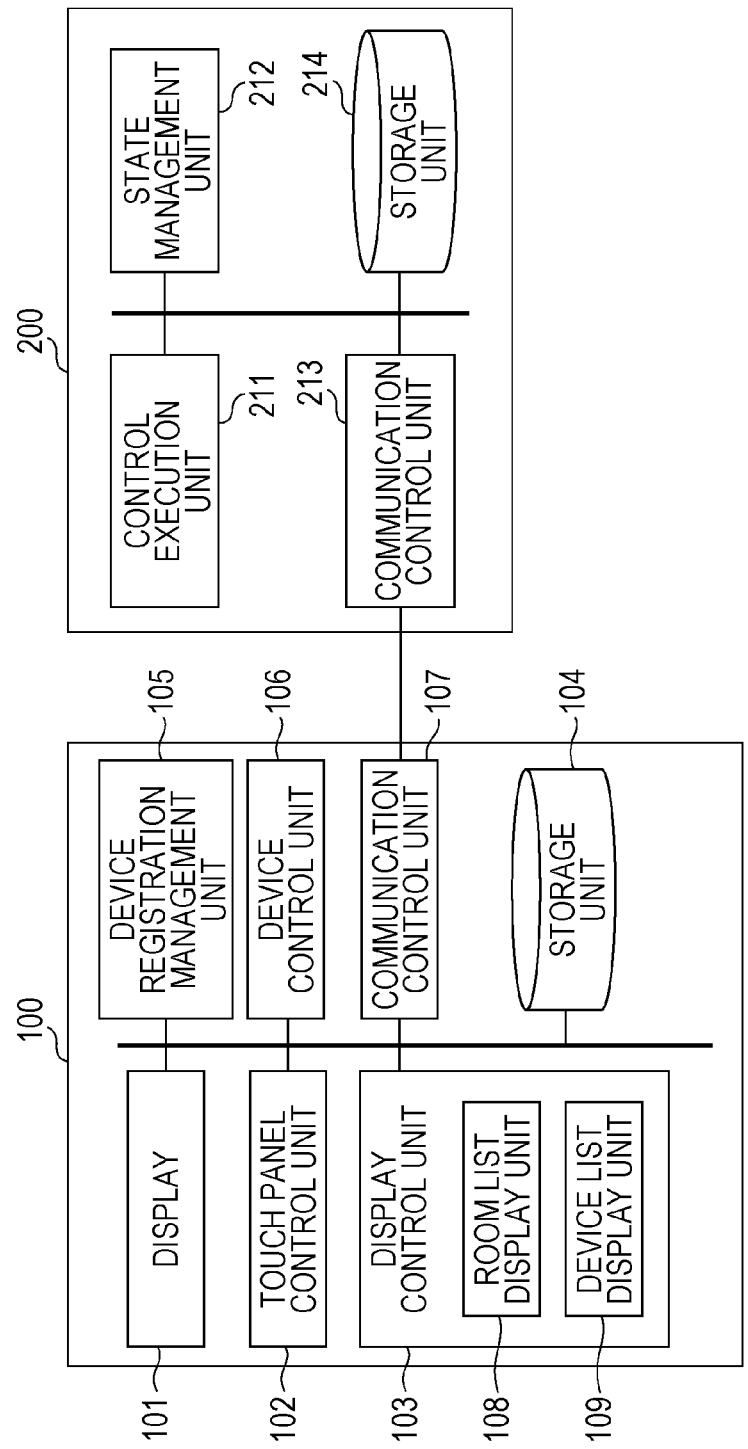
FIG. 3 is a block diagram illustrating an example of the configuration of the home controller and a device.

FIG. 3 is a block diagram illustrating an example of the configuration of the home controller 100 and the devices 200. The home controller 100 shown in FIG. 3 includes a display 101, a touch panel control unit 102, a display control unit 103, a storage unit 104, a device registration management unit 105, a device control unit 106, and a communication control unit 107.

The display 101 is configured including a touch panel display, for example, displaying a user interface for the user to operate the home controller 100 by, and so forth. The user can input various types of operations to the home controller 100 by touching the display 101.

Upon recognizing a user operation at the display 101, the touch panel control unit 102 interprets the content of the operation, and notifies the content of the operation to other components. For example, in a case where an object is displayed at the position on the display 101 where the user has tapped, the touch panel control unit 102 determines that the user has selected that object. Various graphical user interface (GUI) parts accepting user operations, such as buttons and so forth, are employed as objects.

Figure 12:
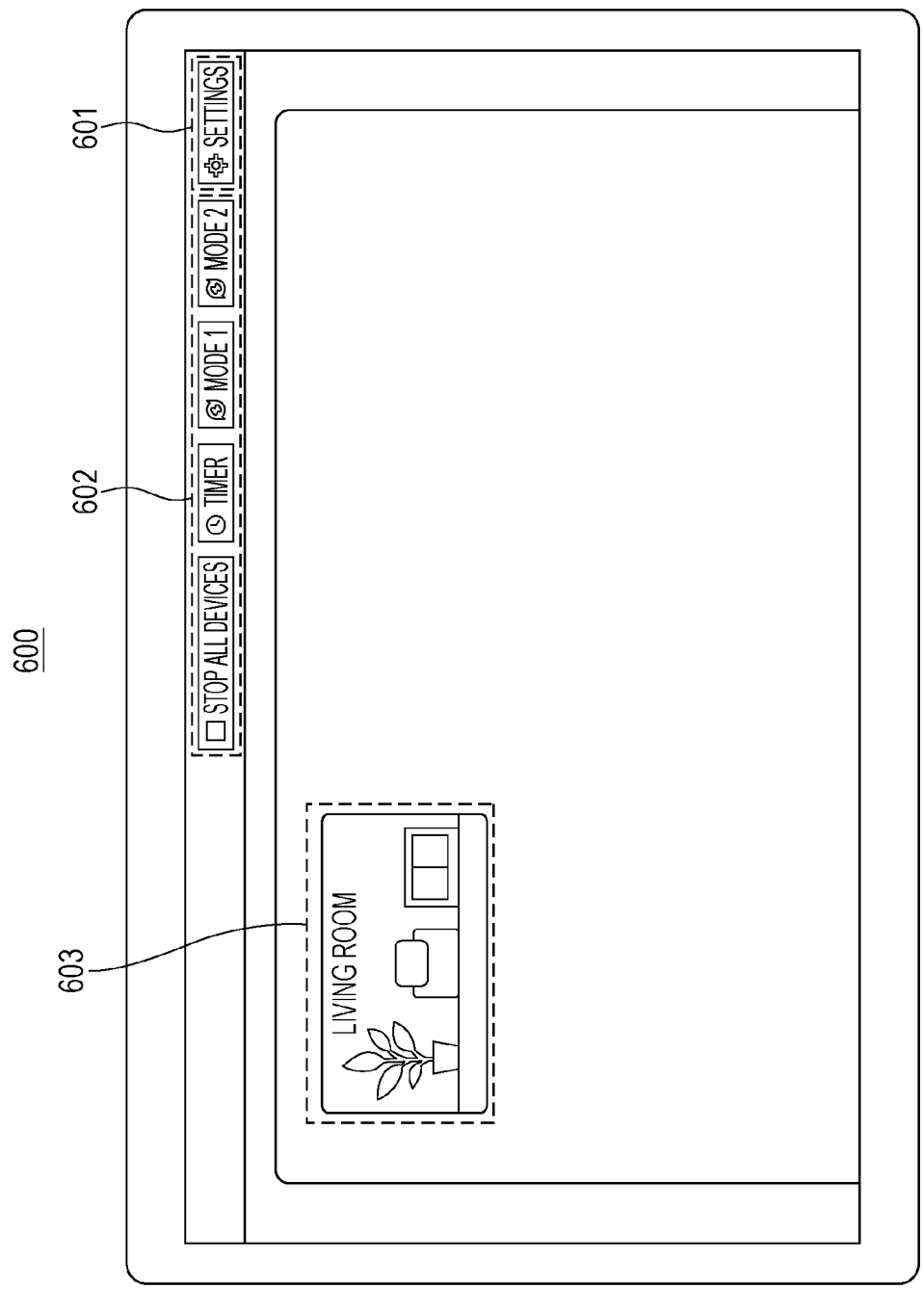
FIG. 12 is a diagram illustrating an example of a room list screen in a case where only one room has been correlated with a device.
Figure 13:
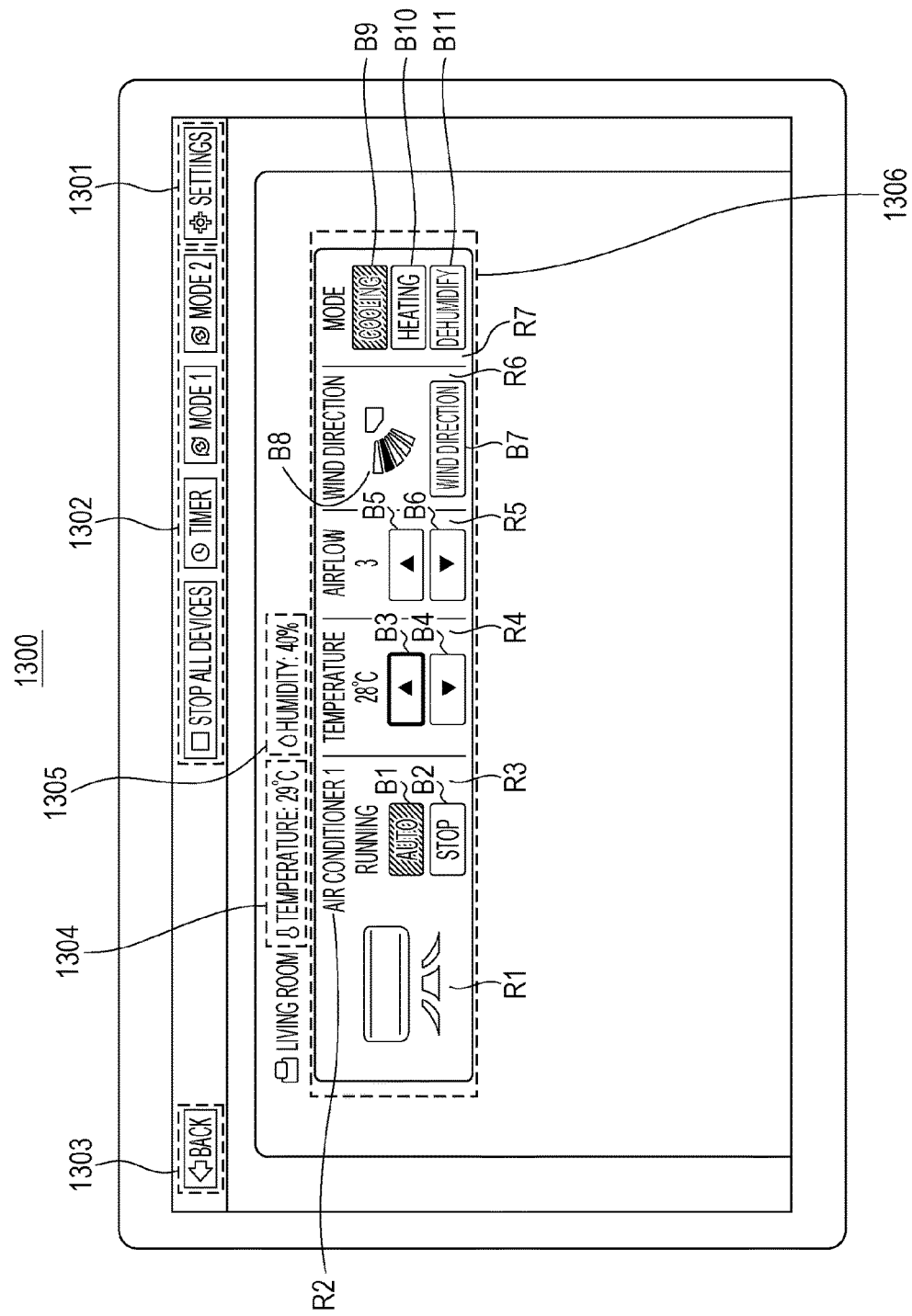
FIG. 13 is a diagram illustrating an example of a device list screen.
Figure 14:
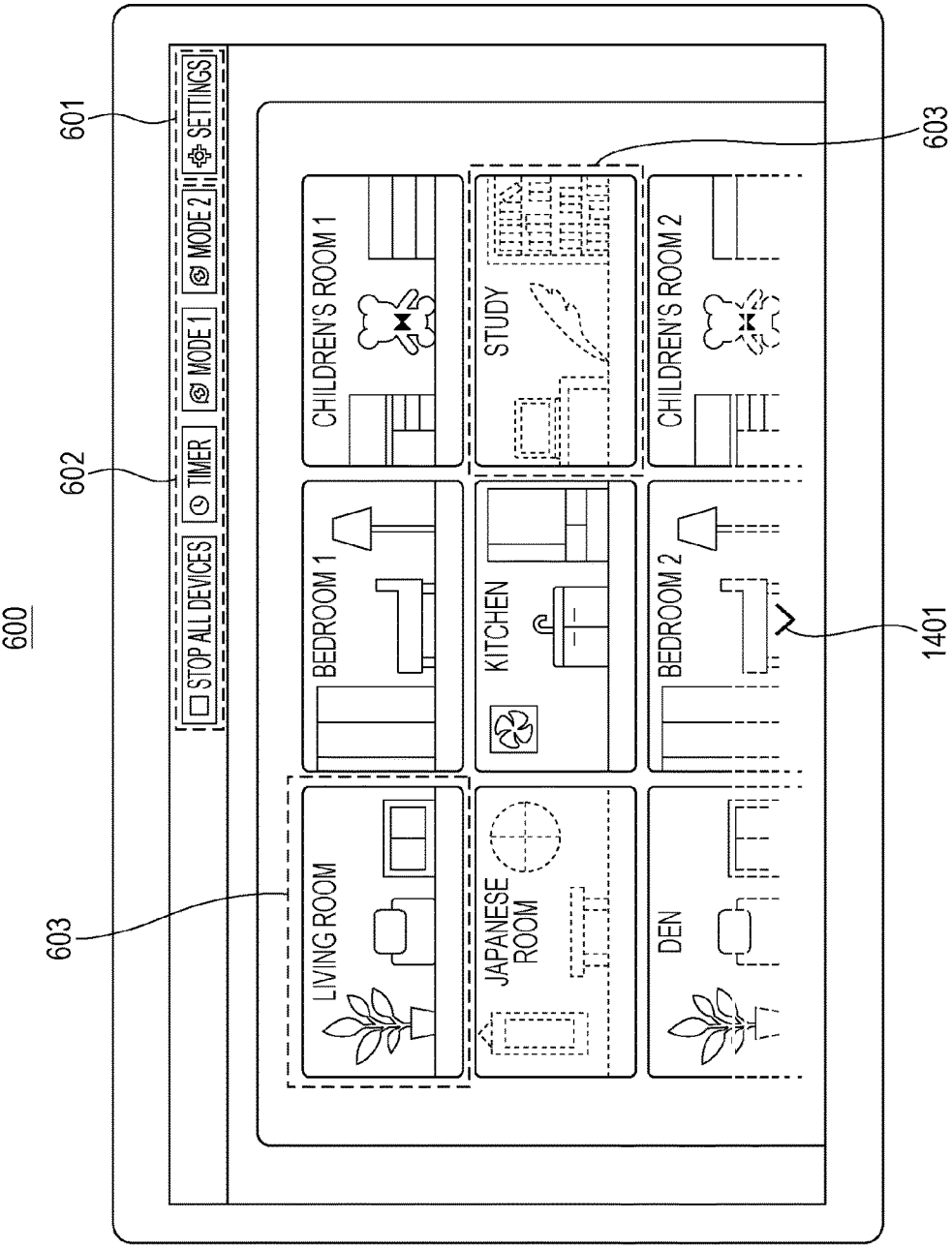
FIG. 14 is a diagram illustrating an example of a room list screen in a case where there are multiple rooms which have been correlated with devices.

The display control unit 103 generates a GUI for the home controller 100, to be displayed on the display 101. In the present disclosure, the display control unit 103 includes a room list display unit 108 and a device list display unit 109. The room list display unit 108 primarily governs display control of a room list screen 600 such as illustrated in FIG. 12 or FIG. 14. The device list display unit 109 primarily governs display control of a device list screen 1300 such as illustrated in FIG. 13.

The storage unit 104 is configured using a non-volatile storage device, for example, and stores information necessary for operations of the home controller 100, such as a room list 2300 (see FIG. 23), a room list 2400 (see FIG. 24), a device list 2500 (see FIG. 25), and so forth, which are managed by the device registration management unit 105.

The device registration management unit 105 follows user operations to correlate the devices 200 and rooms, creates a room list 2300 or room list 2400, and manages the room list 2300 or room list 2400. Upon a device 200 being connected to the network in the house, the device registration management unit 105 detects that device 200. The device registration management unit 105 also manages devices 200 to be controlled using a device list 2500 stored in the storage unit 104.

The device control unit 106 issues control commands to the devices 200. The communication control unit 107 controls communication between the home controller 100 and the devices 200. The communication control unit 107 also accepts transmission requests for various types of data from other blocks, and transmits these to the devices 200, and also receives data transmitted from the devices 200 and hands this data to the relevant blocks.

Note that a normal display may be employed for the display 101, instead of a touch panel display. In this case, the user may move a pointer displayed on the display 101 using an external input device such as a mouse or the like that is not illustrated, click on the intended object, and input selection instruction of objects. That is to say, the series of operations performed by the user touching the display 101 in the present disclosure can be substituted by operations of moving the pointer using an external input device such as a mouse, clicking, and so forth.

The device 200 has a control execution unit 211, a state management unit 212, a communication control unit 213, and a storage unit 214, as illustrated in FIG. 3. The control execution unit 211 receives control commands from the home controller 100, and controls the device 200 according to the received control commands. The content of control of the device 200 by the control execution unit 211 depends on the type of the device 200. For example, if the device 200 is a lighting fixture, the control execution unit 211 turns the lighting fixture on/off. The control execution unit 211 also transmits the results of executing the control commands, and the state of the device 200, to the home controller 100.

The state management unit 212 manages the state of the device 200. The content of management of the device 200 by the state management unit 212 depends on the type of the device 200. For example, in a case where the device 200 is a lighting fixture, the state management unit 212 manages whether the lighting fixture is currently in an on state or an off state. The storage unit 214 stores information relating to the state of the devices 200 which the state management unit 212 is managing.

The communication control unit 213 controls communication between the devices 200 and the home controller 100. The communication control unit 213 also accepts transmission requests for various types of data from other blocks, and transmits these to the home controller 100, and also receives data transmitted from the home controller 100 and hands this data to the relevant blocks.

Figure 4:
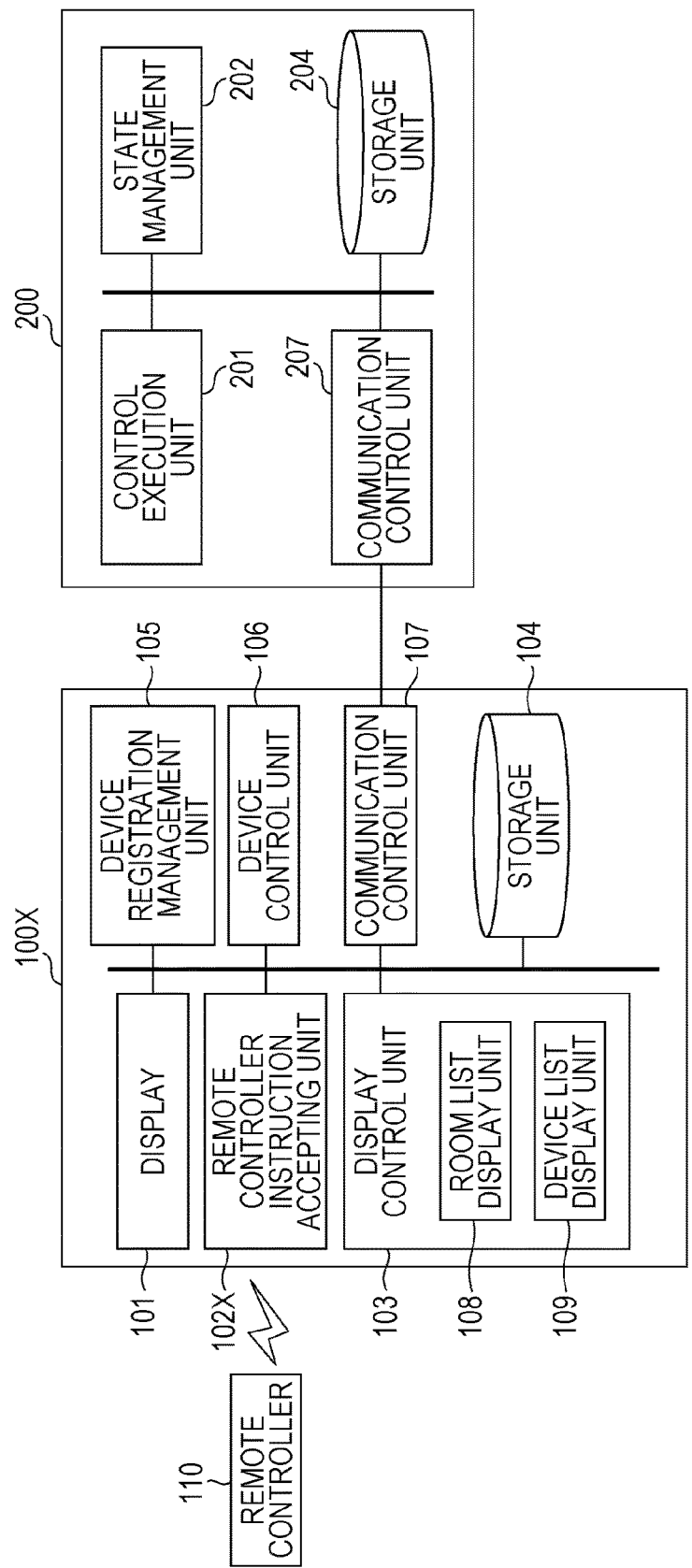
FIG. 4 is a block diagram illustrating an example of the configuration of a television and a device in a case where the television has been employed as the information device.

While an example of the home controller 100 has been illustrated in FIG. 3 as an example of the information device, the present disclosure is not restricted to this, and a television 100X may be employed as an example of the information device, as illustrated in FIG. 4.

FIG. 4 is a block diagram illustrating an example of the configuration of the television 100X and a device 200 in a case where the television 100X has been employed as the information device. The points of difference in FIG. 4 as to FIG. 3 are that a remote controller instruction accepting unit 102X is provided instead of the touch panel control unit 102, and that the television 100X has a remote controller 110.

A television capable of receiving digital terrestrial broadcasting, for example, can be employed as the television 100X. The remote controller 110 is a remote controller which is used with the television capable of receiving digital terrestrial broadcasting. This sort of remote controller 110 has a direction buttons for up, down, left, right, to move a cursor displayed on the display 101, and an OK button to finalize the selection made by the user, and so forth.

Accordingly, this remote controller 110 can handle the same functions as the touch panel display. For example, in a case of selecting one out of multiple objects, the user of a touch panel display inputs a tapping operation on the one object to be selected. On the other hand, the user of the remote controller 110 can select one object by positioning the cursor on the one object to be selected, and pressing the OK button. Thus, the remote controller 110 has direction buttons and an OK button, so the user can operate a GUI by making a certain amount of changes to the GUI designed from the touch panel display. Accordingly, the television 100X is employed as an example of the information device, as well as the home controller 100. In this case, the television 100X serves the functions of the home controller 100.

The remote controller instruction accepting unit 102X is configured including a communication device that receives instruction signals transmitted from the remote controller 110, and a processor or the like which decodes the instruction signals received by the communication unit, for example. The remote controller instruction accepting unit 102X receives instruction signals representing instructions which the user has given as to the television 100X by operating the remote controller 110, and decodes the received instruction signals. While the processing of the remote controller instruction accepting unit 102X will not be described in detail hereinafter, since description will be made primarily regarding the home controller 100, the remote controller instruction accepting unit 102X serves the same role as the touch panel control unit 102.

Figure 5:
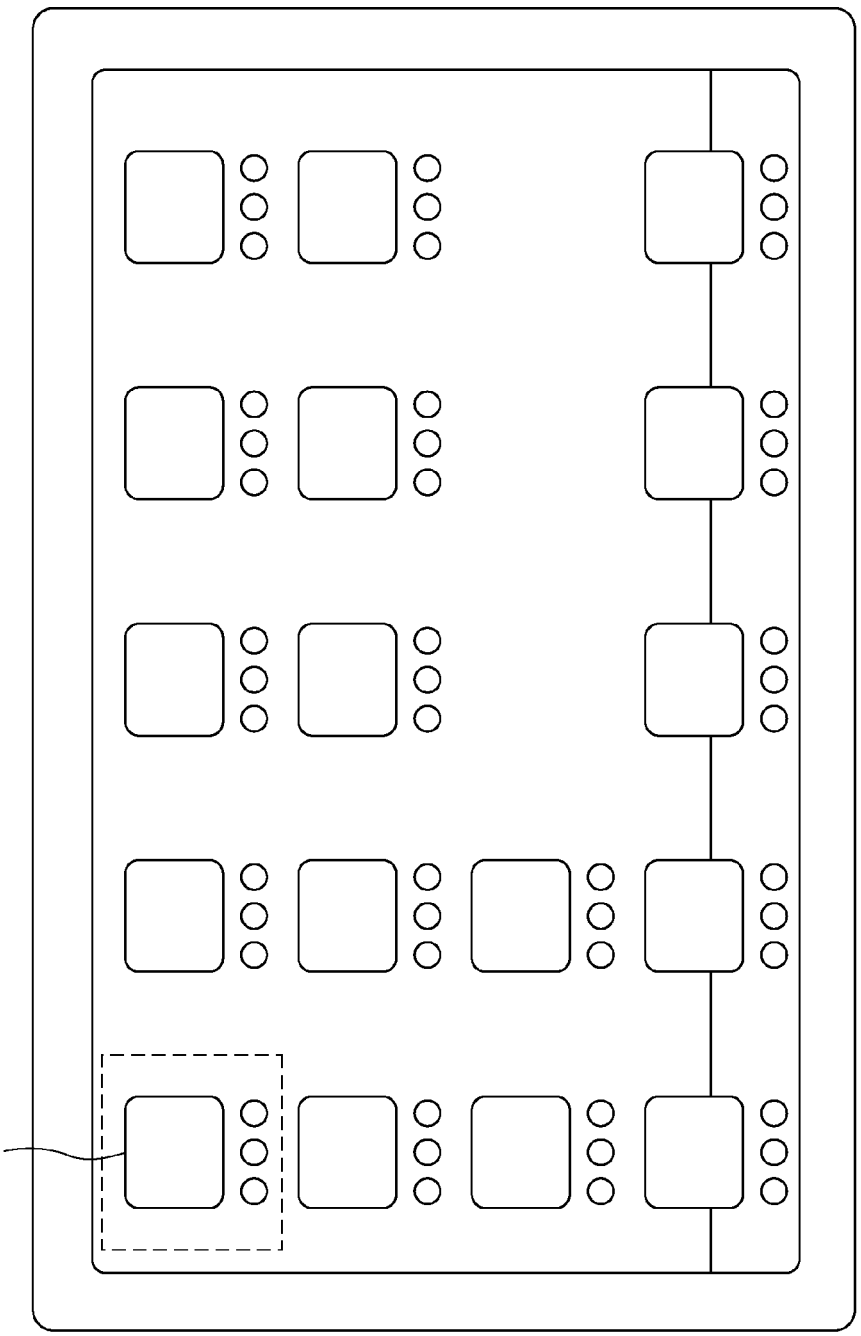
FIG. 5 is a diagram illustrating an example of an application list screen.

FIG. 5 is a diagram illustrating an example of an application list screen 500. The application list screen 500 (an example of a menu screen) is a home screen displayed on the display of a standard smartphone or tablet terminal. A matrix of one or more icons to execute one or more applications is displayed on the application list screen 500. A home controller application icon 501 to execute a home controller application which causes the computer to function as the home controller 100 is included in the one or more icons. In the example in FIG. 5, the home controller application icon 501 is situated to the left side. Upon the touch panel control unit 102 detecting an operation of the home controller application icon 501 being selected, the room list display unit 108 of the display control unit 103 displays the room list screen 600 illustrated in FIG. 6 on the display 101.

Figure 6:
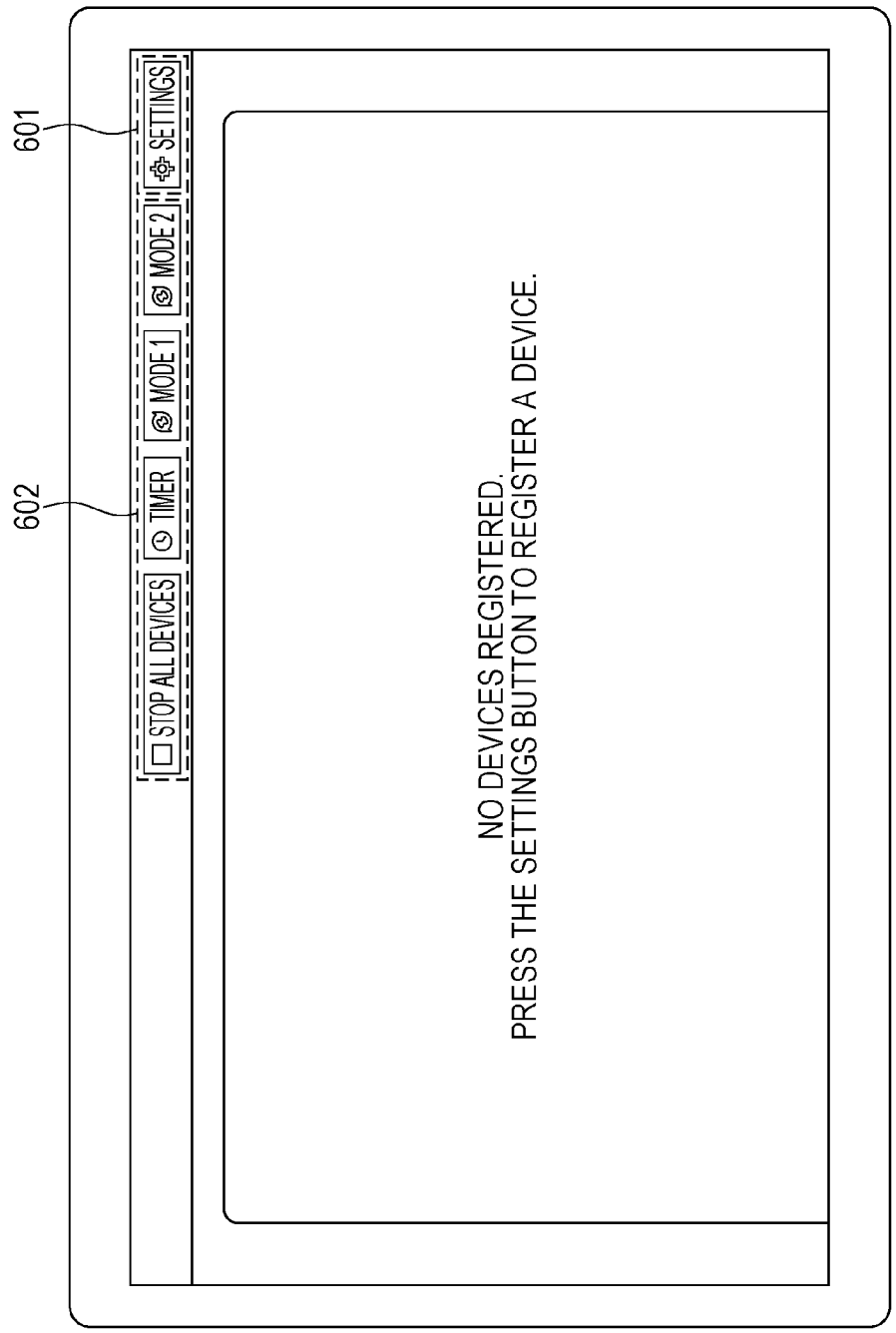
FIG. 6 is a diagram illustrating an example of a room list screen in a case where devices are not registered at the home controller.

FIG. 6 is a diagram illustrating an example of a room list screen 600 in a case where there are no devices 200 registered at the home controller 100. The room list screen 600 is a screen displaying a list of icons (room icons) correlated with devices 200 already registered at the home controller 100.

In the room list screen 600 in FIG. 6, there are no devices 200 registered at the home controller 100, and no rooms correlated with a device 200. Accordingly, a message "NO DEVICES REGISTERED. PRESS THE SETTINGS BUTTON TO REGISTER A DEVICE." is displayed at the middle of the screen in the room list screen 600 in FIG. 6, prompting the user to register a device 200.

Batch device operation buttons 602 and a settings button 601 are placed at the top of the room list screen 600. The batch device operation buttons 602 are to operate all devices set in the house of the user at once. In the example in FIG. 6 four batch device operation buttons 602 of "STOP ALL DEVICES", "TIMER", "MODE 1", and "MODE 2" are provided as the batch device operation buttons 602. Control patterns of all devices 200 installed in the house are registered in each of these four batch device operation buttons 602 beforehand. For example, a control pattern is registered as the control pattern for the "STOP ALL DEVICES" batch device operation button 602 where all devices 200 are turned off at once, except for devices to remain in an on state at all times like the refrigerator. Accordingly, when the user selects the "STOP ALL DEVICES" batch device operation button 602, all devices 200 other than devices 200 to be kept on at all times are set to an off state all at once.

The settings button 601 is a button to transition the home controller 100 to a phase for registering devices 200 at the home controller 100. Upon the touch panel control unit 102 detecting an operation of selecting the settings button 601, the device list display unit 109 of the display control unit 103 displays a subject device list screen 700 illustrated in FIG. 7 on the display 101.

Figure 7:
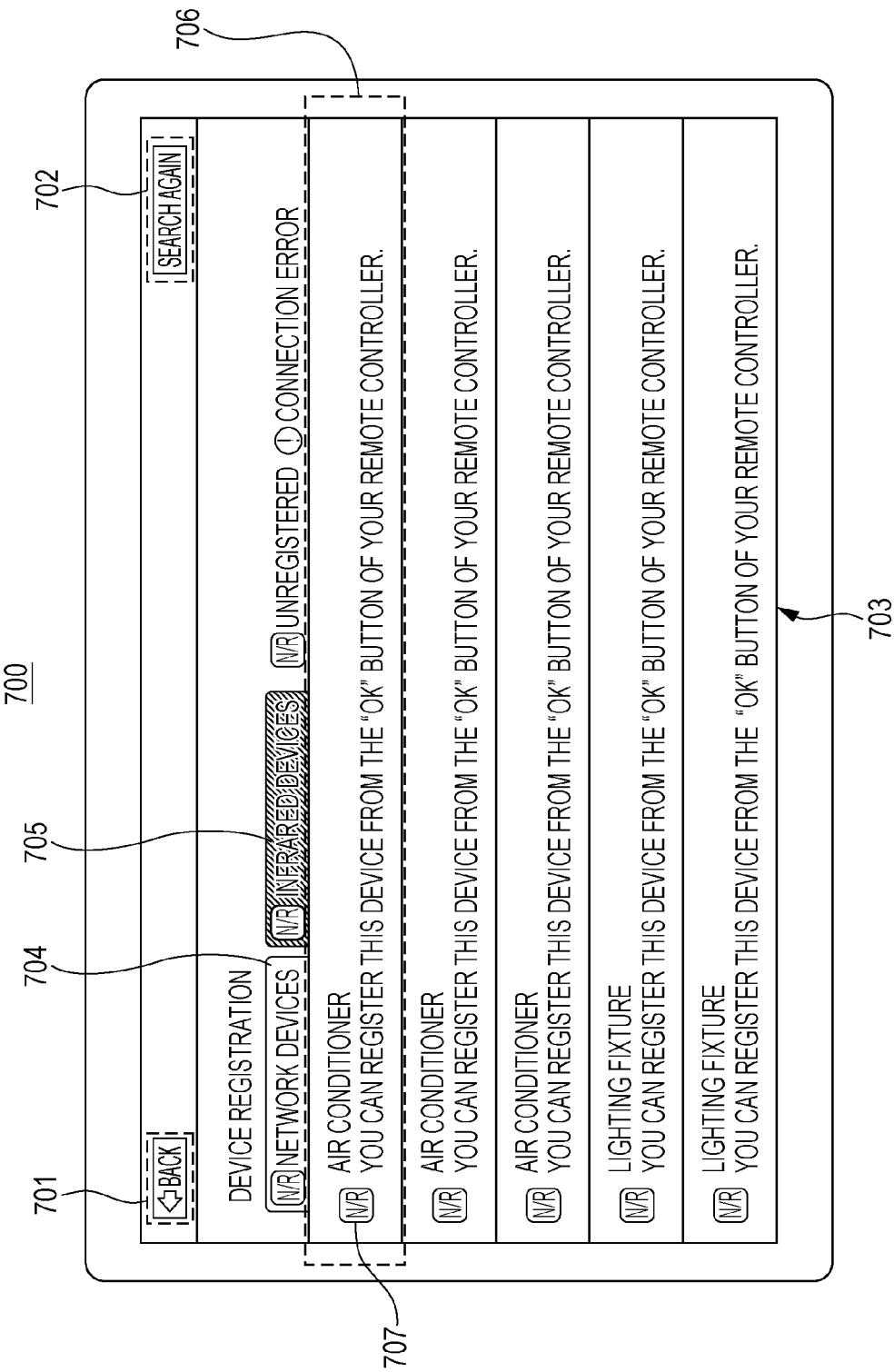
FIG. 7 is a diagram illustrating an example of subject devices.

FIG. 7 is a diagram illustrating an example of the subject device list screen 700. The subject device list screen 700 includes a device list display space 703 for displaying a list of the devices 200 installed in the house. The device list display space 703 displays a list of devices 200 which have responded to a device search request transmitted from the home controller 100. That is to say, devices 200 which the home controller 100 has detected are displayed as a list in the device list display space 703.

The device list display space 703 has one device display space 706 provided for each device. In the example in FIG. 7, three air conditioners and two lighting fixtures have responded, so five device display spaces 706 corresponding to the five devices 200 are displayed in the device list display space 703. Also, each of these five devices 200 is unregistered at the home controller 100, so the device display space 706 has a mark 707 displayed indicating that these are unregistered. Further, a message "YOU CAN REGISTER THIS DEVICE FROM THE "OK" BUTTON OF YOUR REMOTE CONTROLLER." is displayed in each device display space 706 for each of these five devices 200, prompting the user to register the device 200.

A tab 704 that says "NETWORK DEVICES" and a tab 705 that says "INFRARED DEVICES" are situated at the top of the device list display space 703. When a user selects the tab 704, a list is displayed in the device list display space 703 of the devices 200 that are connected to the home controller 100 via network such as a local area network (LAN) or the like. On the other hand, when a user selects the tab 705, a list is displayed in the device list display space 703 of the devices 200 that are connected to the home controller 100 via infrared communication.

While three air conditioners and two lighting fixtures are displayed as a list in the device list display space 703 in the example illustrated in FIG. 7, if the home controller 100 detects other devices 200 these devices 200 also are displayed in the device list display space 703. In a case where the number of devices 200 that the home controller 100 has detected is great, the device list display space 703 cannot display the devices 200 which the home controller 100 has detected all at once. In this case, the device list display unit 109 may provide a scroll button to the device list display space 703, so as to perform a scrolling display in the vertical direction for the device list display space 703, in accordance with the amount of operation of the scroll button. Thus, the user can display devices 200 that were not displayed on the device list display space 703, and can confirm whether or not the devices are unregistered.

A search-again button 702 is displayed at the upper right of the subject device list screen 700, for causing the home controller 100 to search for devices 200 again. Upon the user selecting the search-again button 702, the device registration management unit 105 transmits a device search request to the network again, and executes a search for devices 200. The devices 200 detected by this search are displayed as a list in the device list display space 703, thereby updating the device list display space 703.

A back button 701 provided to the upper left of the subject device list screen 700 is a button for returning the current display screen on the display 101 to the display screen that had been displayed one screen prior. In the example in FIG. 7, the screen which had been displayed prior to the subject device list screen 700 being displayed is the room list screen 600 illustrated in FIG. 6, so when the user selects the back button 701, the display 101 displays the room list screen 600 illustrated in FIG. 6.

Figure 8:
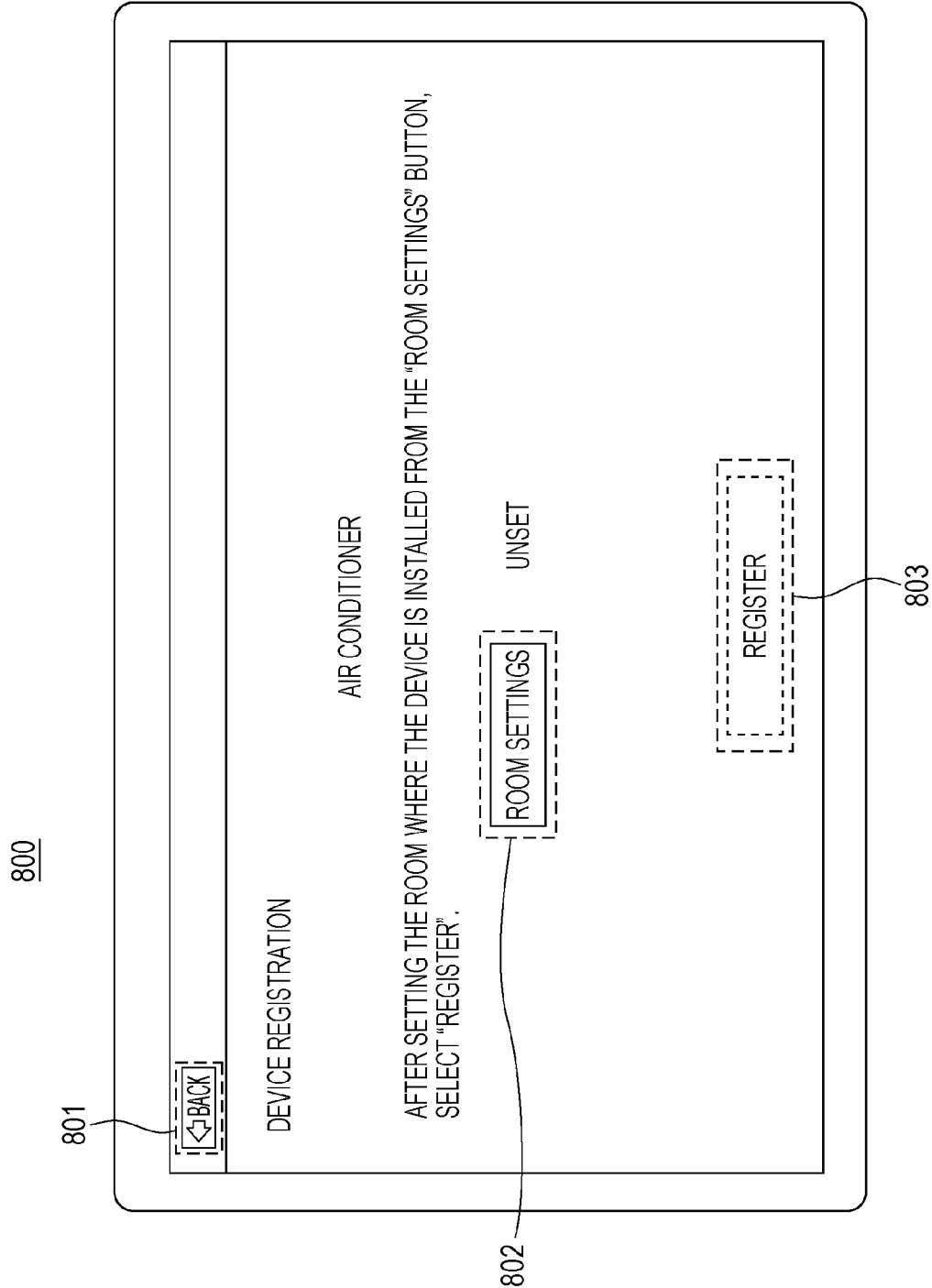
FIG. 8 is a diagram illustrating an example of a device registration screen.

Upon the user selecting a device 200 to be registered from the list display of unregistered devices 200 in the device list display space 703, the room list display unit 108 displays a device registration screen 800 on the display 101, as illustrated in FIG. 8. The user may select the device 200 to be registered by tapping on the device display space 706 corresponding to the device 200 to be registered. In a case where the television 100X is used as the information device, the user may use the remote controller 110 to position the cursor on the device display space 706 corresponding to the device to be registered, and press the OK button on the remote controller 110, thus selecting the device 200 to be registered.

FIG. 8 is a diagram illustrating an example of the device registration screen 800. The device registration screen 800 is for registering one device 200 to be registered at the home controller 100. In the example in FIG. 8, the air conditioner displayed in the first-row device display space 706 in the subject device list screen 700 illustrated in FIG. 7 has been selected by the user, thereby bringing up the device registration screen 800. Accordingly, the device registration screen 800 in FIG. 8 says "AIR CONDITIONER". Accordingly, the user can confirm that the device 200 to be registered is the air conditioner, thereby preventing another device 200 from being registered.

A message "AFTER SETTING THE ROOM WHERE THE DEVICE IS INSTALLED FROM THE 'ROOM SETTINGS' BUTTON, SELECT 'REGISTER'." is displayed below the display "AIR CONDITIONER" in the device registration screen 800, informing the user that the device 200 and the room can be correlated by operating a room selection screen display button 802 and a device registration button 803. In a case where the user selects the back button 801 in FIG. 8, the display screen of the display 101 returns to the subject device list screen 700 illustrated in FIG. 7.

Figure 9:
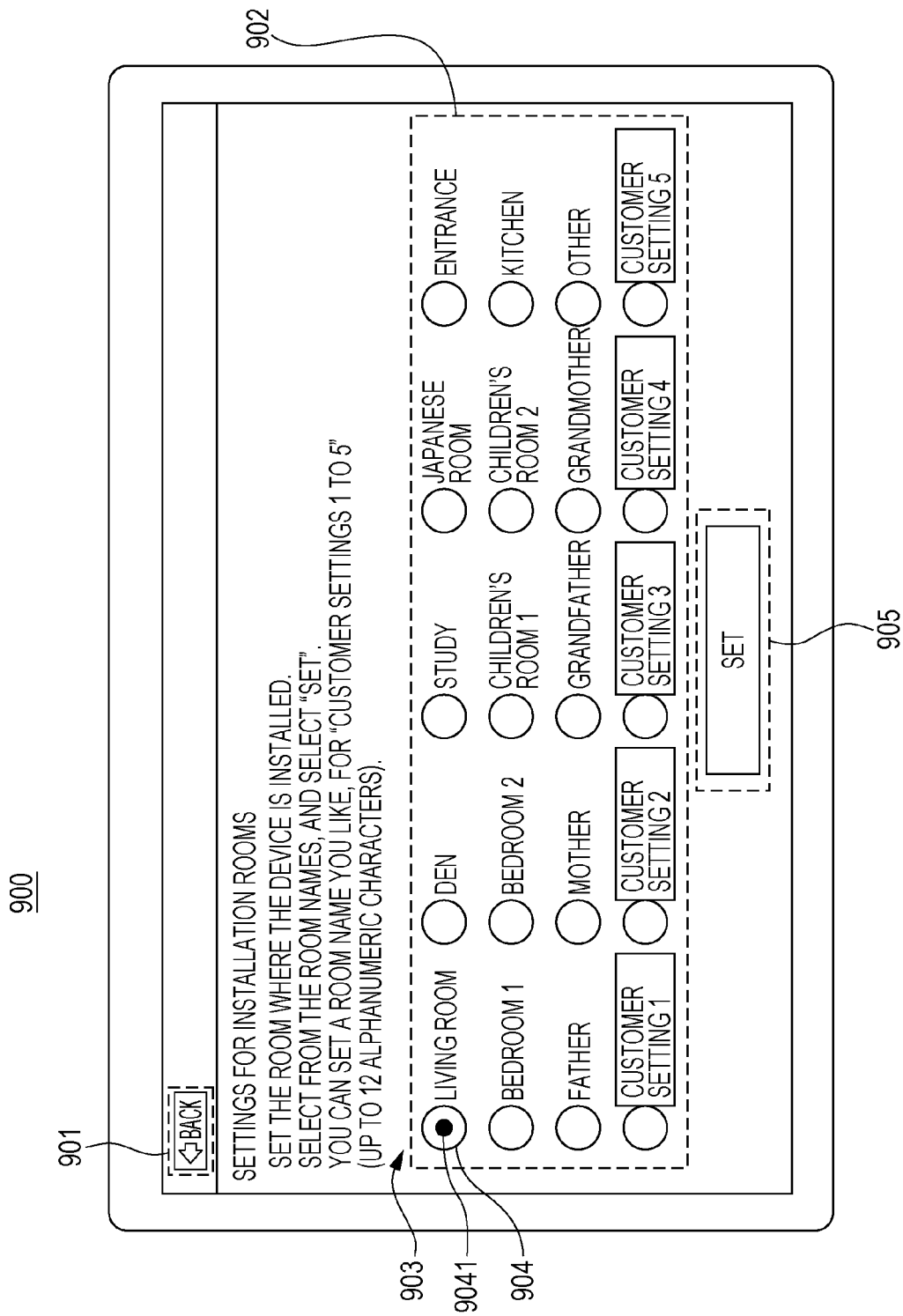
FIG. 9 is a diagram illustrating an example of a room selection screen.

Upon the room selection screen display button 802 being selected, the room list display unit 108 displays a room selection screen 900 illustrated in FIG. 9 on the display 101. FIG. 9 is a diagram illustrating an example of the room selection screen 900. The room selection screen 900 is a screen for the user to correlate a device 200 to be registered with the room in which that device 200 is installed.

A heading "SETTINGS FOR INSTALLATION ROOMS" is at the top of the room selection screen 900, information the user that the room selection screen 900 is a screen for selecting rooms. Below the "SETTINGS FOR INSTALLATION ROOMS" heading, a message "SET THE ROOM WHERE THE DEVICE IS INSTALLED. SELECT FROM THE ROOM NAMES, AND SELECT 'SET'." is displayed. Thus, the user can comprehend that selecting one room from the rooms displayed in a room candidate list 902 and selecting a room set button 905 correlates the device 200 to be registered and the room.

Further below this message, a message "YOU CAN SET A ROOM NAME YOU LIKE, FOR 'CUSTOMER SETTINGS 1 TO 5' (UP TO 12 ALPHANUMERIC CHARACTERS)." is displayed. Thus, the user can comprehend that any preferred room name, different from the default room names, can be input for the "CUSTOMER SETTING 1" through "CUSTOMER SETTING 5" displayed in the room candidate list 902.

The room candidate list 902 displays a list of candidates of rooms to be correlated with the device 200 to be registered. What is displayed in the room candidate list 902 here is not a list or rooms which actually exist in the houses of each of the users, but rather a list of rooms which generally exist in homes, such as "living room", "den", and "bedroom". That is to say, a list of rooms registered beforehand by a designer of the home control system according to the present disclosure is displayed in the room candidate list 902. Accordingly, the same rooms are displayed in the list in the room candidate list 902 for all users using the home control system according to the present disclosure.

Rooms making up a house can often be identified by common names, such as the living room, den, and so forth. Also, if simply correlating a device 200 and a room is sufficient, room layout information indicating which part of which floor of the house that room is situated is unnecessary. Accordingly, in the present disclosure, a list of commonly-existing rooms is displayed in the room candidate list 902, for the user to select one from. Accordingly, the present disclosure realizes correlating the devices 200 with rooms without having users to input room layout information of the houses of individual users.

Conventional home controller systems assumed that the user would input room layout information of the house of the individual user, and correlation of devices and rooms has been performed based upon this assumption. However, inputting room layout information to the home controller necessitates the work of obtaining the room layout drawings from the house builder, and reading the room layout drawings in by scanner. It is not practical to place the burden of such work on the end user. The home controller system according to the present disclosure does not need to acquire room layout information, so the trouble the user has to go to regarding correlating the devices 200 with rooms can be markedly reduced.

Returning to FIG. 9, a list of 20 rooms, 4 rows by 5 columns, is displayed in the room candidate list 902 in FIG. 9. 20 radio buttons 904 are disposed, corresponding to each of the rooms displayed in the list.

Of the rooms displayed in the list in the room candidate list 902, the 15 rooms displayed in the first row through the third row are rooms having general names, such as living room, den, and so forth. The five rooms displayed in the fourth row, out of the rooms displayed in the list in the room candidate list 902, are rooms where the user can input any preferred room name. For example, there will be users who want to give the rooms unique names, such as "Timmy's bedroom", "Jimmy's bedroom", and so on, instead of names like bedroom 1 and bedroom 2. The room candidate list 902 according to the present disclosure provides rooms where users can input preferred names, to accommodate such user demands.

For example, upon a user entering a preferred name to a space that says "CUSTOMER SETTING 1", the room having the input name is registered in the home control system. Input of the preferred name may be performed by the user tapping on the space that says "CUSTOMER SETTING 1", to bring up a software keyboard (omitted from illustration) on the display 101, and using this software keyboard to perform input.

Figure 10:
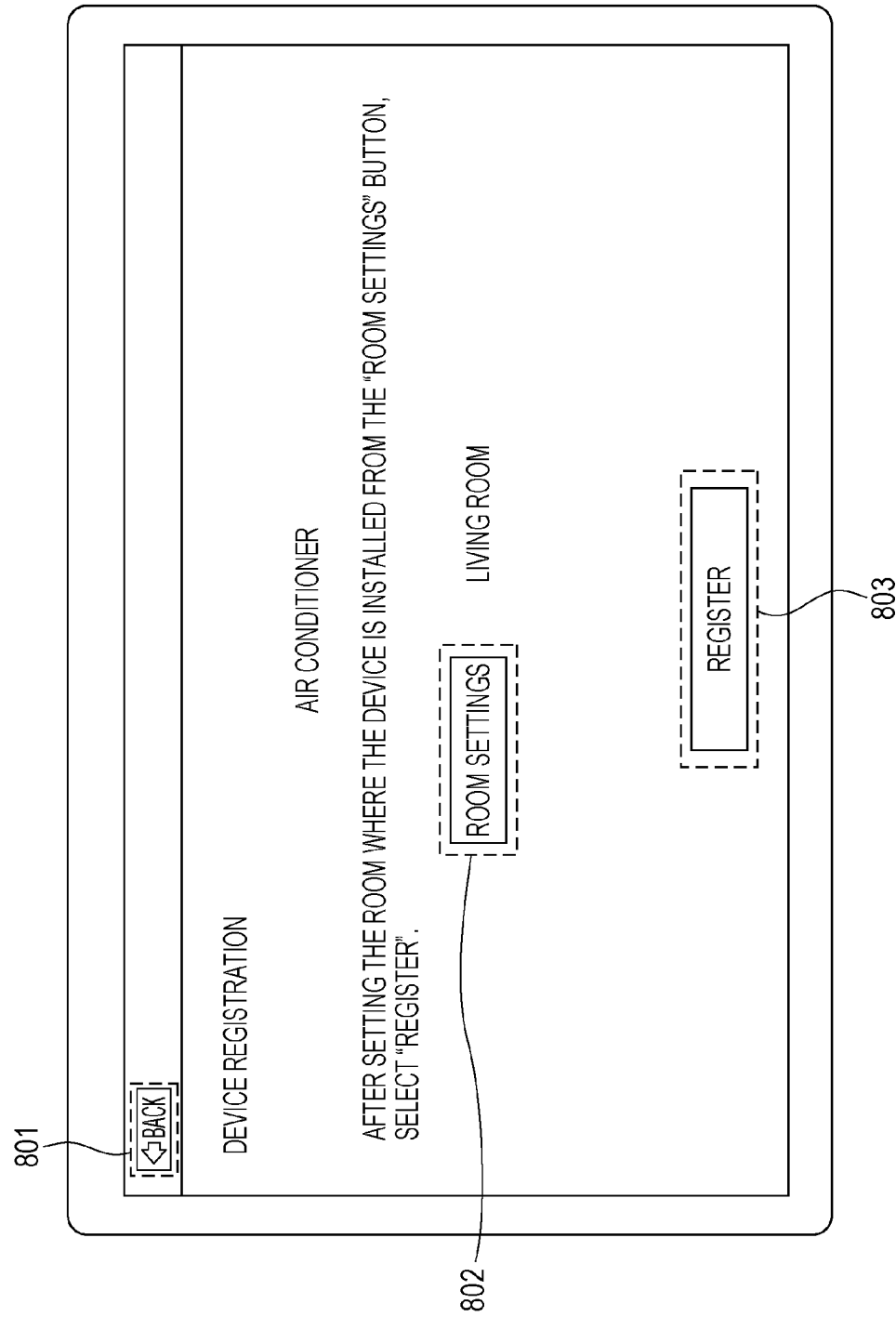
FIG. 10 is a diagram illustrating an example of a device registration screen displayed after a user has selected one room from the room selection screen illustrated in FIG. 9.

Upon the touch panel control unit 102 detecting an operation of selecting a radio button 904 corresponding to one room in the room candidate list 902, the room list display unit 108 displays a selection mark 9041 in that radio button 904. Upon the touch panel control unit 102 detecting an operation of selecting the room set button 905 in this state, the room list display unit 108 displays the device registration screen 800 illustrated in FIG. 10 on the display 101. FIG. 10 is a diagram illustrating an example of a device registration screen 800 displayed after a user has selected a room from the room selection screen 900 illustrated in FIG. 9.

"LIVING ROOM" has been selected in the room selection screen 900, so "LIVING ROOM" is displayed at the right side of the room selection screen display button 802 in the device registration screen 800 illustrated in FIG. 10. Also, selection of the device registration button 803 can now be made, so the device registration button 803 which had been displayed in an inactive state in FIG. 8 now is displayed in an active state. Other than these points, the device registration screen 800 illustrated in FIG. 10 is the same as the device registration screen 800 illustrated in FIG. 8.

"AIR CONDITIONER" which represents the device 200 to be registered, is displayed at the top of the device registration screen 800 illustrated in FIG. 10. Thus, the user can confirm that the "LIVING ROOM" and the "AIR CONDITIONER" are about to be correlated. Upon the touch panel control unit 102 detecting an operation of selecting the device registration button 803 in the device registration screen 800 illustrated in FIG. 10, the device list display unit 109 displays the subject device list screen 700 illustrated in FIG. 11 on the display 101. Also, upon the touch panel control unit 102 detecting the operation of selecting the device registration button 803, the device registration management unit 105 correlates the "LIVING ROOM" and the "AIR CONDITIONER" and registers in a device list 2500. Thus, correlation of the "LIVING ROOM" and the "AIR CONDITIONER" in the home controller 100 is finalized.

Figure 11:
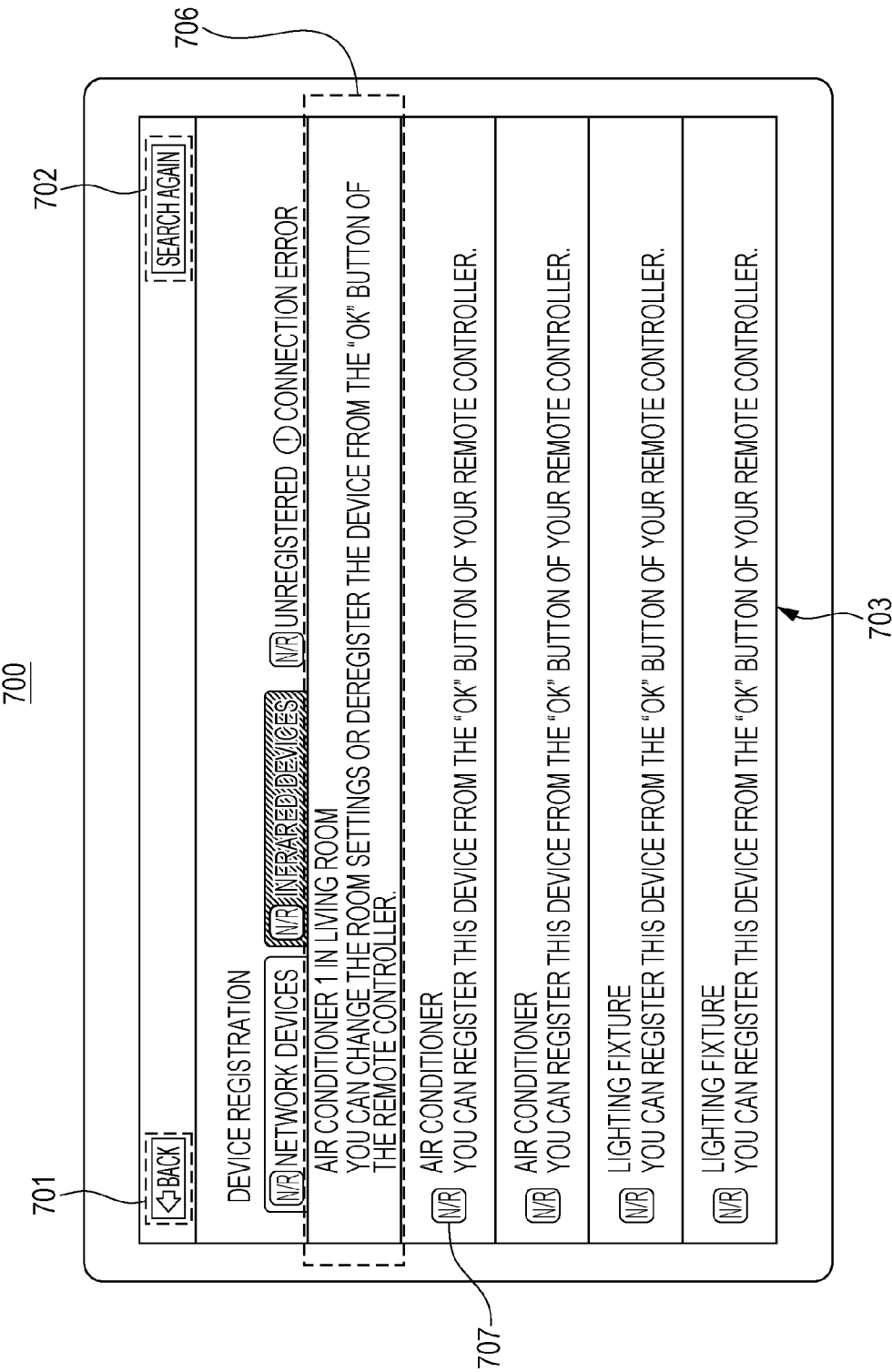
FIG. 11 is a diagram illustrating an example of a subject device list screen displayed in a case where the registration button has been selected in the device registration screen illustrated in FIG. 10.

FIG. 11 is a diagram illustrating an example of the subject device list screen 700 displayed in a case where the device registration button 803 has been selected from the device registration screen 800 illustrated in FIG. 10. The subject device list screen 700 illustrated in FIG. 11 reflects the registration of the air conditioner that has been performed in the device registration screen 800 in FIG. 10. Accordingly, the mark 707 representing the unregistered state in FIG. 7 has been deleted from the device display space 760 displayed in the first row in FIG. 11. Further, there are two other air conditioners besides the air conditioner displayed in the first row device display space 760 in the example in FIG. 11. Accordingly, the name of the air conditioner in the first row device display space 760 has been set to "AIR CONDITIONER 1", to distinguish the registered air conditioner in the first row device display space 760 from the other two unregistered air conditioners.

Also, the first row device display space 760 has a message that says "YOU CAN CHANGE THE ROOM SETTINGS OR DEREGISTER THE DEVICE FROM THE 'OK' BUTTON OF THE REMOTE CONTROLLER." displayed. Thus, the user can recognize that the registration content of the "AIR CONDITIONER 1" can be changed. Other than these points, the subject device list screen 700 illustrated in FIG. 11 is the same as the subject device list screen 700 illustrated in FIG. 7.

Upon the touch panel control unit 102 detecting an operation of selecting the back button 701 in the subject device list screen 700 in FIG. 11, the room list display unit 108 displays the room list screen 600 illustrated in FIG. 12 on the display 101. FIG. 12 is a diagram illustrating an example of the room list screen 600 in a case where there is only one room correlated with a device 200. In the room list screen 600 in FIG. 12, only the living room has been correlated with a device 200, and the other rooms have not been correlated with devices 200. That is to say, only the living room has been registered. Accordingly, the room list display unit 108 displays the room list screen 600 where only one room icon 603, representing the living room, is shown, on the display 101. The room icon 603 is a rectangular image which includes the name of the relevant room, and a simple image that represents of the relevant room. The room icon 603 shown in FIG. 12 is a room icon 603 for a living room, and accordingly includes an image showing a sofa, an ornamental plant, and furniture, which represent a living room, in a simplified manner.

Upon the touch panel control unit 102 detecting an operation of selecting the room icon 603 in the room list screen 600 illustrated in FIG. 12, the device list display unit 109 displays the device list screen 1300 illustrated in FIG. 13 on the display 101.

FIG. 13 is a diagram illustrating an example of the device list screen 1300. The device list screen 1300 is a list display of a device control screen 1306 (example of first operating screen, second operating screen) of the device 200 correlated with the room icon 603 selected from the room list screen 600. In the example in FIG. 13, only the air conditioner 1 has been correlated with the living room, so the device control screen 1306 corresponding to the air conditioner 1 is displayed.

A temperature display space 1304 and a humidity display space 1305 are laid out at the top of the device control screen 1306 for the air conditioner 1 in the device list screen 1300. The temperature display space 1304 is a space for displaying the room temperature of the relevant room (living room in this case). The humidity display space 1305 is a space for displaying the humidity of the relevant room (living room in this case). The temperature and humidity of the relevant room may be acquired from the air conditioner installed in this room, by the home controller 100 for example.

The device control screen 1306 shown in FIG. 13 is the device control screen 1306 of the air conditioner 1, so an image R1 representing the air conditioner in a simplified manner, and a name R2 (air conditioner 1 in this case) are displayed. Accordingly, the user can tell in a glance that this device control screen 1306 is that of the air conditioner 1. The device control screen 1306 also includes a state display space R3, a temperature display space R4, an airflow display space R5, a wind direction display space R6, and a mode display space R7. The state display space R3 displays information indicating whether or not the air conditioner 1 is running. The air conditioner 1 is running in this case, so "RUNNING" is displayed in the state display space R3. The state display space R3 also includes an auto button B1 to start the air conditioner 1 operating, and a stop button B2 to stop the operation of the air conditioner 1. The auto button B1 is selected in this case, so the auto button B1 is displayed in an active state.

The temperature display space R4 displays the currently set temperature of the air conditioner 1. The temperature display space R4 has an up button B3 to raise the set temperature of the air conditioner 1 and a down button B4 to lower the set temperature of the air conditioner 1. The currently set temperature of the air conditioner 1 in this case is 28 degrees, so "28° C." is displayed in the temperature display space R4.

The airflow display space R5 displays the current airflow of the air conditioner 1. The airflow display space R5 has an up button B5 to raise the airflow of the air conditioner 1 and a down button B6 to lower the airflow of the air conditioner 1. The current airflow of the air conditioner 1 is level 3, so "3" is displayed in the state display space R5.

The wind direction display space R6 displays the current wind direction of the air conditioner 1. The wind direction display space R6 has a wind direction button B7 to adjust the wind direction of the air conditioner 1, and multiple indicators B8 representing the current wind direction. In this case, the wind direction of the air conditioner 1 can be adjusted in five stages in the vertical direction, so five indicators B8 are laid out in a radial manner corresponding to the five stages of wind direction. Of the five indicators B8, the indicator B8 corresponding to the current wind direction of the air conditioner 1 is displayed in an active state, and the remaining four indicators B8 are displayed in an inactive state. Each time the wind direction button B7 is pressed, the wind direction moves up or down one stage, and the indicator B8 displayed in an active state also changes accordingly.

The mode display space R7 displays the mode of the air conditioner 1 that is currently set. The modes of the air conditioner 1 are cooling mode, heating mode, and dehumidifying mode, so the mode display space R7 has a cooling button B9, a heating button B10, and a dehumidify button B11, for selecting one of these three modes. The one of the cooling button B9, heating button B10, and dehumidify button B11 corresponding to the currently set mode is displayed in an active state, and the two remaining buttons are displayed in an inactive state. The cooling mode is selected in the example in FIG. 13, so the cooling button B9 is displayed in the active state, and the heating button B10 and dehumidify button B11 are displayed in an inactive state.

Upon the touch panel control unit 102 detecting an operation of selecting a back button 1303 in the device list screen 1300 illustrated in FIG. 13, the room list display unit 108 returns the display screen of the display 101 to the room list screen 600 illustrated in FIG. 12.

Also, a settings button 1301 and batch device operation buttons 1302 are placed at the upper side of the device list screen 1300 illustrated in FIG. 13. Upon the touch panel control unit 102 detecting operations of selecting the settings button 1301, the device list display unit 109 displays the subject device list screen 700 on the display 101, in the same way as in a case where the settings button 601 is selected in FIG. 6. Upon the touch panel control unit 102 detecting operation of the batch device operation buttons 1302, the device control unit 106 performs batch control of the devices 200 within the house, in the same way as in a case where the batch device operation buttons 602 are selected in FIG. 6. Note that in a case where the batch device operation buttons 1302 are selected, the device control unit 106 may perform batch control only of the devices 200 correlated with the relevant room (living room in this case).

FIG. 14 is a diagram illustrating an example of the room list screen 600 in a case where there are multiple rooms which have been correlated with devices 200. In the example in FIG. 14, there are multiple rooms which have been correlated with devices 200, so multiple room icons 603 are laid out on the room list screen 600.

Now, the room list screen 600 displays the room icons 603 in a matrix in order of registration, such as the room icon 603 of the room that was registered first in a tile at the first row and first column, the room icon 603 of the room that was registered second in a tile at the first row and second column, and so on. Note that the display order of the room icons 603 is not restricted to the order of registration. Also, the room list screen 600 has a size that is capable of displaying three columns worth of room icons 603 in each row, the room icon 603 of the room that was registered fourth is displayed in a tile at the second row and first column, and the room icon 603 of the room that was registered seventh in a tile at the third row and first column.

In the example in FIG. 14, the room list screen 600 has a size capable of displaying the entire regions of a total of six room icons 603, made up of two rows×three columns, and a region of about two thirds from the top of a third row of three room icons 603, at the same time, for example.

In the example in FIG. 14, the number of rooms to which devices 200 have been correlated is nine or more, so all room icons 603 cannot be displayed in the room list screen 600 at once. Accordingly, a switch button 1401 to switch the display of the room list screen 600 is provided at the lower middle portion of the room list screen 600 in FIG. 14.

For example, upon an operation of selecting the switch button 1401 being input, the room list display unit 108 scrolls the room icons 603 one tile worth upwards. Accordingly, the three room icons 603 "Japanese room", "kitchen", and "study", displayed in the second row are displayed in the first row, and the three room icons 603 "den", "bedroom 2", and "children's room 2", displayed in the third row are displayed in the second row. In this case, if there are room icons 603 in the tiles one below the "den", "bedroom 2", and "children's room 2", these room icons 603 will be displayed in the third row. Further, upon an operation of selecting the switch button 1401 being input, the room list display unit 108 scrolls the room icons 603 another one tile worth upwards. Thus, each time the switch button 1401 is selected, the room icons 603 are scrolled one tile worth upwards.

In a state where the three room icon 603 "Japanese room", "kitchen", and "study", are displayed in the first row, a switch button (omitted from illustration) to scroll the room icons 603 downwards by one row worth is provided at the upper middle portion of the room list screen 600. Thus, the "living room", "bedroom 1", and "children's room 1", which had been removed from display by operating the switch button 1401, are displayed on the display 101.

While description has been made above that the room icons 603 are scrolled upwards by one tile worth for each operation of the switch button 1401, an arrangement may be made where the room list display unit 108 continuously scrolls the room icons 603 upwards while the operation of selecting the switch button 1401 is being performed. This is also true for the switch button (omitted from illustration) to scroll the room icons 603 downwards.

In FIG. 14, if one of the devices 200 out of the devices 200 correlated with a corresponding room is in an on state, the room icon 603 thereof is displayed in an active state. For example, a device 200 correlated with the living room is in an on state, so the room icon 603 of the "living room" is displayed in an active state. On the other hand, if all of the devices 200 correlated with a corresponding room are in an off state, the room icon 603 thereof is displayed in an inactive state. For example, all devices 200 correlated with the study are in an off state, so the room icon 603 of the "study" is displayed in an inactive state. A display form of displaying room icons 603 in an inactive state may be a form of graying out the room icon 603, for example. Displaying the images and text within the room icon 603 in a monotone gray color here grays out the display of the room icon 603. On the other hand, a display form of displaying room icons 603 in an active state may be a normal display form of the room icon 603. Displaying the images and text within the room icon 603 in the original color without graying out is the normal display form here.

Thus, the room list screen 600 displays in a list the room icons 603 representing rooms in the house with which devices 200 have been correlated, so primary rooms existing in the house can be presented to the user. Accordingly, while the position of the rooms in the layout of the house cannot be displayed in the room list screen 600, the functionality borne is one such as if it were that of a room layout diagram. Now, upon the user performing a task of correlating a device 200 to be registered with the room where it is installed, at the time of registering the devices 200, the room icon 603 of that room is automatically displayed in the room list screen 600. Accordingly, the user does not have to perform separate work to input the room layout information to create the room list screen 600. As a result, this home control system enables the room list screen 600, which has a function as if it were a room layout diagram, to be displayed on the display 101, without imposing the work of inputting room layout information on the user.

Figure 15:
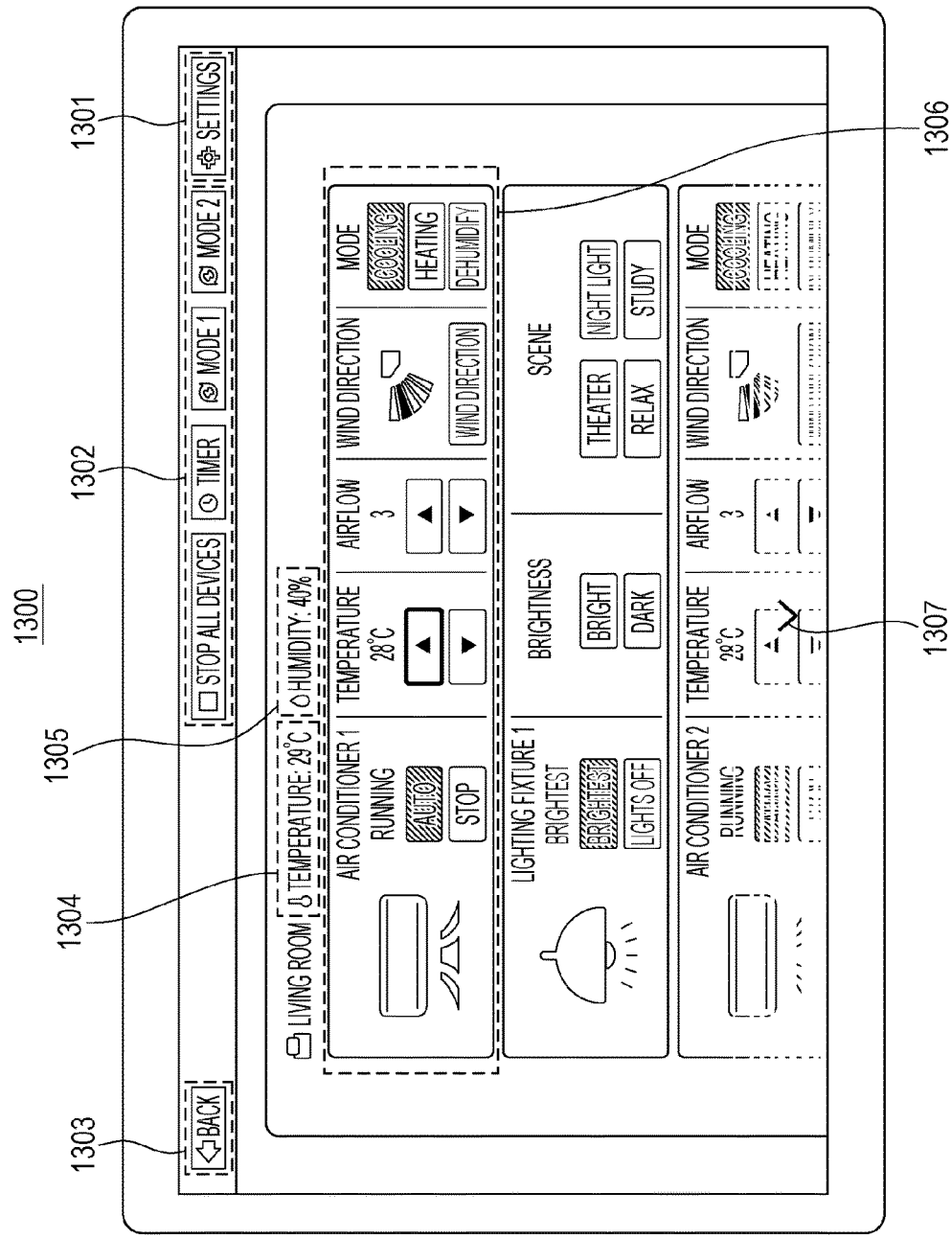
FIG. 15 is a diagram illustrating an example of a device list screen for a living room with which multiple devices have been correlated.

In a case where the touch panel control unit 102 detects operation of selection of the room icon 603 "living room", for example, from the room list screen 600 in FIG. 14, the device list display unit 109 displays the device list screen 1300 illustrated in FIG. 15 on the display 101.

FIG. 15 is a diagram illustrating an example of the device list screen 1300 where multiple devices 200 are correlated. An air conditioner 1, lighting fixture 1, and air conditioner 2 are correlated with the living room in the device list screen 1300 in FIG. 15, so three device control screens 1306, corresponding to the three devices 200, are displayed in the device list screen 1300 in FIG. 15. Otherwise, the device list screen 1300 in FIG. 15 is the same as the device list screen in FIG. 13.

Now, the device control screens 1306 are displayed in order of registration of order in the device list screen 1300, such as the device control screen 1306 of the device 200 registered first in the living room at the first row, the device control screen 1306 of the device 200 registered second at the second row, and so forth. To realize this, symbols to identify order of registration are employed as device IDs (FIG. 25), such as the device 200 registered first being "A", the device 200 registered second being "B", and so on. The device list display unit 109 only has to display the device control screens 1306 of the devices 200 correlated with the relevant room in order of the device IDs.

In the example in FIG. 15, the air conditioner 1 has been correlated first in the living room, the lighting fixture 1 has been correlated second, and the air conditioner 2 has been correlated third, so the device control screens 1306 for air conditioner 1, lighting fixture 1, and air conditioner 2 are displayed in the first, second, and third rows.

The device list screen 1300 has a size capable of displaying the entire regions of two device control screens 1306, and the upper half of another device control screen 1306, at the same time, for example. Accordingly, if four or more devices 200 are correlated with the living room, the fourth and subsequent device control screens 1306 cannot be displayed. Accordingly, a switch button 1307 to display the unshown device control screens 1306 on the display 101 is provided at the lower middle portion of the device list screen 1300.

In the display state in FIG. 15, upon the touch panel control unit 102 detecting an operation of selecting the switch button 1307, the device list display unit 109 scrolls the device list screen 1300 one row upwards. Accordingly, the device control screen 1306 of the lighting fixture 1 displayed in the second row is displayed in the first row, and the device control screen 1306 of the air conditioner 2 displayed in the third row is displayed in the second row. In this case, if there is another device control screen 1306 situated below the air conditioner 2, the device control screen 1306 of this device is displayed in the third row. Inputting further operation to select the switch button 1307 scrolls the device control screens 1306 one row further upwards. Thus, each time the switch button 1307 is selected, the device list display unit 109 scrolls the device control screen 1306 upwards in increments of rows.

In a state where the two device control screens 1306 for the lighting fixture 1 and air conditioner 2 are displayed in the first row and the second row, a switch button (omitted from illustration) to scroll the device control screen 1306 downwards by one row worth is provided at the upper middle portion of the device list screen 1300. Thus, the device control screen 1306 for the air conditioner 1, which had been removed from display by operating the switch button 1307, is displayed on the display 101.

While description has been made above that the device control screens 1306 are scrolled upwards by one row worth for each operation of the switch button 1307, an arrangement may be made where the device list display unit 109 continuously scrolls the device control screens 1306 upwards while the operation of selecting the switch button 1307 is being performed. This is also true for the switch button (omitted from illustration) to scroll the device control screens 1306 downwards. Also, a settings button 1301 and batch device operation buttons 1302 are placed at the upper side of the device list screen 1300 illustrated in FIG. 15, the same way as in the device list screen 1300 illustrated in FIG. 13.

Figure 16:
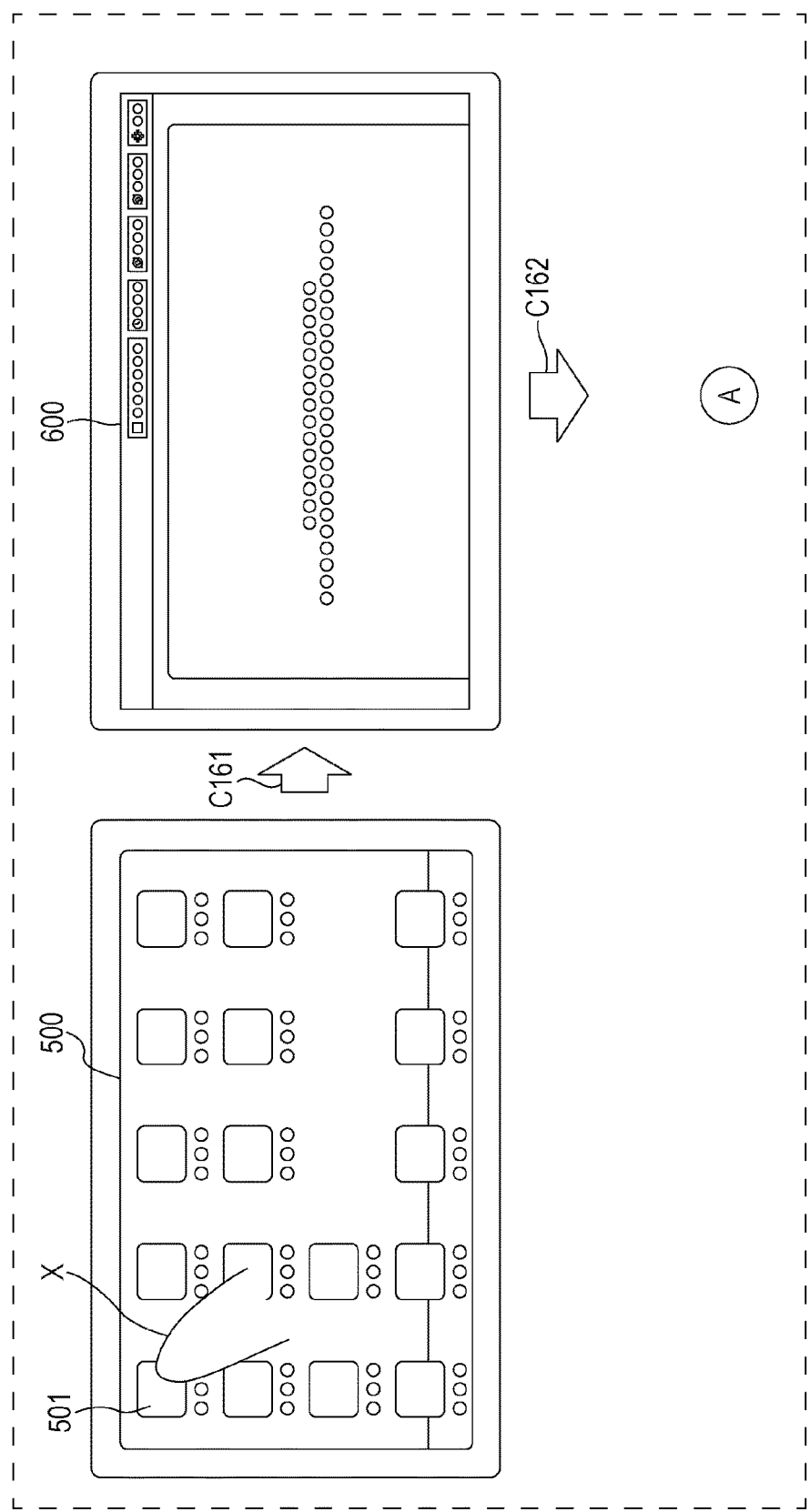
FIG. 16 is a diagram illustrating an example of a screen flow for initial registration.

FIG. 16 is a diagram illustrating an example of a screen flow for initial settings. The term initial settings here means a device 200 being registered for the first time, in a state where there are no devices 200 at all that have been registered. First, upon the touch panel control unit 102 detecting an operation of an instructing object X tapping a home controller application icon 501 at the application list screen 500, the room list display unit 108 switches the display screen of the display 101 from the application list screen 500 to the room list screen 600 (C161). There are not devices 200 at all that are registered here, so the room list screen 600 illustrated in FIG. 6 is displayed on the display 101. Note that a touch pen may be employed as the instructing object X, or a finger of the user may be used.

Figure 17:
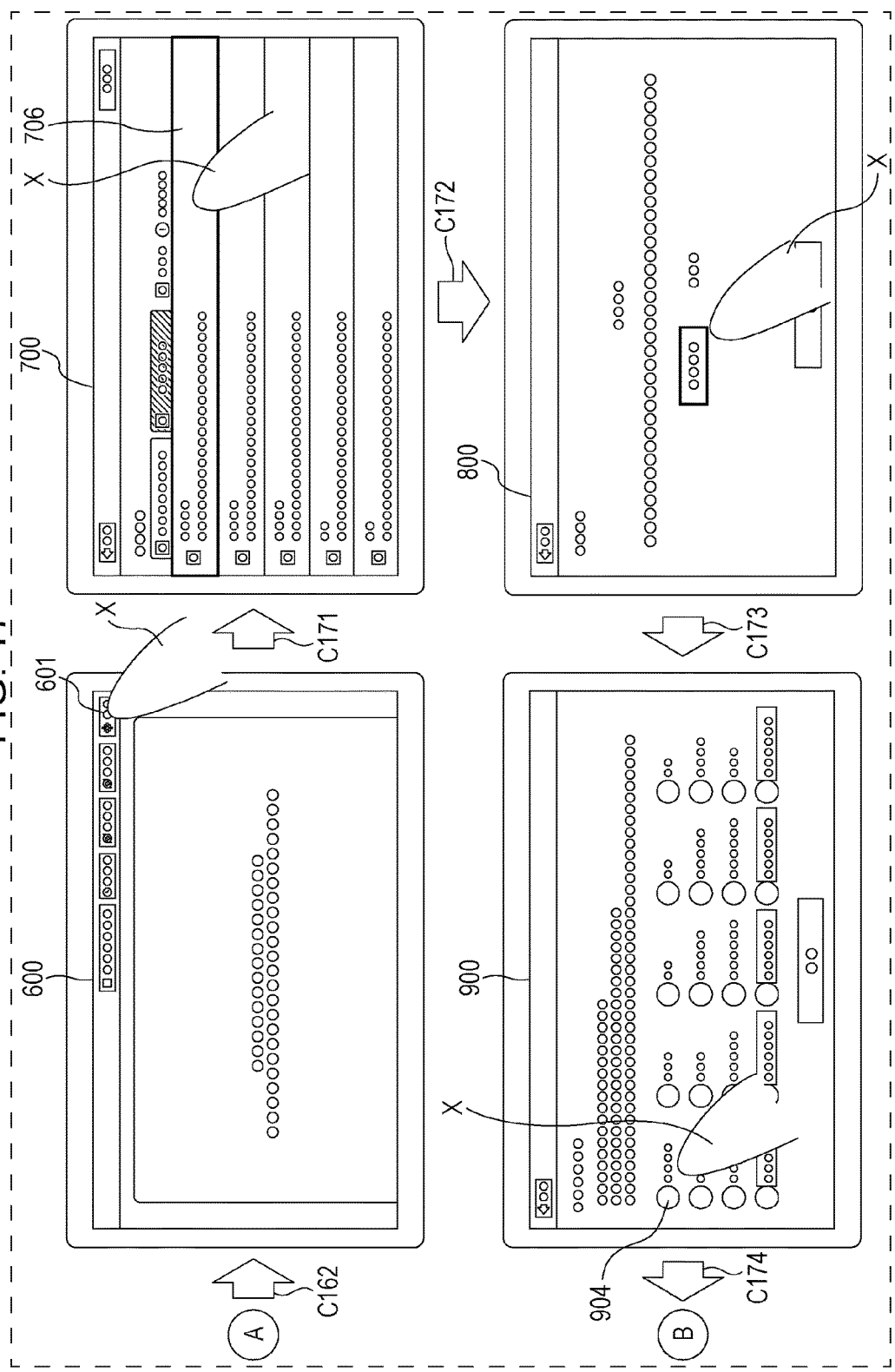
FIG. 17 is a diagram illustrating an example of a screen flow continued from FIG. 16.

FIG. 17 is a diagram illustrating an example of the screen flow continued from FIG. 16. The room list screen 600 at the upper left in FIG. 17 is the room list screen 600 in FIG. 6. Upon the touch panel control unit 102 detecting a tap by the instructing object X on the settings button 601 in the room list screen 600, the device list display unit 109 switches the display screen on the display 101 from the room list screen 600 to the subject device list screen 700 (C171). The subject device list screen 700 displayed here is the subject device list screen 700 illustrated in FIG. 7.

Upon the touch panel control unit 102 detecting the instructing object X tapping the device display space 706 of the air conditioner displayed at the first row in the subject device list screen 700, the room list display unit 108 switches the display screen on the display 101 from the subject device list screen 700 to the device registration screen 800 (C172). The device registration screen 800 displayed here is the device registration screen 800 illustrated in FIG. 8.

Upon the touch panel control unit 102 detecting a tap by the instructing object X on the room selection screen display button 802 in the device registration screen 800, the room list display unit 108 switches the display screen of the display 101 from the device registration screen 800 to the room selection screen 900 (C173).

Upon the touch panel control unit 102 detecting a tap by the instructing object X on the radio button 904 for the living room in the room selection screen 900, the room list display unit 108 switches the display screen on the display 101 from the room selection screen 900 to the device registration screen 800 (C174).

Note that in a case where a registered device 200 is selected in the subject device list screen 700 in FIG. 17, the name or the room which has been correlated with this device 200 is displayed to the right of the room selection screen display button 802 in the device registration screen 800. Upon the room selection screen display button 802 being selected, the room selection screen 900 is displayed, and the user can correlate this device 200 with another room using the room selection screen 900.

Figure 18:
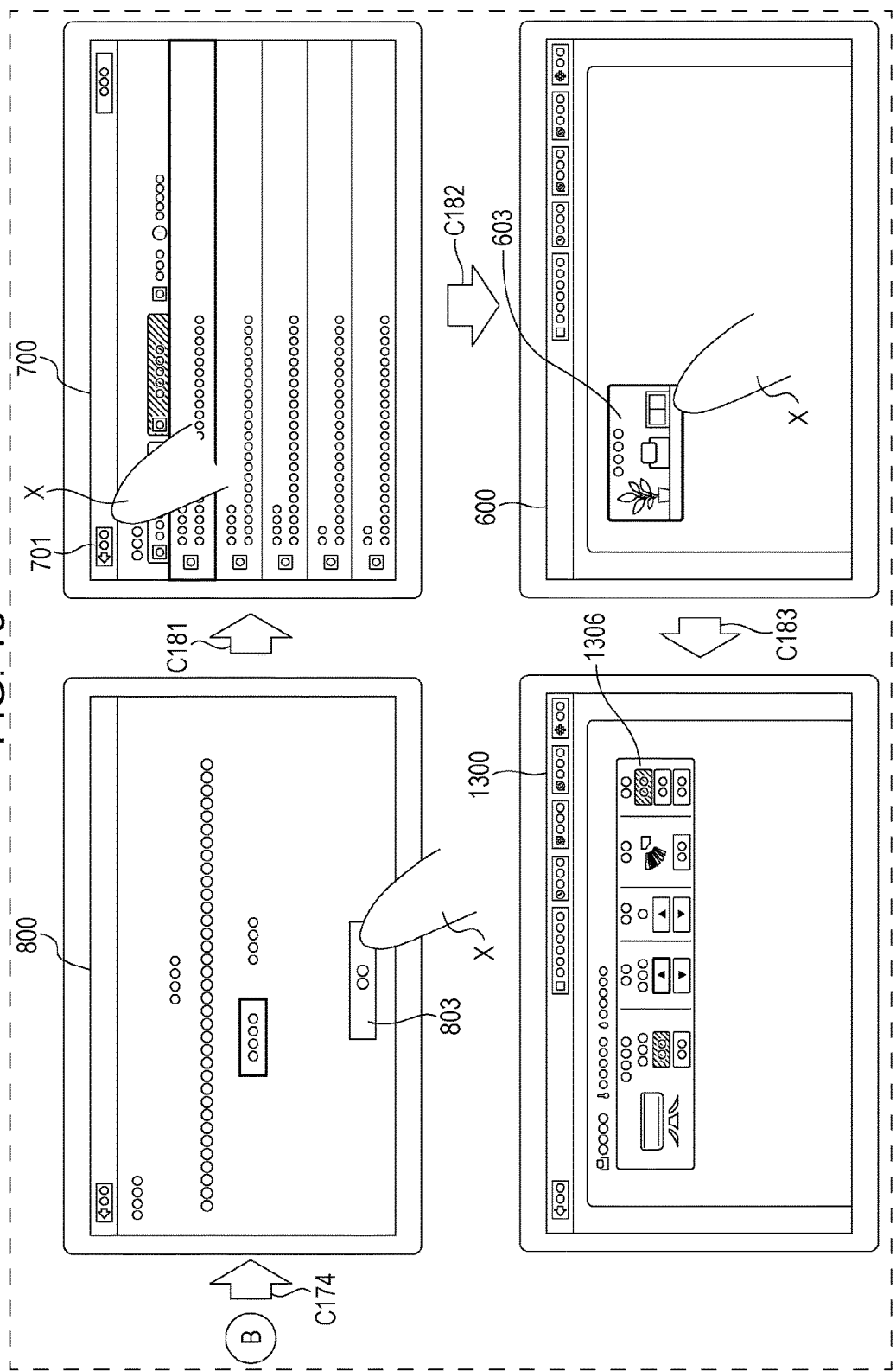
FIG. 18 is a diagram illustrating an example of a screen flow continued from FIG. 17.

FIG. 18 a diagram illustrating an example of the screen flow continued from FIG. 17. The device registration screen 800 at the upper left in FIG. 18 is the device registration screen 800 illustrated in FIG. 10, for correlating the air conditioner and the living room, since the living room has been selected for the air conditioner.

Upon the touch panel control unit 102 detecting a tap by the instructing object X on the device registration button 803, the device list display unit 109 switches the display screen on the display 101 from the device registration screen 800 to the subject device list screen 700 (C181). The subject device list screen 700 displayed here is the subject device list screen 700 in FIG. 11, showing that the air conditioner 1 is a registered device 200.

Upon the touch panel control unit 102 detecting a tap by the instructing object X on the back button 701 in the subject device list screen 700, the room list display unit 108 switches the display screen on the display 101 from the subject device list screen 700 to the room list screen 600 (C182). The room list screen 600 displayed here is the room list screen 600 illustrated in FIG. 12, where only the room icon 603 of the living room is displayed.

Upon the touch panel control unit 102 detecting a tap by the instructing object X on the room icon 603 in the room list screen 600, the device list display unit 109 switches the display screen on the display 101 from the room list screen 600 to the device list screen 1300 (C183). Only the air conditioner 1 is correlated with the living room here, so the device list screen 1300 illustrated in FIG. 13, including only the device control screen 1306 of the air conditioner 1 is displayed.

Figure 19:
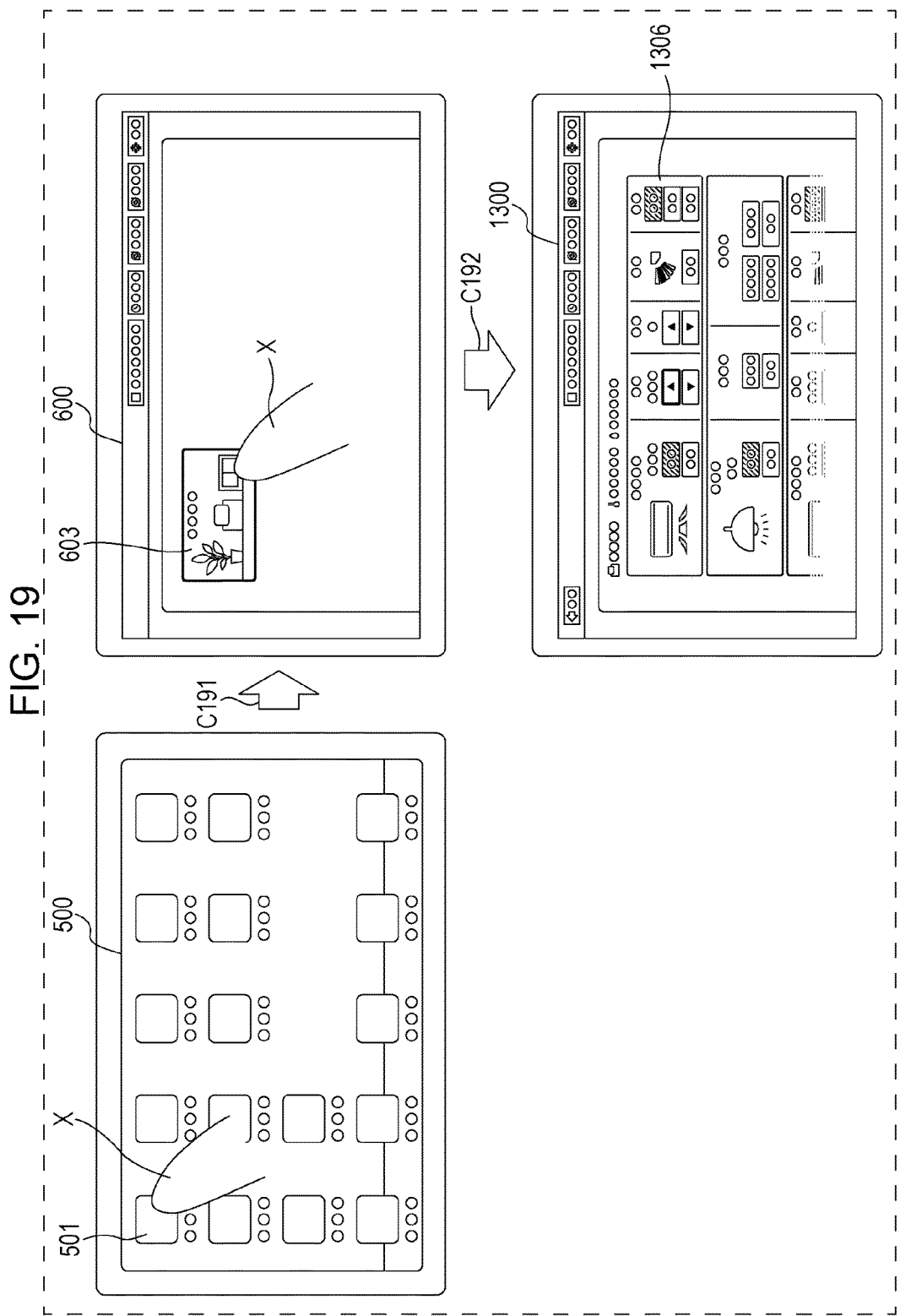
FIG. 19 is a diagram illustrating an example of a screen flow for when a home controller application is activated, in a case where only one room has been registered.

FIG. 19 is a diagram illustrating an example of a screen flow where a home controller application icon is activated in a case where only one room is registered. First, upon the touch panel control unit 102 detecting an operation of an instructing object X tapping a home controller application icon 501 at the application list screen 500, the room list display unit 108 switches the display screen of the display 101 from the application list screen 500 to the room list screen 600 (C191). The room list screen 600 illustrated in FIG. 12, including only the room icon 603 for the living room, is displayed on the display 101 here.

Upon the touch panel control unit 102 detecting a tap by the instructing object X on the room icon 603 of the living room in the room list screen 600, the device list display unit 109 switches the display screen on the display 101 from the room list screen 600 to the device list screen 1300 (C192). The air conditioner 1, lighting fixture 1, and air conditioner 2 are correlated with the living room here, so the device list screen 1300 shown in FIG. 15, which includes the three device control screens 1306 for the air conditioner 1, lighting fixture 1, and air conditioner 2, is displayed on the display 101.

Figure 20:
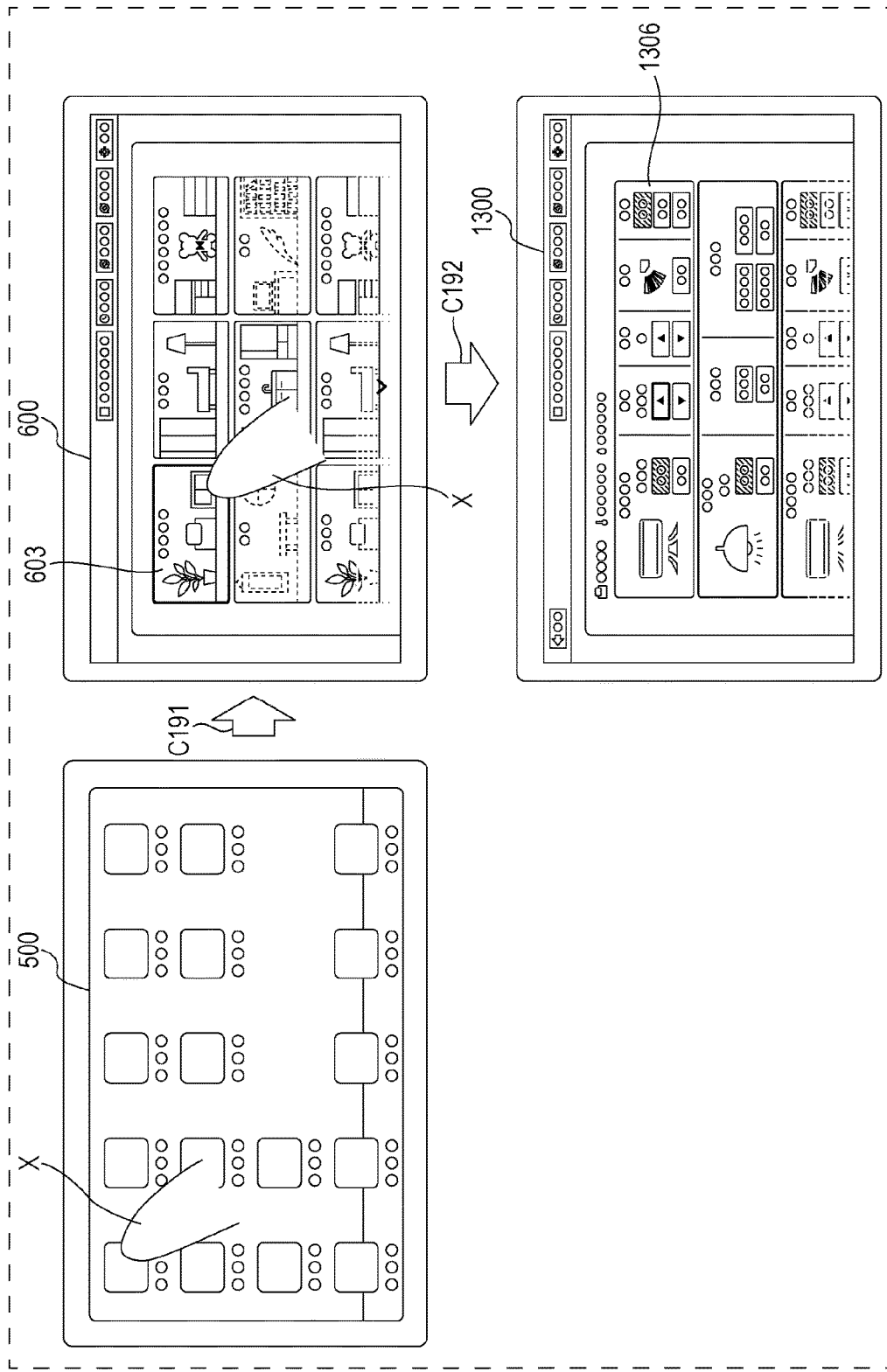
FIG. 20 is a diagram illustrating an example of a screen flow for when a home controller application is activated, in a case where only multiple rooms have been registered.

FIG. 20 is a diagram illustrating an example of a screen flow where a home controller application is activated in a case where multiple rooms are registered. The difference of FIG. 20 as to FIG. 19 is the point that, upon the touch panel control unit 102 detecting an operation of an instructing object X tapping a home controller application icon 501 at the application list screen 500, the room list screen 600 illustrated in FIG. 14, which includes multiple room icons 603, is displayed on the display 101 (C191). That is to say, multiple rooms that have been correlated with devices 200 exist in the example in FIG. 20, so the room list screen 600 displaying a list of the room icons 603 of these rooms is displayed on the display 101.

The instructing object X has tapped the room icon 603 for the living room from the room list screen 600, so the display screen of the display 101 has switched from the room list screen 600 to the device list screen 1300 (C192). The device list screen 1300 displayed here is the device list screen 1300 in FIG. 15.

Description has been made above that upon a home controller application icon being activated from the application list screen 500, the room list screen 600 is displayed on the display 101 regardless of the number of registered rooms. Note however, that this is only an example, and that an arrangement may be made where the home controller 100 bypasses display of the room list screen 600 in a case where the number of registered rooms is one, and displays the device list screen 1300.

Figure 21:
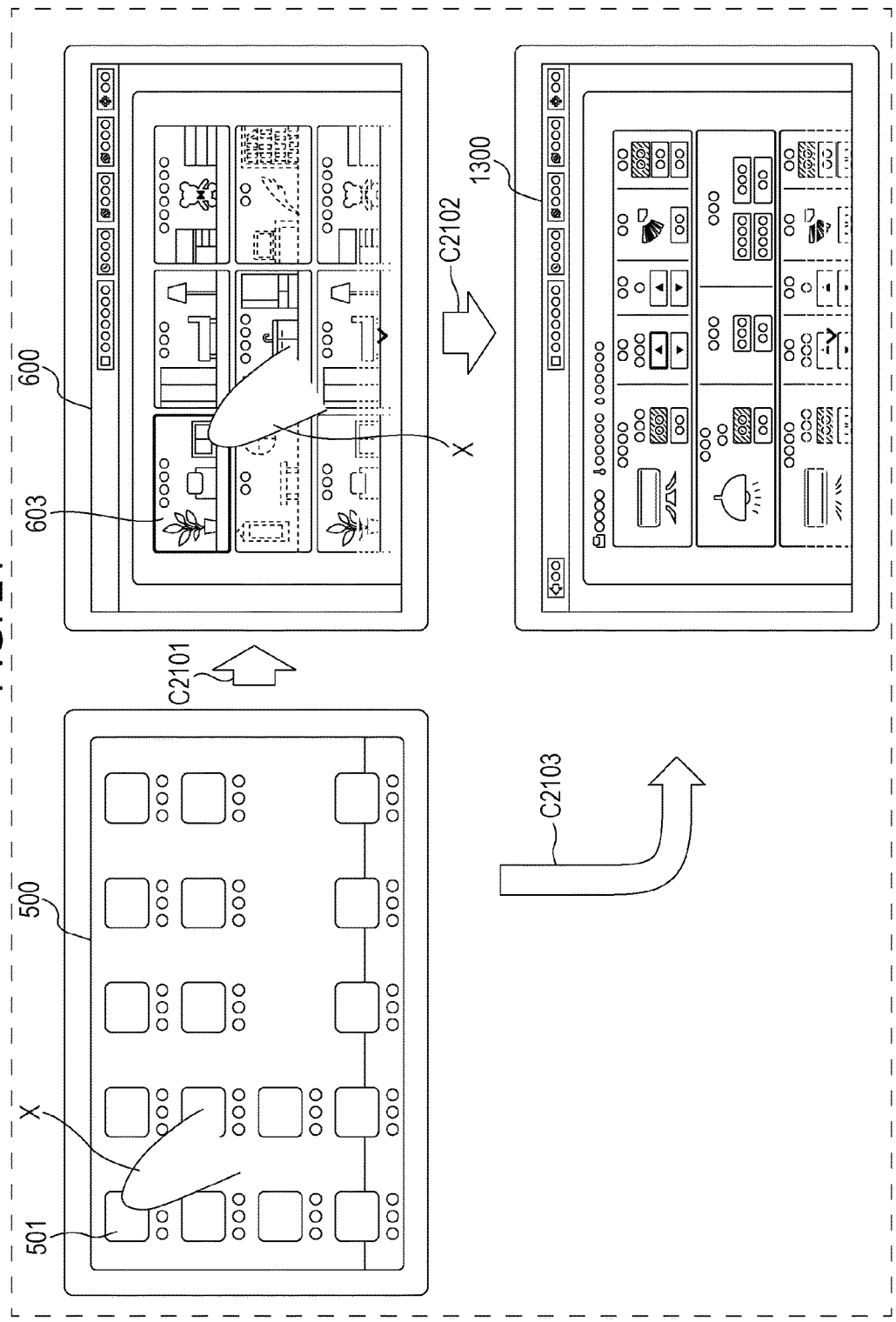
FIG. 21 is a diagram illustrating a first modification of a screen flow.

FIG. 21 is a diagram illustrating a first modification of the screen flow. Upon a home controller application icon 501 being tapped by the instructing object X from the application list screen 500, the room list display unit 108 switches the display screen 101 from the application list screen 500 to the room list screen 600 if the number of registered rooms is multiple (C2101). Upon the room icon 603 of the living room being tapped by the instructing object X from the room list screen 600, the device list display unit 109 switches the display screen of the display 101 from the room list screen 600 to the device list screen 1300 (C2102).

On the other hand, in a case where the number of registered rooms is one, upon the home controller application icon 501 being tapped by the instructing object X from the application list screen, the room list display unit 108 switches the display screen of the display 101 from the application list screen 500 to the device list screen 1300 (C2103).

If the number of registered rooms is one, there is no need to cause the user to select the one room icon 603 using the room list screen 600, since there is only the one room icon 603 displayed in the room list screen 600. Accordingly, in a case where the number of registered rooms is one, in the first modification, the display screen of the display 101 is switched from the application list screen 500 to the device list screen 1300 without going through the room list screen 600. This reduces the number of operating steps by the user, and the number of processing steps by the home controller 100.

Figure 22:
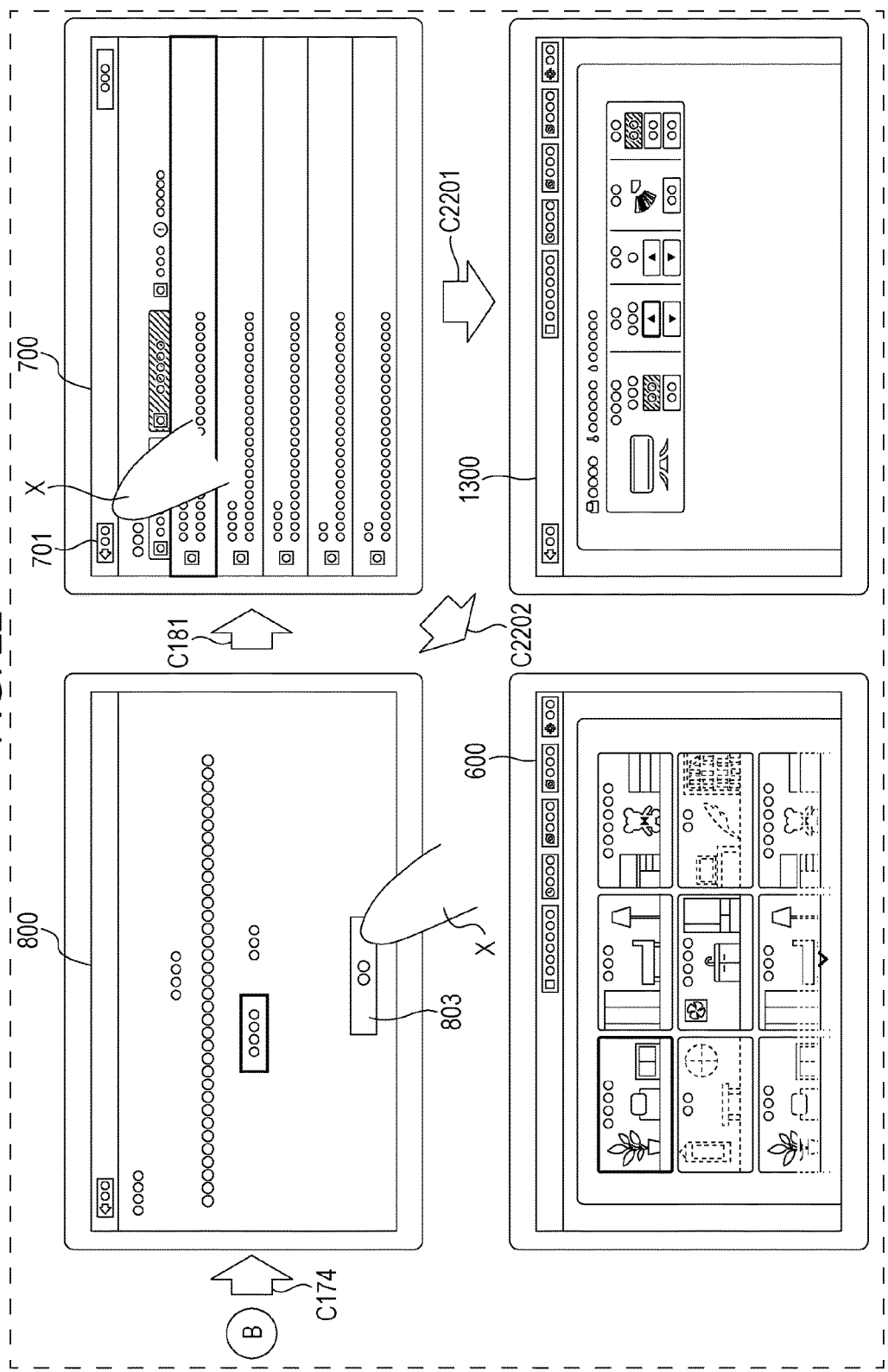
FIG. 22 is a diagram illustrating a second modification of a screen flow.

FIG. 22 is a diagram illustrating a second modification of the screen flow. The screen flow in FIG. 22 is a modification of the screen flow illustrated in FIG. 18, and is a configuration of the screen flow from FIG. 17.

Upon the device registration button 803 being tapped by the instructing object X from the device registration screen 800, the device list display unit 109 switches the display screen on the display 101 from the device registration screen 800 to the subject device list screen 700 (C181). This point is the same as in FIG. 18. If the number of registered rooms is multiple, upon the back button 701 being tapped by the instructing object X in the subject device list screen 700, the room list display unit 108 switches the display screen of the display 101 from the subject device list screen 700 to the room list screen 600 (C2202).

On the other hand, if the number of registered rooms is one, the device list display unit 109 switches the display screen of the display 101 from the subject device list screen 700 to the device list screen 1300, without going through the room list screen 600 (C2201).

If the number of registered rooms is one, there is only the one room icon 603 displayed in the room list screen 600, so there is no need to cause the user to select the one room icon 603 using the room list screen 600. Accordingly, in a case where the number of registered rooms is one, in the second modification, the display screen of the display 101 is switched from the subject device list screen 700 to the device list screen 1300 without going through the room list screen 600. This reduces the number of operating steps by the user, and the number of processing steps by the home controller 100. Note that the present disclosure may combine both the first modification and the second modification, or may use just one.

FIG. 23 is a diagram illustrating a room list 2300 according to a first example which the device registration management unit 105 manages. The room list 2300 is data for managing the number of devices 200 correlated with each room. A feature of the room list 2300 according to the first example is that rooms regarding which the number of registered devices 200 is one or more are registered, and rooms regarding which the number of registered devices 200 is 0 are not registered.

The top tier in FIG. 23 represents the room list 2300 in an initial state, the middle tier represents the room list 2300 in a case where the number of registered rooms is one, and the bottom tier represents the room list 2300 in a case where the number of registered rooms is two.

The room list 2300 has a data structure where one record is assigned to each room, having the items of "ROOM ID", "ROOM NAME", and "NUMBER OF DEVICES REGISTERED". "ROOM ID" is an identifier for identifying each room uniquely. "ROOM NAME" is the name of each room. "NUMBER OF DEVICES REGISTERED" is the number of devices 200 which have been correlated with the room at the device registration screen 800.

As can be seen in the top tier, the number of registered rooms in the initial state is 0, so the number of rooms registered in the room list 2300 is 0.

If the number of registered rooms is one, the room list 2300 has one record corresponding to this one room, as can be seen from the middle tier. The "LIVING ROOM" is registered as this one room, so "LIVING ROOM" is registered as "ROOM NAME". Room names displayed in the list in the room candidate list 902 of the room selection screen 900 are registered in the "ROOM NAME". In a case where a room having a room name which the user has optionally input at the room selection screen 900 is selected, the name of that room is registered to "ROOM NAME".

The living room is the room registered first, so "R001" is registered as "ROOM ID". Thus, a symbol string is employed for the "ROOM ID", where a numerical value is increment by 1 in order of registration. There are four devices 200 correlated with the living room, so "4" is registered for the "NUMBER OF DEVICES REGISTERED". The room list display unit 108 decides the order of array of the room icons 603 on the room list screen 600 according to the order of "ROOM ID". For example, the room icon 603 of the room of which the "ROOM ID" is "R001" is arrayed in the tile at the first row and first column, and the room icon 603 of the room of which the "ROOM ID" is "R002" is arrayed in the tile at the first row and second column.

If the number of registered rooms is two or more, the room list 2300 has two or more records corresponding to this one room, as can be seen from the lower tier. The "LIVING ROOM" and "DEN" are registered here, so two records corresponding to "LIVING ROOM" and "DEN" are registered as "ROOM NAME". The den has been registered second, so "R002" is registered as "ROOM ID". There is one device 200 correlated with the "DEN", so "1" is registered for the "NUMBER OF DEVICES REGISTERED".

Thus, the room list 2300 has registered therein the rooms with one or more devices registered thereto and the name of the rooms, so the room list display unit 108 can identify how many room icons 603 to display representing which rooms in the room list screen 600 by referencing the room list 2300. In a case of employing the first modification or second modification of the screen flow, the room list display unit 108 and device list display unit 109 can determine whether the number of registered rooms is one or multiple by referencing the room list 2300. Further, rooms where the number of correlated devices 200 is 0 are not registered in the room list 2300, so the amount of data is reduced.

FIG. 24 is a diagram illustrating a room list 2400 according to a second example, which the device registration management unit 105 manages. The room list 2400 differs from the room list 2300 in that all rooms set beforehand to be managed by the home controller system are registered, regardless of the number of registered devices. For example, the "ENTRANCE" is registered in the room list 2400 even through the "NUMBER OF DEVICES REGISTERED" is 0. Otherwise, the room list 2400 is the same as the room list 2300.

Rooms which are set beforehand to be managed correspond to the room candidate list 902 in the room selection screen 900. Accordingly, the records corresponding to each room displayed as a list in the room candidate list 902 are registered in the room list 2400 beforehand.

Note that the records corresponding to the "CUSTOMER SETTING 1" through "CUSTOMER SETTING 5" shown in the room candidate list 902 are also registered in the room list 2400 beforehand. In a case that the user has input an optional room name, such as "so-and-so's bedroom" for the "CUSTOMER SETTING 1", the room name "CUSTOMER SETTING 1" in the room list 2400 is rewritten to "so-and-so's bedroom". In the room list 2400, rooms where the "NUMBER OF DEVICES REGISTERED" is one or more correspond to registered rooms, and rooms where the "NUMBER OF DEVICES REGISTERED" is 0 correspond to unregistered rooms.

In a case where the room list 2400 is employed, the room list display unit 108 may extract one or more rooms from the room list 2400 where the "NUMBER OF DEVICES REGISTERED" is one or more, and arrange room icons 603 for the extracted rooms on the room list screen 600 in order of the room ID. In the example in FIG. 24, the room icons 603 are arrayed on the order of living room, den, and so forth, for example, but the number of devices registered for the entrance is "0", so the room icon 603 for the bedroom 1 is disposed next after the Japanese room. Accordingly, when the room list 2400 is employed, the room icons 603 is arrayed not in order of registration, rather, the room icons 603 are arrayed in order of room IDs provided beforehand to each room. Note that although description has been made that the room icons 603 are arrayed on the room list screen 600 in the order of room IDs, the array of the room icons 603 may be changed according to user preferences.

For example, if the user moves a room icon 603 to a desired position on the room list screen 600, the room icon 603 may be thereafter situated at the position to which it was moved. In this case, the home controller 100 may have tile information in the room lists 2300 and 2400, indicating the position where the room icon 603 is to be placed. Tile information is information such as the tile at row 1 and column 1, the tile at row 1 and column 2, and so forth. Assuming a situation where the room icon 603 for the living room that was situated at the tile at row 1 and column 1 in the room list screen 600 in FIG. 14 is moved to the tile at row 1 and column 3, in this case the room list display unit 108 displays the room icon 603 for the living room at the tile at row 1 and column, so the icons for the bedroom at row 1 and column 2, and the children's bedroom at row 1 and column 3, can be shifted to the tile at row 1 and column 1, and the tile at row 1 and column 2, and thus displayed.

FIG. 25 is a diagram illustrating an example of data configuration of a device list 2500 which the device registration management unit 105 manages. Based on the information in this device list 2500, the device list display unit 109 displays marks 707 in the subject device list screen 700 indicating that devices are not registered, displays device control screens 1306 of devices 200 correlated with the relevant room in the device list screen 1300, and so forth.

The device list 2500 includes device ID 2501, device type 2502, model number 2503, room-where-installed 2504, capability information 2505, control command transmission destination 2506, IP address 2507, energy consumption 2508, and status 2509.

The device ID 2501 is an identifier for the device 200. The device type 2502 indicates the type of the device 200. The model number 2503 indicates the model number of the device 200. The room-where-installed 2504 indicates the room with which the device 200 has been correlated. Correlating the device 200 and the room is performed by the user using the device registration screen 800 and room selection screen 900.

The capability information 2505 indicates what about the device 200 can be controlled, and states that can be acquired from the device 200. For example, the temperature, wind direction, and airflow of the air conditioner with device ID A can be controlled. The home controller 100 may acquire capability information from the device 200 via the network, and register it in the capability information 2505.

The control command transmission destination 2506 indicates the destination of the control command for controlling the device 200. In the example in FIG. 25, "DEVICE" is registered as the control command transmission destination 2506 for all devices 200, so the control commands are directly transmitted from the home controller 100 to the device 200. On the other hand, there are some devices 200 where control commands are transmitted via a server (omitted from illustration) on the Internet, for the manufacturer of the device 200 to provide services to the user. In the case of such devices 200, "SERVER" is registered as the control command transmission destination, and the home controller 100 transmits control commands to the device 200 via the server. Note that a control command is a command for operating the device 200, confirming the state of the device 200, and so forth.

The IP address 2507 is an IP address assigned to the device 200. In a case of employing a configuration where the home controller 100 automatically assigns an IP address to the device 200, the home controller 100 may register the IP address which it has assigned itself in the IP address 2507. In a case where the device 200 is assigned an IP address by an external device, or the device 200 already has its own IP address beforehand, the IP address may be acquired from the external device or the device 200, and registered in the IP address 2507.

The energy consumption 2508 represents the amount of electric power consumed by the devices 200. The energy consumption per hour (kwh) of the device 200 is used as the energy consumption. If the energy consumption is managed by a smart distribution board (omitted from illustration) installed in the house, the home controller 100 may acquire the energy consumption from the smart distribution board, and if managed by each device 200, the home controller 100 may acquire the energy consumption directly from the device 200.

The status 2509 (example of log information) represents the current state of the device 200. In the example in FIG. 25, the current set temperature of the air conditioner of which the device ID is A is 27 degrees, so "27° C." is registered as the status. If the home controller 100 has transmitted a control command to a certain device 200 to realize a certain state, the status 2509 may be updated at that time with the state that the control command indicates. Alternatively, if the device 200 has a state notification function, the home controller 100 may periodically query the device 200 for the state, and update the status 2509 with the state which the response from the device 200 indicates.

FIG. 26 is a sequence diagram illustrating an example of processing at the time of the home controller 100 detecting devices 200. Explanation will be made regarding an arrangement where there are two devices 200, device A and device B, on a network to which the home controller 100 is connected. Note however, that this is an example, and that any number of devices 200 connected to the network may be employed, from 0 or more.

First, the device list display unit 109 of the home controller 100 displays the subject device list screen 700 on the display 101 (S2601). Next, the device registration management unit 105 of the home controller 100 transmits a device search request to device A and device B (S2602). Here, the device registration management unit 105 may transmit a device search request immediately after the display screen of the display 101 has been changed to the subject device list screen 700, and thereafter transmit a device search request each time the search-again button 702 is selected at the subject device list screen 700. The device registration management unit 105 may transmit the device search request to the network by broadcasting.

Next, the device A transmits a device search response to the home controller 100 (S2603). Next, the device registration management unit 105 transmits an acquisition request for device information of the device A (S2604), and acquires device information of the device A. This device information includes a device ID.

Next, the device registration management unit 105 determines whether the device A is a registered device 200 or an unregistered device 200, using the acquired device information (S2605). If the device ID included in the acquired device information is registered in the device list 2500, determination may be made that the device A has been registered, and if not registered, that the device A is not registered.

Next, the device list display unit 109 updates the subject device list screen 700 in accordance with the determination results of S2605 (S2606). In this case, if the device A is an unregistered device, the mark 707 indicating not registered is displayed in the device display space 706 for the device A, and if the device A is a registered device, the mark 707 indicating not registered is not displayed in the device display space 706 for the device A.

Next, the device B transmits the device search response to the home controller 100 (S2607). Next, the device registration management unit 105 transmits an acquisition request for device information of the device B (S2608), and acquires device information of the device B. Next, the device registration management unit 105 determines whether the device B is a registered device 200, in the same way as with the device A (S2609). Next, the device list display unit 109 updates the subject device list screen 700 in accordance with the determination results in S2609 (S2610).

Figure 27:
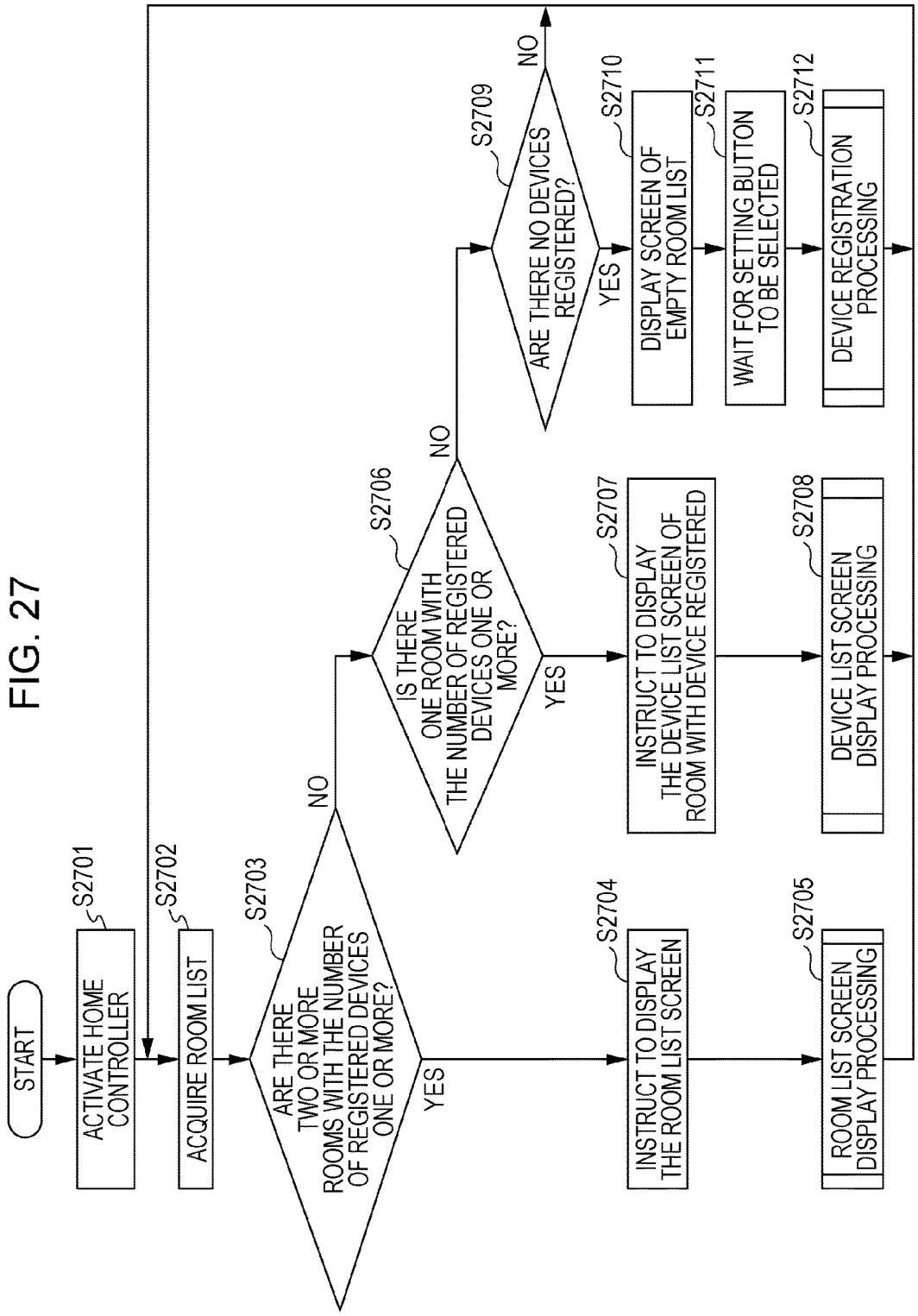
FIG. 27 is a flowchart illustrating an example of overall processing performed by the home controller.

FIG. 27 is a flowchart illustrating an example of the overall processing of the home controller 100. First, upon an operation of selecting a home controller application icon 501 being input at the application list screen 500, the home controller 100 activates the home controller application icon (S2701).

Next, the device registration management unit 105 acquires the room list 2300 or the room list 2400 (S2702). Now, the device registration management unit 105 acquires the room list 2300 or the room list 2400 by reading out the room list 2300 or room list 2400 from the storage unit 104. Hereinafter, the room list 2300 or room list 2400 will collectively be referred to as room list 2300.

Next, the device registration management unit 105 references the room list 2300 and determines whether or not the number of rooms with one or more registered devices is two or more (S2703). In a case where the number of rooms with one or more registered devices is two or more (YES in S2703), the device registration management unit 105 instructs the room list display unit 108 to display the room list screen 600 (S2704). In the example of the room list 2300 at the bottom tier in FIG. 23, the number of registered devices for the living room is "4" and the number of registered devices for the den is "1", so the number of rooms with one or more registered devices is two or more, and accordingly a determination of YES is made in S2703.

Next, room list screen display processing is executed (S2705), and the processing is returned to S2702. This processing will be described in detail later.

On the other hand, in a case where the number of rooms with one or more registered devices is not two or more (NO in S2703), the device registration management unit 105 references the room list 2300, and determines whether or not the number of rooms with one or more registered devices is one or more (S2706). In a case where the number of rooms with one or more registered devices is one or more (YES in S2706), the device registration management unit 105 instructs the device list display unit 109 to display the device list screen 1300 for the one room where devices are registered (S2707). In the example of the room list 2300 at the middle tier in FIG. 23, so the number of rooms with one or more registered devices is one, the "LIVING ROOM", and accordingly a determination of YES is made in S2706.

Now, in a case where YES is yielded in S2706, the number of registered rooms is one, so the processing of displaying the room list screen 600 (S2704, S2705) is not executed, and processing of displaying the device list screen 1300 (S2707, S2708) is executed. Accordingly, screen transition from the application list screen 500 to the device list screen 1300 is realized without going through the room list screen 600 indicated by C2103 in FIG. 21. On the other hand, in a case where YES is yielded in S2703, the number of registered rooms is multiple, so the processing of displaying the room list screen 600 (S2704, S2705) is executed.

Thus, screen transition from the application list screen 500 to the room list screen 600 indicated by C2101 in FIG. 21 is realized.

Next, device list screen display processing is executed (S2708), and the flow returns to S2702. This processing will be described in detail later.

On the other hand, in a case where determination is made that the number of rooms of which the number of registered device is one or more is not one (NO in S2706), the device registration management unit 105 determines that not one device 200 is registered (YES in S2709), and the room list display unit 108 displays an empty room list screen 600 (FIG. 6) with no room icons 603 displayed (S2710).

Next, the room list display unit 108 accepts operations of selecting the settings button 601 at the empty room list screen 600 (S2711). Next, device registration processing is executed (S2712), and the flow returns to S2702. Note that the processing is also returned to S2702 in the case of NO at S2709 as well.

Figure 28:
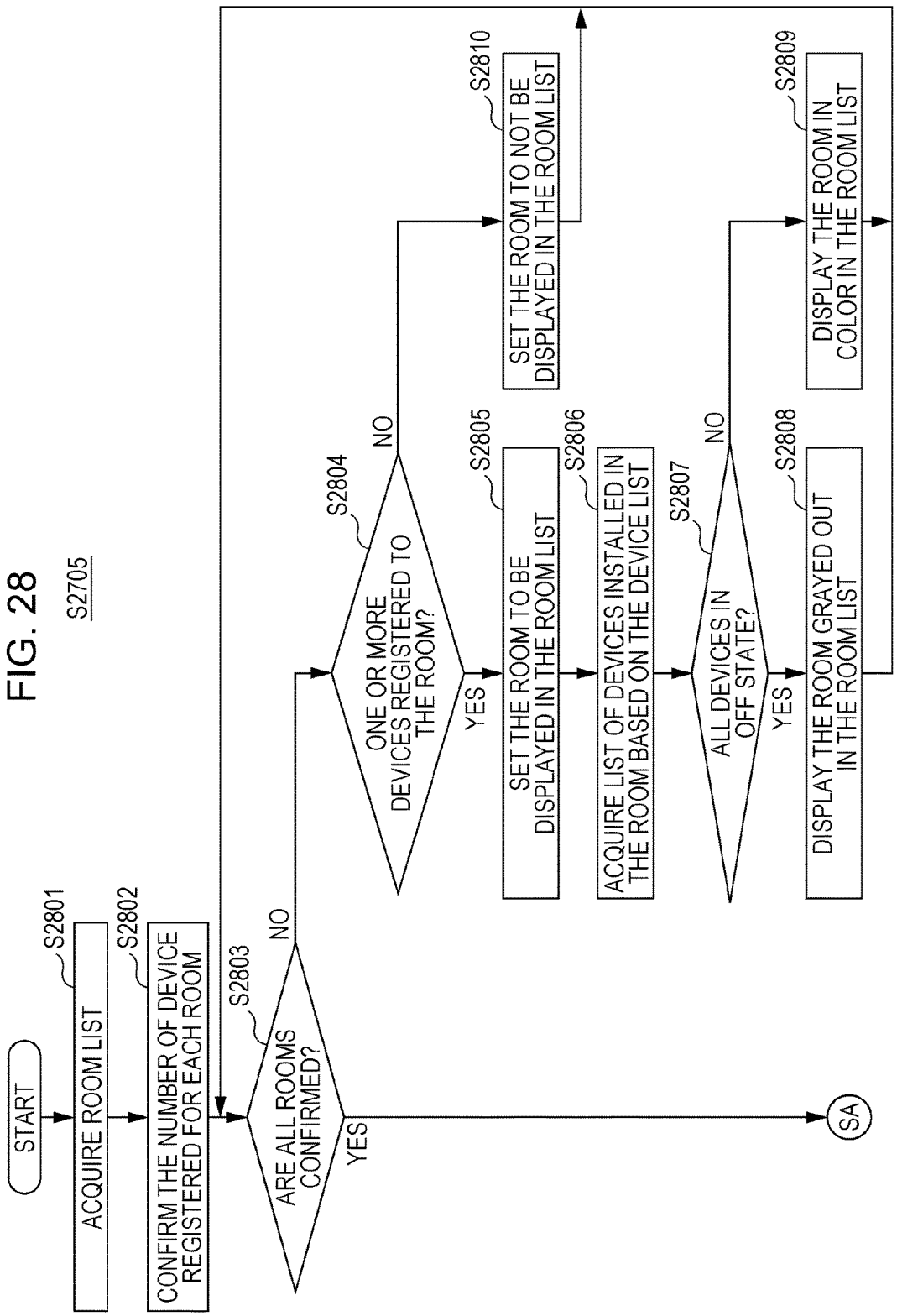
FIG. 28 is a flowchart illustrating an example of room list screen display processing.

FIG. 28 is a flowchart illustrating an example of room list screen display processing. First, the room list display unit 108 acquires the room list 2300 (S2801). Next, the room list display unit 108 confirms the number of registered device for each room registered in the room list 2300, one room at a time (S2802). Now, a room which is the object of confirmation regarding registered devices will be referred to as room for confirmation.

Next, in a case where confirmation of all rooms registered in the room list 2300 has not ended (NO in S2803), the room list display unit 108 determines whether the number of registered devices in a room for confirmation is one or more (S2804). In a case where the number of registered devices at the room for confirmation is one or more (YES in S2804), the room list display unit 108 sets the room for confirmation to be displayed in the room list screen 600 (S2805). On the other hand, in a case where the number of registered devices at the room for confirmation is 0 (NO in S2804), the room list display unit 108 sets the room for confirmation as a non-display room in the room list screen 600 (S2810), and the flow returns to S2803.

In S2806, the room list display unit 108 references the device list 2500, and acquires a device list of devices set in the room for confirmation. In the example in FIG. 25, if the room for configuration is the living room, the living room has the air conditioner, shutter, and lighting fixture correlated, so the device information of these devices 200 is included in the device list. One device information is information registered in one record in the device list 2500, i.e., information whereby the installation room of the device and the device ID can be identified.

Next, the room list display unit 108 determines whether or not all devices 200 are off in the acquired device list (S2807). Now, the room list display unit 108 may determine whether or not all devices 200 are in an off state, by referencing the status 2509 of the device list 2500.

In a case where all devices 200 are in the off state in the room for confirmation (YES in S2807), the room list display unit 108 displays the room icon 603 of the room for confirmation in a grayed out form in the room list screen 600 (S2808). On the other hand, in a case where not all devices 200 are in the off state in the room for confirmation (NO in S2807), the room list display unit 108 displays the room icon 603 of the room for confirmation in a color state (active state) in the room list screen 600 (S2809). Upon the processing of S2808 and S2809 ending, the flow returns to S2803.

In the example of the room list screen 600 in FIG. 14, all devices 200 are off in the Japanese room and the study, so the room icons 603 for the Japanese room and the study are displayed grayed out. On the other hand, at least one device 200 is on in all other rooms besides the Japanese room and the study, and accordingly these are displayed in an active state.

Figure 29:
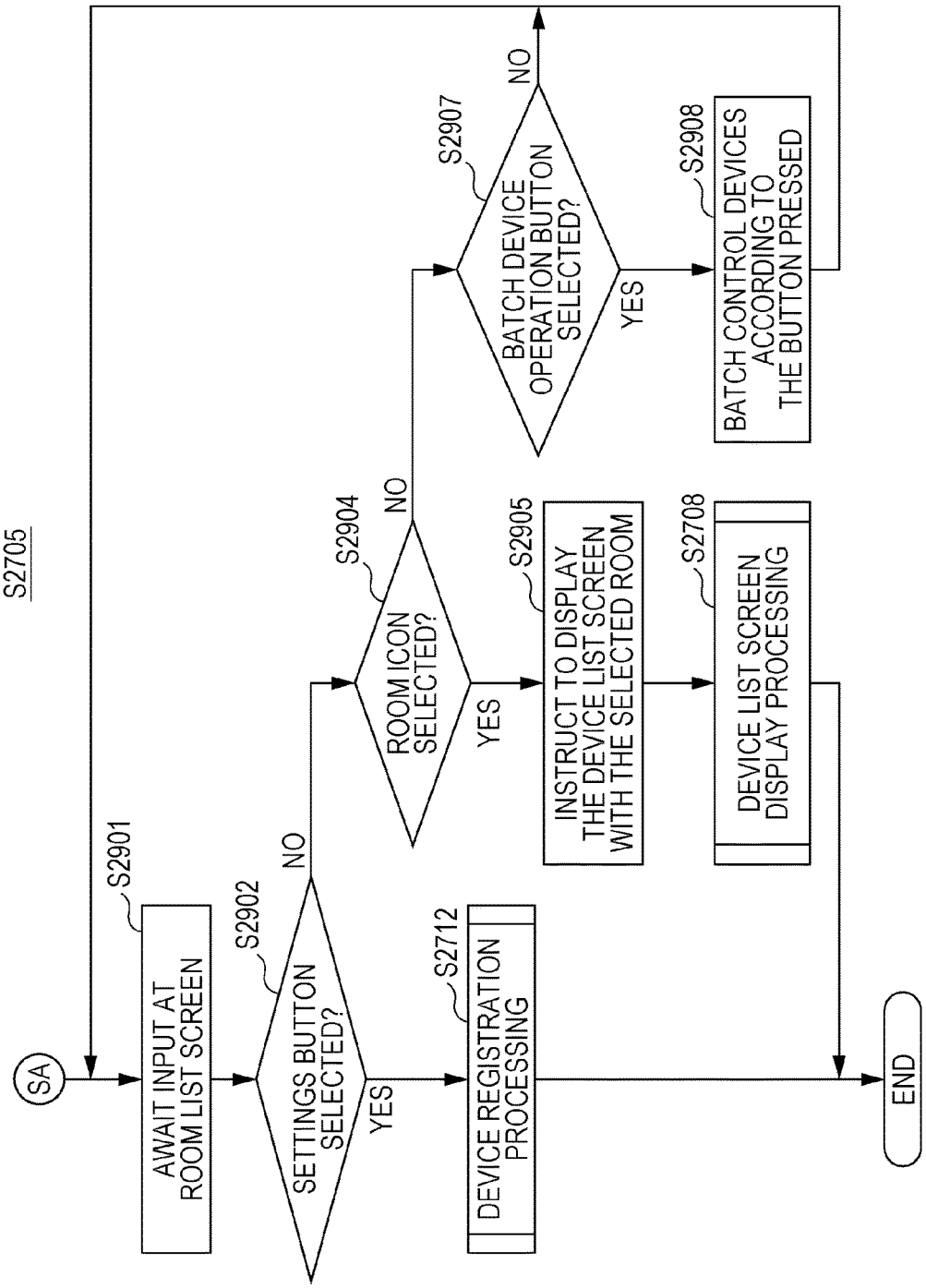
FIG. 29 is a flowchart illustrating an example of room list screen display processing, continued from FIG. 28.

Once confirmation of all rooms ends in S2803 (YES in S2803), the flow advances to S2901 in FIG. 29. At the stage that a determination of YES is made in S2803, a room list screen 600 such as illustrated in FIG. 14 is displayed on the display 101. FIG. 29 is a flowchart illustrating an example of room list screen display processing continuing from FIG. 28.

In S2901, the home controller 100 goes into a standby state, awaiting input from the user to the room list screen 600.

Upon the settings button 601 being selected in the room list screen 600 (YES in S2902), device registration processing is executed (S2712), and the room list screen display processing ends. Device registration processing will be described later in detail.

On the other hand, upon a room icon 603 being selected from the room list screen 600 NO in S2902 and YES at S2904), the touch panel control unit 102 instructs the device list display unit 109 to display the device list screen 1300 of the room corresponding to the selected room icon 603 (S2905). Next, device list screen display processing is executed (S2708), and room list screen display processing ends. The device list screen display processing will be described in detail later.

On the other hand, in a case where the batch device operation button 602 has been selected from the room list screen 600 (NO in S2904 and YES in S2907), the device control unit 106 executes device batch control according to the batch device operation button 602 that has been selected (S2908), and the flow returns to S2901. Note that in a case where NO is yielded in S2907, i.e., in a case where none of the settings button 601, room icon 603, and batch device operation button 602 are selected from the room list screen 600, the flow returns to S2901, and the standby state for user input is maintained.

Figure 30:
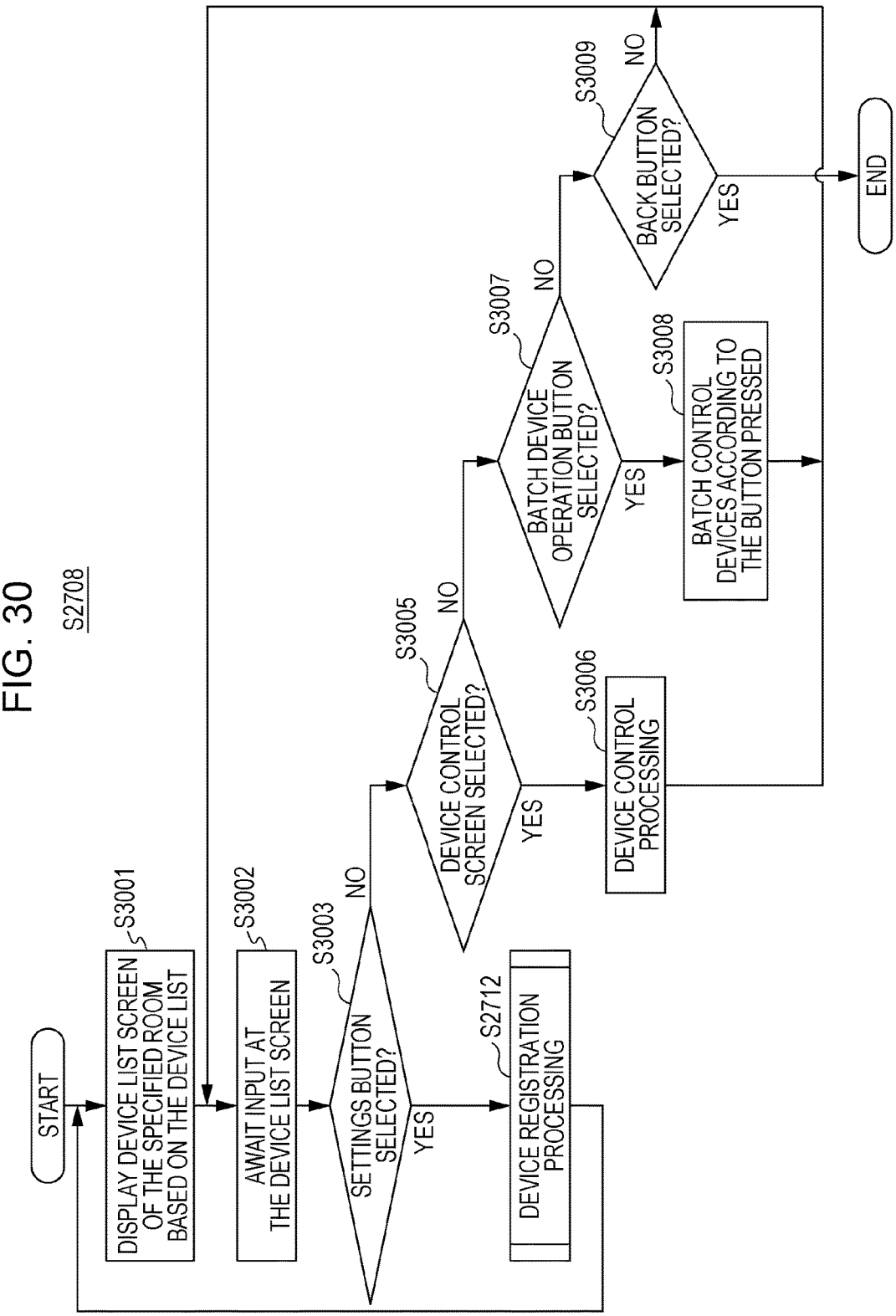
FIG. 30 is a flowchart illustrating an example of device list screen display processing at step S2708 in FIGS. 27 and 29.

FIG. 30 is a flowchart illustrating an example of device list screen display processing in S2708 in FIGS. 27 and 29. The device list screen display processing is executed in a case where the home controller application icon 501 has been selected from the application list screen 500 and there is one room where the number of registered devices is one or more in FIG. 27 (YES in S2706). Alternatively, the device list screen display processing is executed in a case where a room icon 603 has been selected from the room list screen 600 in FIG. 29 (YES in S2904).

First, the device list display unit 109 references the device list 2500, and displays the device list screen 1300 for the specified room (S3001). In a case where the device list screen display processing in FIG. 27 is being executed, the specified room means one room registered in the room list 2300, and in a case where the device list screen display processing in FIG. 29 is being executed, the specified room means the room corresponding to the room icon 603 selected by the user from the room list screen 600.

If the specified room is the living room here, the air conditioner, shutter, and lighting fixture are correlated with the living room in the example of the device list 2500 in FIG. 25. Accordingly, the device list display unit 109 displays the device list screen 1300 where the device control screens 1306 for the air conditioner, shutter, and lighting fixture are arrayed.

Next, the home controller 100 goes to a standby state for user input to the device list screen 1300 (S3002).

If the settings button 1301 is selected from the device list screen 1300 (YES in S3003), the flow returns top S3001 after device registration processing (S2712) is executed. The device registration processing will be described later in detail.

If a device control screen 1306 is selected in the device list screen 1300 (NO in S3003 and YES in S3005), the device control unit 106 executes device control processing (S3006). A case where any button included in a device control screen 1306 is selected falls under selection of the device control screen 1306. Also, device control processing means transmitting a control command corresponding to the button selected at the device control screen 1306 to the relevant device 200, to cause this device 200 to execute control correlated with the selected button.

Upon a batch device operation button 1302 being selected from the device list screen 1300 (NO in S3005 and YES in S3007), the device control unit 106 executes batch device control according to the selected batch device operation button 1302 (S3008).

In a case where the back button 1303 is selected from the device list screen (YES in S3009), the device list screen display processing ends. On the other hand, if nothing is selected from the device list screen 1300 (NO in S3009), the flow returns to S3002. Also, the display of the device list screen 1300 is maintained even after the processing in S3006 and S3008 ends, so the flow returns to S3002.

The reason why the flow returns to S3001 after the processing of S2712 ends is because the conditions for the device registration processing (S2712) to end is that the back button 701 is selected from the subject device list screen 700, and upon the back button 701 being selected from the subject device list screen 700, the screen display needs to be switched from the subject device list screen 700 to the device list screen 1300, which will be described later with reference to FIG. 31.

Figure 31:
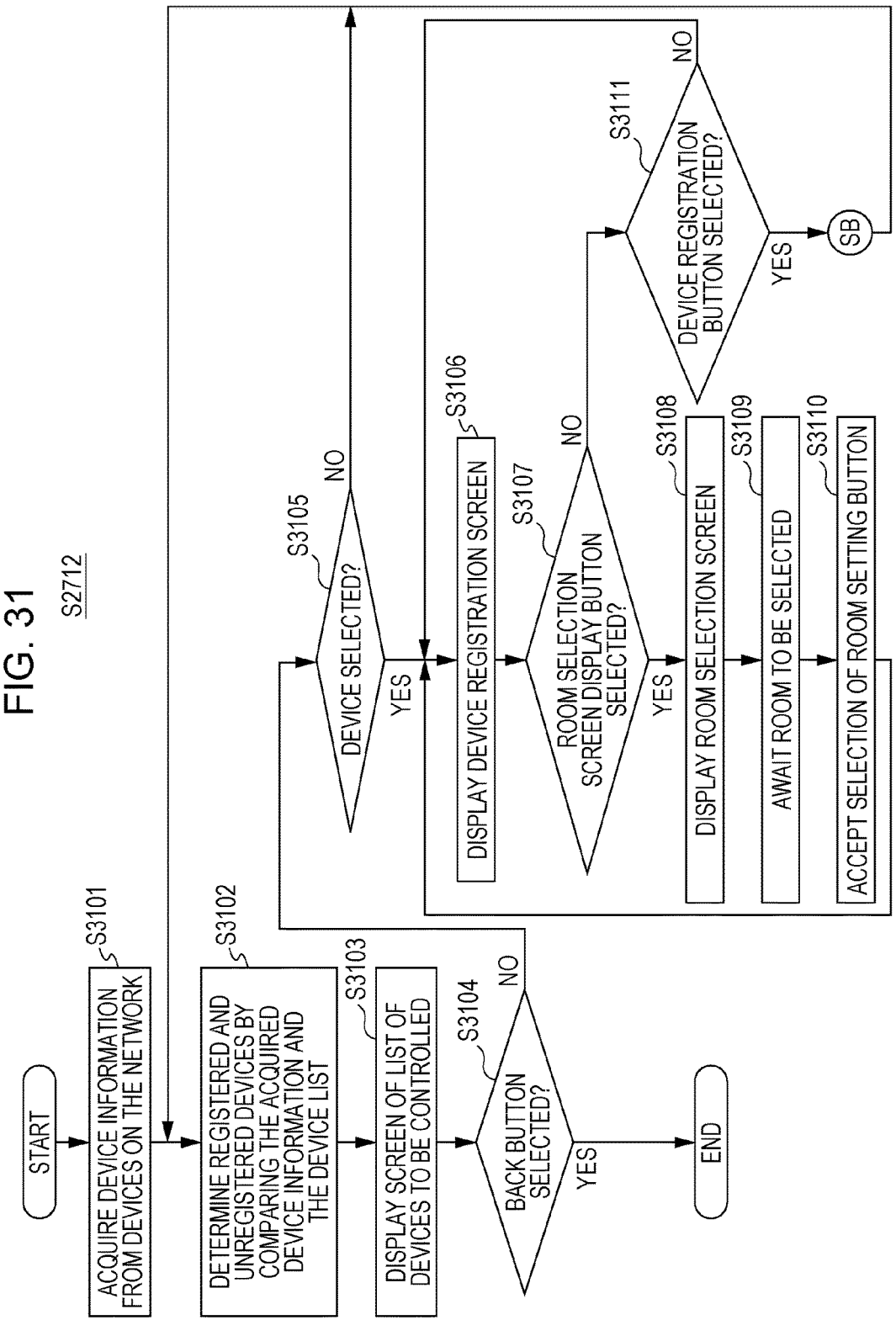
FIG. 31 is a flowchart illustrating an example of device registration processing at step S2712 in FIGS. 27 and 30.

FIG. 31 is a flowchart illustrating an example of device registration processing shown in S2712 in FIGS. 27 and 30. The device registration processing is execute in a case where the settings button 601 has been set from an empty room list screen 600 in FIG. 27 (S2711), or in a case where the settings button 1301 has been selected from the device list screen 1300 in FIG. 30 (YES in S3003).

First, the device registration management unit 105 acquires device information from the devices 200 on the network (S3101). Next, the device registration management unit 105 compares the acquired device information with the device list 2500, and determines whether or not the devices 200 regarding which device information has been acquired are registered devices 200 (S3102). Next, the device list display unit 109 displays the subject device list screen 700.

Note that S3101 corresponds to S2604 and S2608 in FIG. 26, S3102 corresponds to S2605 and S2609 in FIG. 26, and S3103 corresponds to S2606 and S2610 in FIG. 26. That is to say, a sequence diagram of the processing of S3101 through S3103 looks like FIG. 26.

Next, upon the back button 701 being selected from the subject device list screen 700 (YES in S3104), the device registration processing ends. In this case, if the device registration processing has been performed in FIG. 27, the flow returns to S2702. On the other hand, if the device registration processing has been performed in FIG. 30, the flow returns to S3001, and the display screen is switched from the subject device list screen 700 to the device list screen 1300.

In a case where a device 200 has been selected from the subject device list screen 700 (NO in S3104 and YES in S3105), the room list display unit 108 displays a device registration screen 800 (S3106). In a case where nothing is selected at the subject device list screen 700 (NO in S3105), the flow returns to S3102, and the display of the subject device list screen 700 is maintained.

If the room selection screen display button 802 is selected from the device registration screen 800 (YES in S3107), the room list display unit 108 displays the room selection screen 900 (S3108).

Next, the touch panel control unit 102 accepts operation of selecting one of the rooms from the room selection screen 900 (S3109). Next, the touch panel control unit 102 accepts operation of selecting the room set button 905 (S3110). Next, the room list display unit 108 returns the flow to S3106, and switches the display screen from the room selection screen 900 to the device registration screen 800. In this case, the device registration screen 800 displays the device 200 selected in S3105 and the room selected in S3109.

Upon the device registration button 803 being selected from the device registration screen 800 NO in S3107 and YES in S3111), the flow advances to a device registration processing subroutine (SB). On the other hand, if nothing is selected from the device registration screen 800 (NO in S3111) the flow returns to S3106, and display of the device registration screen 800 is maintained.

Figure 32:
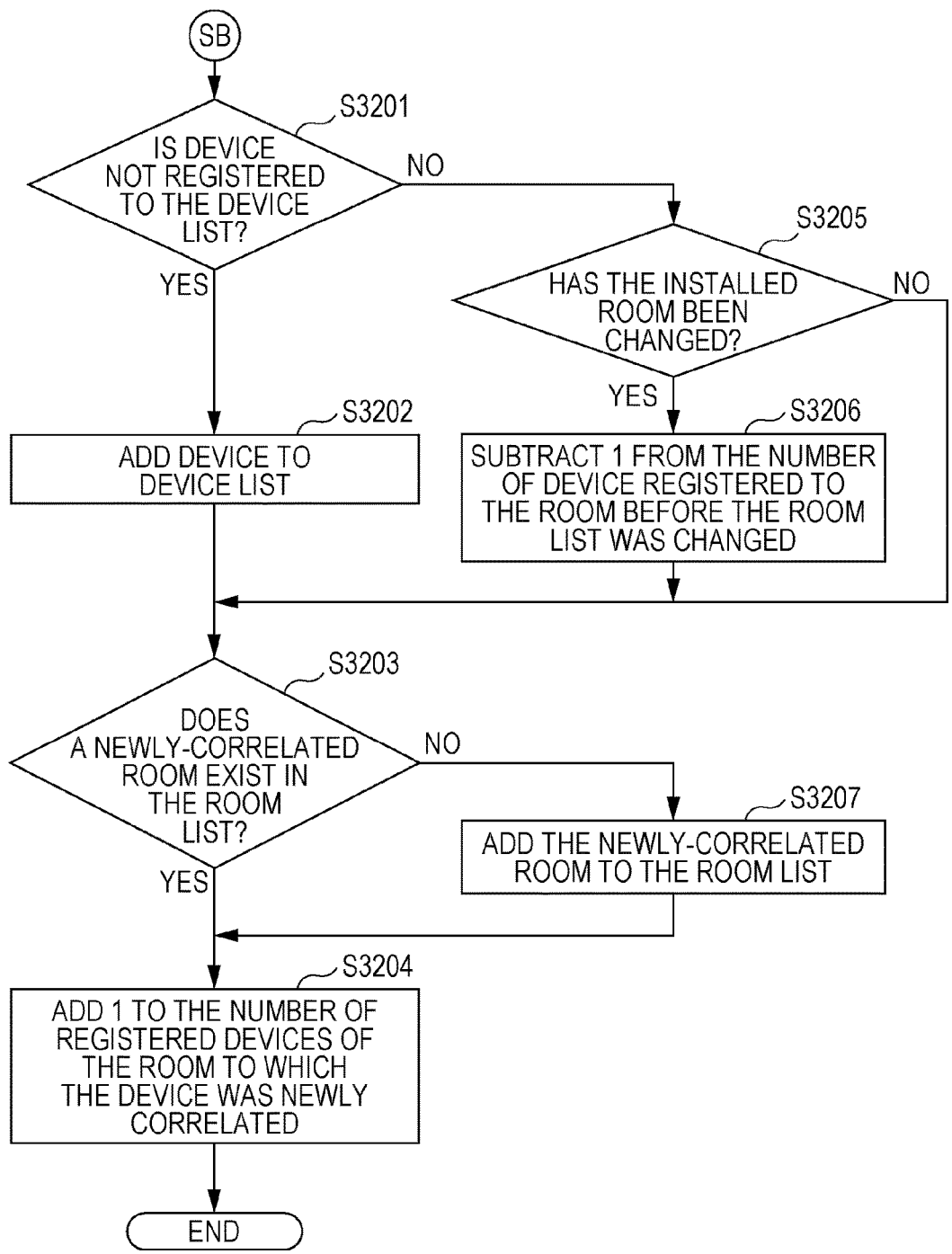
FIG. 32 is a flowchart illustrating a subroutine of a first pattern of device registration processing.

There are two patterns to the device registration processing subroutine (SB). First, a subroutine (SB) according to a first pattern will be described. FIG. 32 is a flowchart illustrating the device registration processing subroutine (SB) according to the first pattern. The subroutine (SB) according to the first pattern uses the room list 2300 as a device list.

First, the device registration management unit 105 determines whether or not the device 200 selected in S3105 is unregistered in the device list 2500 (S3201). If unregistered (YES in S3202), the device registration management unit 105 registers this device 200 in the device list 2500.

On the other hand, if already registered (NO in S3201), the device registration management unit 105 determines whether or not the room correlated to this device 200 has been changed (S3205). In a case where the room correlated with this device 200 has been changed (YES in S3205), in the room list 2300 the device registration management unit 105 subtracts 1 from the number of registered devices for this room before change (S3206). For example, if the room correlated with a certain device 200 has been changed from the living room to a different room, the number of registered devices for the living room is changed from "4" to "3" in the room list 2300 at the lower tier on FIG. 23. On the other hand, if there is no change in the installed room (NO in S3205), the flow advances to S3203. Now, if the number of registered devices to the living room reaches "0", the record of the living room is deleted from the room list 2300. In accordance with this, the room icon 603 for the living room is also deleted from the room list screen 600.

In S3203, if a room with which this device 200 has been newly correlated exists in the room list 2300 (YES in S3203), the device registration management unit 105 adds one to the number of registered devices to the newly correlated room (S3204). For example, in a case where the correlation of a certain device 200 has been changed from the living room to the den, the number of registered devices at the den is changed from "1" to "2" in the room list 2300 at the lower tier in FIG. 23.

On the other hand, if the newly correlated room does not exist in the room list 2300 (NO in S3203), the device registration management unit 105 newly registers the newly correlated room in the room list 2300. For example, in a case where the correlation of a certain device 200 has been changed from the living room to the bedroom 1, a record for the bedroom 1 is added to the lower tier in FIG. 23.

Upon the processing of S3204 ending, the subroutine (SB according to the first pattern ends, and the processing returns to S3102 in FIG. 31. Accordingly, the device 200 newly registered in the device list 2500 is handled as a registered device 200 in S3102, and is reflected in the subject device list screen 700 in S3103. This is the same with a subroutine (SB) according to a second pattern in FIG. 33 as well.

Figure 33:
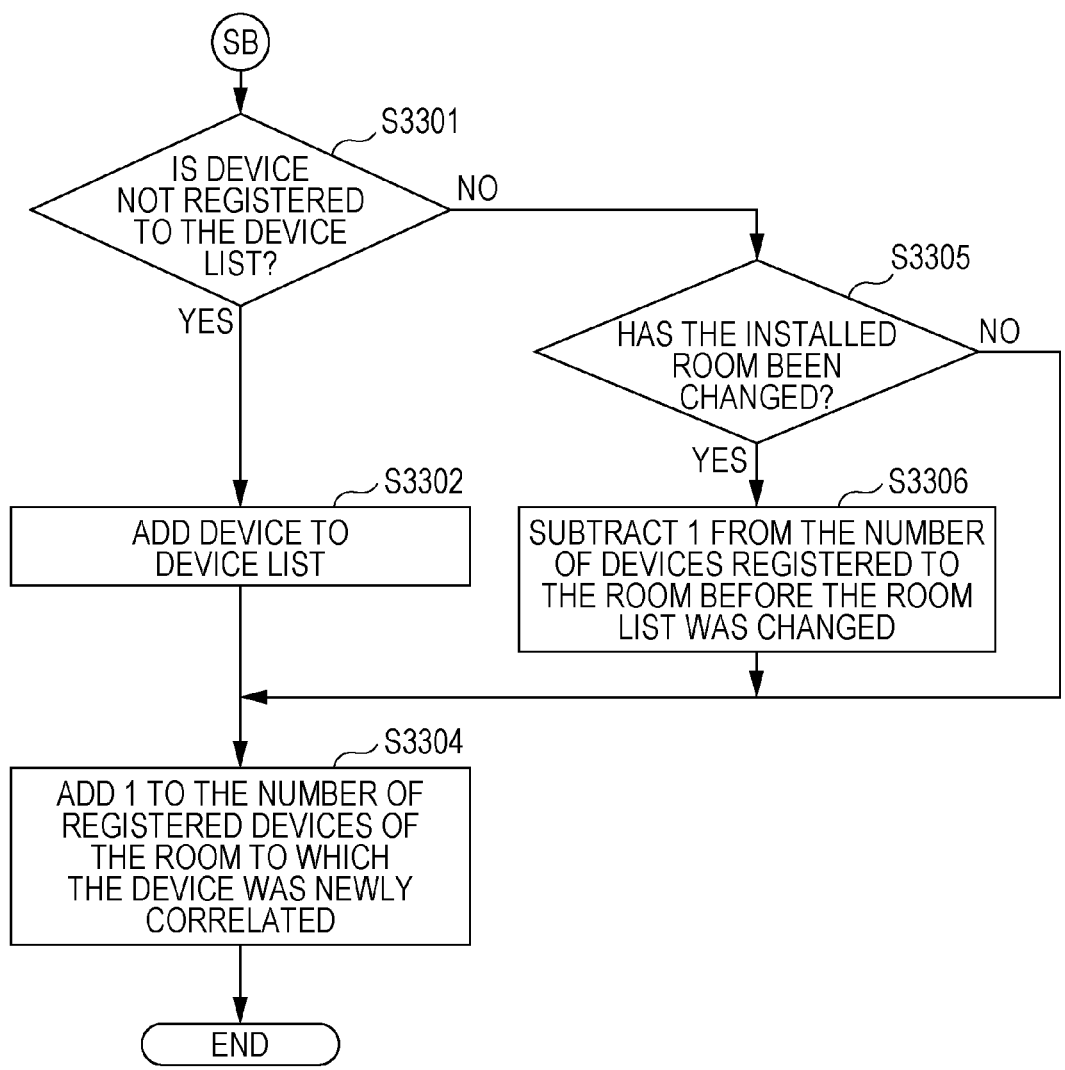
FIG. 33 is a flowchart illustrating a subroutine of a second pattern of device registration processing.

FIG. 33 is a flowchart illustrating a subroutine (SB) according to the second pattern. The subroutine (SB) according to the second pattern uses the room list 2400 as the device list. According to the second pattern, the room list 2400 has records of all rooms set beforehand by the control system. Accordingly, even if the number of registered devices of a certain room reaches "0", that room is not deleted from the room list 2400. Accordingly, the processing of determining whether or not a room with which a device 200 is to be newly correlated is registered in the room list 2300 (S3203 in FIG. 32), and processing of added that room to the room list 2300 if that room is not roistered to the room list 2300 (S3207 in FIG. 32) are omitted from FIG. 33. Otherwise, the processing of S3301, S3302, S3304, S3305, and S3306, in FIG. 33, is the same processing as the processing of S3201, S3202, S3204, S3205, and S3206 in FIG. 32.

The present disclosure is useful in the technical field of controlling devices installed in a building using a single home controller.

What is claimed is:

1. A method for controlling a computer of an information device, which connects to a network via which one or more subject devices are controlled, and which has a display, the method comprising:
    displaying on the display a first room list screen containing no room icons and including
        a selectable icon, and
        an area containing an indication that no subject devices are registered to any rooms,
    displaying, on the display, subsequent to the display of the first room list screen, a single screen comprising only
        a subject device list screen presenting
        a list of the one or more subject devices, and
        an indicator indicating the subject device to be an unregistered subject device when each of the subject devices is not associated, in a memory, with a room in which the subject device is installed, the list of the subject device list screen not including registered devices, which are devices associated, in the memory, with a room in which the subject device is installed,
        the subject device list screen being displayed in response to selection of the selectable icon on the previously-displayed first room list screen;
    displaying a room selection screen on the display, subsequent to the display of the subject device list screen, the room selection screen allowing a user to select, from a plurality of rooms, a room where an unregistered first subject device is installed when selection of the unregistered first subject device is detected on the subject device list screen;
    updating a status of the first subject device from unregistered to registered by associating the unregistered first subject device with a first room in the memory, based on selection of the first room on the room selection screen;
    generating a second room list screen including a first room icon representing the first room to be displayed as part of the second room list screen on the display subsequent to the display of the room selection screen; and
    displaying, on the display, subsequent to the display of the second room list screen, a first device list screen to replace the second room list screen, wherein the first device list screen relates to the first room and includes a first operating screen for operating the registered first subject device when selection of the first room icon is detected on the second room list screen.

2. The method according to claim 1, wherein a control command for controlling the registered first subject device is output to the network, based on an operation using the first operating screen.

3. The method according to claim 1, further comprising:
    displaying the room selection screen on the display for allowing the user to select, from the plurality of rooms, a room where an unregistered second subject device is installed when selection of the unregistered second device is detected on the subject device list screen;
    updating a status of the second subject device from unregistered to registered by associating the unregistered second subject device with the first room in the memory, based on selection of the same room as the first room on the room selection screen, to display on the display of the second room list screen including the first room icon,
    adding a second operating screen for operating the second subject device to the first device list screen which relates to the first room when selection of the first room icon is detected on the second room list screen, and
    displaying, on the display, the first device list screen to which the second operating screen is added, to replace the second room list screen.

4. The method according to claim 1, further comprising:
    displaying the room selection screen on the display for allowing the user to select, from the plurality of the rooms, a room where an unregistered second subject device is installed when selection of the unregistered second device is detected on the subject device list screen,
    updating a status of the second subject device from unregistered to registered by associating, in the memory, the unregistered second subject device with a second room which is different from the first room, based on selection of the second room on the room selection screen;
    adding a second room icon representing the second room to the second room list screen,
    displaying, on the display, the second room list screen to which the second room icon is added, and
    displaying, on the display, a second device list screen to replace the second room list screen, wherein the second device list screen relates to the second room when selection of the second room icon is detected on the second room list screen.

5. The method according to claim 1, further comprising:
displaying, on the display, the second room list screen for operating the registered first subject device, when selection of a menu icon is detected from a menu screen for operating any of the one or more subject devices and it is determined, using memory storing room information identifying the room or rooms in which each of the one or more subject devices is installed, that the one or more subject devices are installed in the plurality of rooms;

displaying, on the display, the first device list screen to replace the second room list screen by selection of the first room icon on the second room list screen; and displaying, on the display, the first device list screen to replace the menu screen for operating the registered first subject device, when selection of the menu icon is detected from the menu screen and when the one or more subject devices are installed in only the first room.

6. The method according to claim 1, further comprising:
displaying, on the display, the second room list screen for operating the registered first subject device, when selection of a menu icon is detected from a menu screen for operating any of the one or more subject devices and it is determined, using memory storing room information representing a determination of whether each of the subject devices is installed in a room, that the one or more subject devices are installed in the plurality of rooms, displaying, on the display, the first device list screen to replace the second room list screen by selection of the first room icon on the second room list screen; and displaying, on the display, the first device list screen to replace the menu screen for operating the registered first subject device, when selection of the menu icon is detected from the menu screen and when the one or more subject devices are installed in only the first room.

7. The method according to claim 1,
wherein the second room list screen does not include a room icon representing a room which is not associated with any of the one or more subject devices.

8. The method according to claim 1, further comprising:
comparing first device information representing each of the one or more subject devices acquired via the network, with second device information representing each of the one or more subject devices managed as registered subject devices in the memory; and when an identifier identifying the unregistered first subject device is not included in the second device information, displaying the room selection screen on the display, to select the room where the unregistered first subject device is installed.

9. The method according to claim 1, further comprising:
comparing first device information representing each of the one or more subject devices acquired via the network, with second device information representing each of the one or more subject devices managed as registered subject devices in the memory;

when one or more identifiers identifying one or more unregistered subject devices are not included in the second device information, displaying, on the display, a subject device list screen including a subject device list that represents the one or more unregistered subject devices; and when selection of the unregistered first subject device from the subject device list screen is detected, displaying, on the display, the room selection screen, for selection of the room where the unregistered first subject device is installed.

10. The method according to claim 1, wherein the information device manages log information of the one or more subject devices, the method further comprising:
determining whether or not the power is on at the one or more subject devices out of subject devices installed in the first room, based on the log information; and when it is determined that power is on at the one or more subject devices installed in the first room, displaying in an active manner the first room icon representing the first room in the second room list screen.

11. The method according to claim 1, wherein the information device manages log information of the one or more subject devices, the method further comprising:
determining whether or not power is off at all subject devices installed in the first room, based on the log information; and when it is determined that power is off at all subject devices installed in the first room, displaying, in an inactive manner, the first room icon representing the first room in the second room list screen and when power is determined to not be off at all subject devices installed in the first room, displaying, in an active manner, the first room icon representing the first room in the second room list screen.

12. The method according to claim 11,
wherein the displaying of the first room icon in the inactive manner includes displaying of the first room icon in a grayout state.

13. The method according to claim 1, wherein the subject device list screen represents the one or more subject devices, based on device information representing each of the one or more subject devices registered in the memory, the method further comprising:
displaying, on the display, the room selection screen for selection of the room where the first subject device is installed, when selection of the first subject device is detected from the subject device list screen;

re-managing, in a case where the first registered subject device is managed in the memory as one registered subject device associated with the first room where the first device is installed, the registered first subject device by re-associating in the memory the registered first subject device with a second room different from the first room based on selection of the second room using the room selection screen, to display, on the display, the second room list screen including a second room icon representing the second room; and when selection of the second room icon representing the second room from the second room list screen is detected, displaying, on the display, a second device list screen that relates to the second room and that includes the first operating screen for operating the registered first subject device, to replace the second room list screen.

14. The method according to claim 13,
wherein, in a case where the first room is not managed to be associated with any of the one or more subject devices, the first room icon representing the first room is not displayed on the second room list screen.

15. The method according to claim 1,
wherein a control command for controlling the registered first subject device is output to the network, based on an operation using the first operating screen.

16. A non-transitory recording medium storing a program executed at an information device, which connects to a network via which one or more subject devices are controlled, and which has a display, the program causing a computer of the information device to:
- display on the display a first room list screen containing no room icons and including
  - a selectable icon, and
  - an area containing an indication that no subject devices are registered to any rooms,
- display, on the display, subsequent to the display of the first room list screen, a single screen comprising only
  - a subject device list screen presenting
    - a list of the one or more subject devices, and
    - an indicator indicating the subject device to be an unregistered subject device when each of the subject devices is not associated, in a memory, with a room in which the subject device is installed, the list of the subject device list screen not including registered devices, which are devices associated, in the memory, with a room in which the subject device is installed,
  - the subject device list screen being displayed in response to selection of the selectable icon on the previously-displayed first room list screen;
- display a room selection screen on the display, subsequent to the display of the subject device list screen, the room selection screen allowing a user to select, from a plurality of rooms, a room where an unregistered first subject device is installed when selection of the unregistered first subject device is detected on the subject device list screen;
- update a status of the first subject device from unregistered to registered by associating the unregistered first subject device with a first room in the memory, based on selection of the first room on the room selection screen;
- generate a second room list screen including a first room icon representing the first room to be displayed as part of the second room list screen on the display subsequent to the display of the room selection screen; and
- display, on the display, subsequent to the display of the second room list screen, a first device list screen to replace the second room list screen, wherein the first device list screen relates to the first room and includes a first operating screen for operating the registered first subject device when selection of the first room icon is detected on the second room list screen.

17. An information device, in which the program according to claim 16 is installed.

18. The information device according to claim 17, comprising:
- a television receiver.

19. The non-transitory recording medium according to claim 16, further causing the computer of the information device to:
- determine whether or not power is off at all subject devices installed in the first room, and
- when it is determined that power is off at all subject devices installed in the first room, display, in an inactive manner, the first room icon representing the first room in the second room list screen, and when power is determined to not be off at all subject devices installed in the first room, to display, in an active manner, the first room icon representing the first room in the second room list screen.

20. The non-transitory recording medium according to claim 16, further causing the computer of the information device to:
- display the room selection screen on the display for allowing the user to select, from the plurality of rooms, a room where an unregistered second subject devices device is installed when selection of the unregistered second device is detected on the subject device list screen;
- update a status of the second subject device from unregistered to registered by associating the unregistered second subject device with the first room in the memory, based on selection of the same room as the first room on the room selection screen, to display on the display, the second room list screen including the first room icon;
- add a second operating screen for operating the second subject device to the first device list screen which relates to the first room when selection of the first room icon is detected on the second room list screen, and
- display, on the display, the first device list screen to which the second operating screen is added, to replace the second room list screen.

* * * * *